(12) United States Patent
Foster et al.

(10) Patent No.: US 8,402,885 B2
(45) Date of Patent: Mar. 26, 2013

(54) METHODS AND APPARATUS FOR VIBRATION DAMPING IN A COOKING DEVICE

(75) Inventors: Paul Lincoln Foster, Lincoln, RI (US); Del Moffat Thornock, Concord, CA (US); Rory C. P. Millikin, Kelowna (CA)

(73) Assignee: Spinfry, Inc., New York, NY (US)

( * ) Notice: Subject to any disclaimer, the term of this patent is extended or adjusted under 35 U.S.C. 154(b) by 586 days.

(21) Appl. No.: 12/691,064

(22) Filed: Jan. 21, 2010

(65) Prior Publication Data
US 2010/0206179 A1 Aug. 19, 2010

Related U.S. Application Data

(60) Continuation-in-part of application No. 12/193,618, filed on Aug. 18, 2008, now Pat. No. 8,065,954, and a continuation-in-part of application No. 12/193,615, filed on Aug. 18, 2008, and a division of application No. PCT/US2009/040451, filed on Apr. 14, 2009.

(Continued)

(51) Int. Cl.
*A47J 37/10* (2006.01)
*A47J 37/12* (2006.01)

(52) U.S. Cl. ............... 99/409; 99/407; 99/410; 99/449; 99/450

(58) Field of Classification Search ............ 99/409, 99/407, 410, 449, 450, 411, 412, 415, 416, 99/418
See application file for complete search history.

(56) References Cited

U.S. PATENT DOCUMENTS 241,631 A 5/1881 Duffy
(Continued)

FOREIGN PATENT DOCUMENTS

DE 102005052301 5/2007
EP 1248046 10/2002
(Continued)

OTHER PUBLICATIONS

Examiner's Answer to Appeal Brief, dated Jun. 23, 2010 for U.S. Appl. No. 11/693,143.

(Continued)

*Primary Examiner* — Reginald L Alexander
(74) *Attorney, Agent, or Firm* — Snell & Wilmer L.L.P.

(57) ABSTRACT

A cooking device comprises a rotatable food basket disposed within the cooking device and a damping mechanism configured to reduce a vibration generated by the rotatable food basket rotating within the cooking device. An aspect of the cooking device includes a basket partition in the rotatable food basket, and the basket partition is configured to maintain a substantially equal distribution of a food within the rotatable food basket. The cooking device includes a motor in a hood for rotating the rotatable food basket, and it further includes a lifting plate and a lifting mechanism operable to move the rotatable food basket between a cooking section and a spinning section. The cooking device may also comprises a first basket portion and a second basket portion configured to be disposed within a first section and a second section of the rotatable food basket. The hood of the cooking device may also comprise a motor gear that includes a plurality of teeth configured to receive a motor key on a central shaft of the rotatable food basket. The motor key may be configured to automatically seat with the plurality of teeth in the motor gear via an electromagnetic coupling in response to an instruction from a microprocessor controller.

20 Claims, 62 Drawing Sheets

Related U.S. Application Data

(60) Provisional application No. 61/175,703, filed on May 5, 2009, provisional application No. 61/146,859, filed on Jan. 23, 2009, provisional application No. 61/044,733, filed on Apr. 14, 2008.

(56) References Cited

U.S. PATENT DOCUMENTS

| | | | |
|---|---|---|---|
| 1,316,827 A | 9/1919 | Brunner | |
| 1,630,787 A * | 5/1927 | Cullen | 99/416 |
| 1,759,921 A | 5/1930 | Tarpley | |
| 2,186,345 A | 1/1940 | Reidenbach | |
| 2,568,792 A | 9/1951 | Cripps | |
| 2,628,762 A | 2/1953 | Spalding | |
| 2,674,938 A | 4/1954 | Tagliaferri et al. | |
| 2,858,762 A | 11/1958 | Wade | |
| 3,078,786 A | 2/1963 | Arvan | |
| 3,078,988 A | 2/1963 | Dunning | |
| 3,200,737 A | 8/1965 | Ferenc | |
| 3,279,353 A | 10/1966 | Shelor | |
| 3,357,685 A | 12/1967 | Stephens | |
| 3,380,375 A | 4/1968 | Benson et al. | |
| 3,512,473 A | 5/1970 | Moore et al. | |
| 3,525,299 A | 8/1970 | Gouwens et al. | |
| 3,614,924 A | 10/1971 | Hicket | |
| 3,690,246 A | 9/1972 | Guthrie, Sr. | |
| 3,827,344 A | 8/1974 | Pratolongo | |
| 3,827,985 A | 8/1974 | De Haan | |
| 3,908,531 A | 9/1975 | Morley | |
| 4,187,770 A | 2/1980 | Coffield | |
| 4,196,660 A | 4/1980 | Steinberg | |
| 4,215,629 A | 8/1980 | Janssen | |
| 4,250,803 A | 2/1981 | Wohlfart | |
| 4,294,166 A | 10/1981 | Takeuchi | |
| 4,372,980 A | 2/1983 | Luebke et al. | |
| 4,426,794 A | 1/1984 | Vanderheijden | |
| 4,508,026 A | 4/1985 | Anetsberger et al. | |
| 4,719,850 A | 1/1988 | Sowell | |
| 4,722,267 A | 2/1988 | Galockin et al. | |
| 4,873,920 A | 10/1989 | Yang | |
| 5,010,805 A | 4/1991 | Ferrara | |
| 5,027,697 A | 7/1991 | De Longhi | |
| 5,165,330 A | 11/1992 | Giacomini | |
| 5,168,797 A | 12/1992 | Wang | |
| 5,223,137 A | 6/1993 | Hattori et al. | |
| 5,236,135 A * | 8/1993 | Wilson et al. | 241/21 |
| 5,351,605 A | 10/1994 | Sai et al. | |
| 5,379,684 A | 1/1995 | Ettridge | |
| 5,403,260 A | 4/1995 | Hensley | |
| 5,469,778 A | 11/1995 | Prudhomme | |
| 5,490,453 A | 2/1996 | Mackay | |
| 5,495,795 A * | 3/1996 | Harrison et al. | 99/492 |
| 5,543,166 A | 8/1996 | Masel | |
| 5,586,486 A | 12/1996 | Nitschke et al. | |
| 5,586,487 A | 12/1996 | Marino | |
| 5,611,265 A | 3/1997 | Ronci | |
| 5,650,187 A | 7/1997 | Franklin | |
| 5,771,781 A | 6/1998 | Sham | |
| 5,937,741 A | 8/1999 | Manger | |
| 5,993,872 A | 11/1999 | Rolle et al. | |
| 6,062,132 A | 5/2000 | Morris | |
| 6,196,115 B1 * | 3/2001 | Tsao | 99/339 |
| 6,322,831 B1 | 11/2001 | Mote et al. | |
| RE37,706 E | 5/2002 | Chung | |
| D462,567 S | 9/2002 | Smith | |
| 6,705,209 B2 | 3/2004 | Yang et al. | |
| 6,732,552 B2 | 5/2004 | Kim et al. | |
| 6,772,677 B2 | 8/2004 | Marotel et al. | |
| 6,834,577 B2 | 12/2004 | Xu | |
| 2002/0088350 A1 | 7/2002 | Backus et al. | |
| 2003/0192435 A1 | 10/2003 | McNair | |
| 2003/0207009 A1 | 11/2003 | Sus et al. | |
| 2004/0007137 A1 | 1/2004 | Hwang | |
| 2004/0031396 A1 | 2/2004 | Van Der Doe | |
| 2004/0055474 A1 | 3/2004 | Lekic et al. | |
| 2004/0060456 A1 | 4/2004 | Chung | |
| 2005/0238770 A1 | 10/2005 | Van Der Doe | |
| 2006/0016350 A1 | 1/2006 | Yoshidome | |
| 2006/0207438 A1 | 9/2006 | Currie | |
| 2008/0314261 A1 * | 12/2008 | Hensel | 99/511 |
| 2009/0044706 A1 | 2/2009 | Foster | |
| 2010/0037782 A1 | 2/2010 | Foster et al. | |

FOREIGN PATENT DOCUMENTS

| | | |
|---|---|---|
| FR | 2846218 | 4/2004 |
| GB | 1282713 | 7/1972 |
| GB | 1337547 | 11/1973 |
| GB | 2295768 | 6/1996 |
| WO | WO 94/23625 | 10/1994 |
| WO | WO 96/17541 | 6/1996 |
| WO | 96019934 | 7/1996 |
| WO | WO 97/25910 | 7/1997 |
| WO | 9739670 | 10/1997 |
| WO | WO 01/91580 | 12/2001 |
| WO | 2008103056 | 8/2008 |
| WO | WO2008/103056 | 8/2008 |

OTHER PUBLICATIONS

Final Office Action dated May 24, 2012 in U.S. Appl. No. 12/193,615.
Office Action dated Jun. 4, 2012 in U.S. Appl. No. 12/623,868.
Notice of Allowance dated Jul. 25, 2012 in U.S. Appl. No. 12/193,615.
Examination Report dated Jul. 18, 2011 for European Patent Application No. 07754706.5.
Notice of Allowance for U.S. Appl. No. 12/193,618 dated Sep. 21, 2011.
IPRP dated Oct. 28, 2010 for International Application No. PCT/US2009/040451.
Examination Report dated May 26, 2011 for European Patent Application No. 09733043.5.
Examination Report dated Dec. 15, 2011 for European Patent Application No. 09733043.5.
Office Action dated Dec. 19, 2011 in Canadian Application No. 2,681,981.
Non-final Office Action dated Apr. 14, 2011 for U.S. Appl. No. 12/193,618.
International Preliminary Report on Patentability for PCT/US2010/033692 dated Nov. 17, 2011.
Non-Final Office Action for U.S. Appl. No. 12/193,615 dated Nov. 21, 2011.
Invitation to Pay Additional Fees and Partial Search Report for PCT/US2010/033692.
ISR and WO for PCT/US2007/008222 dated Feb. 6, 2008.
Motion Technology, Inc., Specifications of Ventless Electric Fryer Model MTI-10, 1 Page.
Moriera, Rosana G.; Castell-Perez, M. Elena; Barrufet, Maria A., Oil Absorption in Porous Food During Cooling, Deep Fat Frying, Jun. 1, 1999, pp. 202-221, Luwer Academic Pub.
ISR and WO for PCT/US2009/040451 dated Sep. 28, 2009.
Office Action dated Jul. 22, 2009 for U.S. Appl. No. 11/693,143.
IPRP for PCT/US2007/008222 dated Oct. 8, 2009.
Final Office Action dated Dec. 24, 2009 for U.S. Appl. No. 11/693,143.
Advisory Action dated Feb. 3, 2010 for U.S. Appl. No. 11/693,143.
Notice of Grant of European Application No. 09733043.5 dated Jul. 13, 2012.
International Search Report and Written Opinion dated Aug. 31, 2012 in Application No. PCT/US2012/25565.
Office Action dated Sep. 24, 2012 in U.S. Appl. No. 13/280,177.

* cited by examiner

METHODS AND APPARATUS FOR VIBRATION DAMPING IN A COOKING DEVICE

CROSS REFERENCE TO RELATED APPLICATIONS

This application is a non-provisional of U.S. Provisional Ser. No. 61/175,703 filed May 5, 2009 and U.S. Provisional Ser. No. 61/146,859, filed on Jan. 23, 2009. This application is also a continuation-in-part and claims priority to U.S. Ser. No. 12/193,618, filed on Aug. 18, 2008, which is a non-provisional of U.S. Ser. No. 61/044,733, filed on Apr. 14, 2008. This application is also a continuation-in-part and claims priority to U.S. Ser. No. 12/193,615, filed on Aug. 18, 2008. Further, this application is also a continuation-in-part and claims priority to PCT/US2009/040451 filed Apr. 14, 2009. The entirety of all of the above applications are hereby incorporated herein by reference.

FIELD OF THE INVENTION

The present invention relates to a cooking device, and, for example, to vibration damping in a centrifugal cooking device, a dual bay cooking device, tube heating in a cooking device, and electromagnetic coupling for a centrifugal basket in a cooking device.

BACKGROUND OF THE INVENTION

In conventional cooking devices, any moving parts generally do not move in a fashion that creates circumstances giving rise to substantial vibration or vibratory actions because in such conventional cooking devices, the range of motion of the moving parts is limited. For example, in a conventional deep fryer, the moving parts are limited to loading, lowering, and raising the basket or container holding the food being fried.

In cooking devices that containing rotating parts that employ centrifugal force to facilitate cooking the food, vibration or vibratory actions may be introduced. For example, fryer devices may utilize a spinning basket that uses centrifugal force to remove excess frying oil from fried foods. The vibratory actions may adversely effect the desirability, functionality, and/or safety of the cooking device.

Additionally, there is a need for a centrifugal cooking device, such as in a deep bay fryer, that accommodates two centrifugal baskets. There is a further need for a cooking device that may utilize tube heating to heat the cooking liquid. Still another need exists for a centrifugal basket that uses electromagnetic coupling to engage a rotational motor.

SUMMARY

According to an embodiment of the present invention, a cooking device comprises a rotatable food basket disposed within the cooking device and a damping mechanism configured to reduce a vibration generated by the rotatable food basket rotating within the cooking device. An aspect of the cooking device includes a basket partition in the rotatable food basket, and the basket partition is configured to maintain a substantially equal distribution of a food within the rotatable food basket.

In an embodiment, the cooking device includes a motor in a hood for rotating the rotatable food basket, and it further includes a lifting plate and a lifting mechanism operable to move the rotatable food basket between a cooking section and a spinning section. The hood may be operable to reduce energy consumption by about 13% compared with an open bay cooking device without the hood.

According to an embodiment, the cooking device also comprises a first basket portion and a second basket portion configured to be disposed within a first section and a second section of the rotatable food basket. The first basket portion may include a first handle slot, and the second basket portion may include a second handle slot. The first handle slot and the second handle slot are configured to receive a handle to facilitate removal of the first basket portion and the second basket portion from the rotatable food basket.

In accordance with various embodiments, the hood of the cooking device comprises a motor gear that includes a plurality of teeth configured to receive a motor key on a central shaft of the rotatable food basket. The motor key may be configured to automatically seat with the plurality of teeth in the motor gear via an electromagnetic coupling in response to an instruction from a microprocessor controller, and the motor gear, the plurality of teeth, the motor, and the motor key are interoperable to facilitate rotating the rotatable food basket.

The cooking device, in accordance with an aspect of the present invention, further includes a cooking vessel disposed within the cooking device, with the rotatable food basket being disposed within the cooking vessel. The cooking vessel is configured to hold a cooking liquid. The damping mechanism may comprise an energy absorbing device disposed between the cooking vessel and a frame of the cooking device. The energy absorbing device may include a spring disposed between the frame and at least one of a side and a bottom of the cooking vessel. In an embodiment, the energy absorbing device includes an energy absorbing material configured to be operable in a heated environment and in conjunction with the cooking liquid.

In an embodiment, the cooking device includes a frame configured to receive the cooking vessel, and the damping mechanism includes an energy absorbing device disposed between the frame and a surface external to the cooking device. A drive mechanism may be coupled to the rotatable food basket to facilitate rotating the rotatable food basket, and the damping mechanism may be coupled to the drive mechanism to reduce the vibration generated by the rotatable food basket rotating within the cooking device.

BRIEF DESCRIPTION OF THE DRAWINGS

The subject matter of the present invention is particularly pointed out and distinctly claimed in the concluding portion of the specification. The invention, however, both as to structure and method of operation, may best be understood by reference to the following description taken in conjunction with the claims and the accompanying drawing figures, in which like parts may be referred to by like numerals.

DETAILED DESCRIPTION

Figure 1:
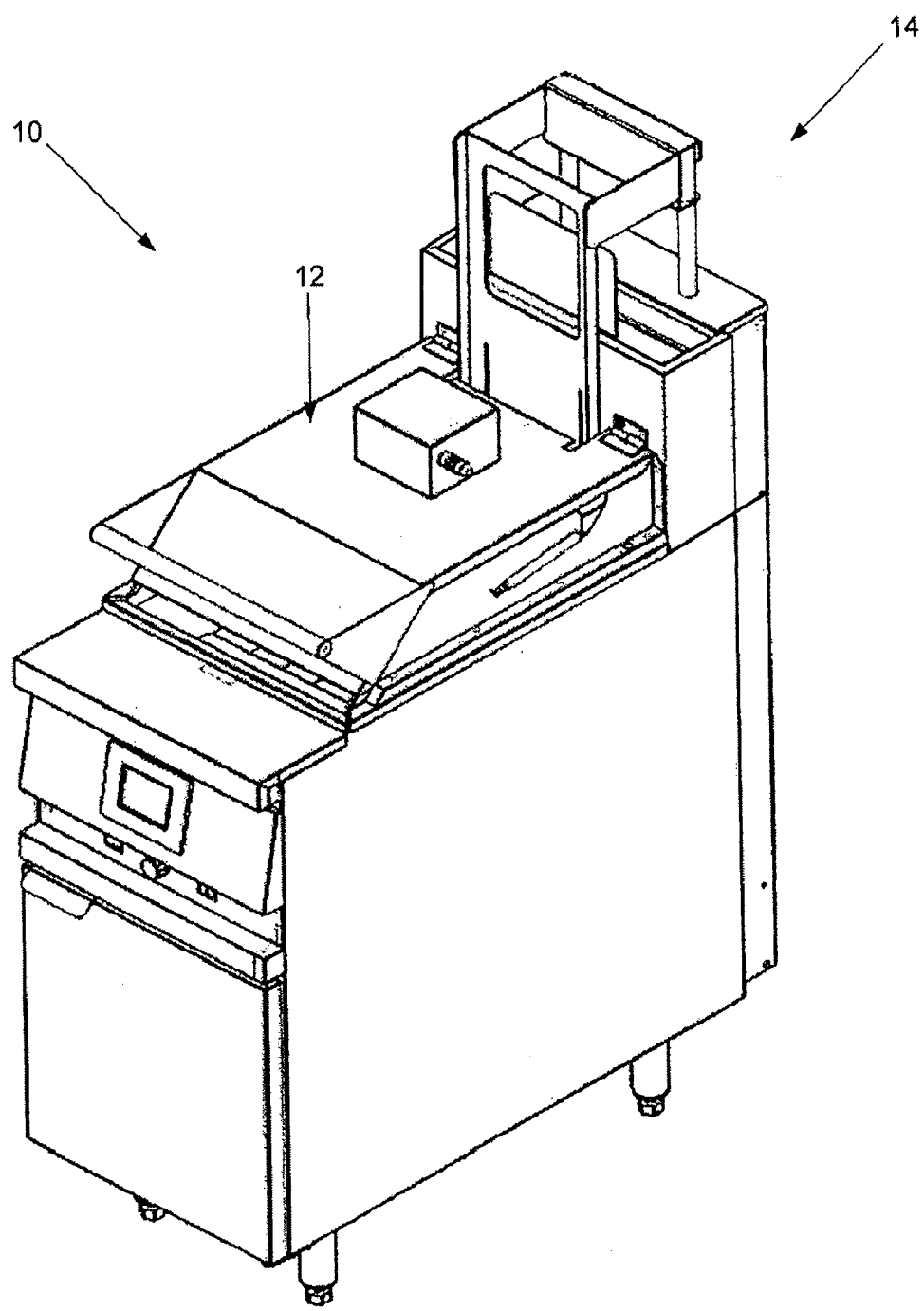
FIG. 1 illustrates a perspective view of a cooking device according to an embodiment of the present invention.

The detailed description herein makes use of various embodiments to assist in disclosing the present invention. While these embodiments are described in sufficient detail to enable those skilled in the art to practice the invention, it should be understood that other embodiments may be realized and that modifications of structures, arrangements, applications, proportions, elements, materials, or components used in the practice of the present invention, in addition to those not specifically recited, can be varied or otherwise particularly adapted to specific environments, manufacturing specifications, design parameters or other operating requirements without departing from the scope of the present invention and are intended to be included in this disclosure. Thus, the detailed description herein is presented for purposes of illustration only and not of limitation.

In accordance with various embodiments of the present invention, systems, methods and apparatuses for cooking food and removing liquid content therefrom are disclosed. The food cooking apparatus generally comprises two sections: a cooking section and a liquid removal section. Other embodiments, however, may provide the liquid removal section without providing the cooking section, for example, where an existing cooking device is retrofitted with an apparatus for spinning the cooked food to remove liquid therefrom. The cooking section houses and/or heats liquid for cooking the food, and the liquid removal section is operable to reduce the liquid content of the food. A basket located within the apparatus may be moved between the two sections. Such movement may be accomplished manually or automatically, for example, by a motor and/or controller. In various embodiments, the movement of the basket may be accomplished by lifting the basket or container from the side, bottom or top of the basket, cooking device and/or cover.

According to a further embodiment of the invention, the cooking device provides a method for frying foods which includes removing excess and/or unwanted fat, grease, oil, and the like, and simultaneously maintaining a desirable temperature within the food that is being cooked. The terms "cooking" and "frying" and formatives thereof are used interchangeably herein. Other mechanisms for cooking food besides frying fall within the scope of the present invention, such as boiling, blanching, steaming, poaching, simmering, steeping, and the like. For consistency, "frying" and/or "cooking" will be used throughout without limiting the methods of cooking for use in conjunction with embodiments of the present invention. Similarly, while "cooking device" may be used in this specification, it should be understood that any device capable of cooking and/or removing a liquid from a cooked food, such as a fryer device, is contemplated within the scope of the invention.

Additionally, in certain embodiments of the invention, water may be used in place of cooking oil in order to boil, poach, blanch, steam, or otherwise cook certain foods, such as pasta and vegetables. The foods are housed within the basket and cooked in heated water (or exposed to steam) from the water section, where the water section takes the place of the oil section. After cooking in the water, the basket is moved to the spinning section where excess water is removed so that the food does not get soggy from the excess water. Spinning and/or agitating the food also aids in preventing the food from sticking to itself. In other embodiments, water may be introduced to the cooking device during the spinning process in order to rinse starches and other products of the boiling process from the boiled food. In other embodiments, mixtures may be used, such as a water and oil mix (such as garlic oil, olive oil, butter or the like). Such foods that may be cooked by this process comprise pasta products and vegetables.

According to various embodiments of the present invention, systems, mechanisms, and methods are disclosed for damping vibration in a cooking device subject to vibratory motions. Although the various damping mechanisms discussed herein may be utilized in connection with any number of cooking devices that comprise spinning, rotating, and/or moving elements, a cooking device according to various embodiments is briefly described in order to facilitate discussion of the damping mechanisms.

In accordance with various aspects of the present invention, a cooking device comprises a basket configured to hold the food to be cooked. The basket may be rotated about a shaft centrally disposed in the basket. The shaft itself may be driven by a motor, or the basket may be driven by a motor, and the shaft may be configured to control the rotation about an axis. In other embodiments, a shaft may not be utilized, and a motor may be configured to rotate the basket via a gear, a bearing, a gasket, or the like configured to rotate the basket.

The basket may be disposed within a basket well that is configured to facilitate raising and lowering the basket into and out of different cooking sections. For example, where the cooking device is a spinning fryer device, one section may be the cooking section where the food is cooked in oil, and the other section may be a spinning section where the oil is spun out of the cooked food.

The basket and the basket well may be disposed within a cooking vessel configured to hold the cooking liquid. Various heating elements may be disposed within and/or about the cooking vessel to facilitate heating the cooking liquid. The cooking vessel may be disposed within a body of the cooking device, and a cover may be utilized in connection with the body of the cooking device to form an enclosure within the body of the cooking device and to facilitate maintaining the cooking liquid and the food within the cooking device. The body of the cooking device may have feet to facilitate locating the cooking device in a particular location, such as on a counter or on a kitchen floor.

Figure 2:
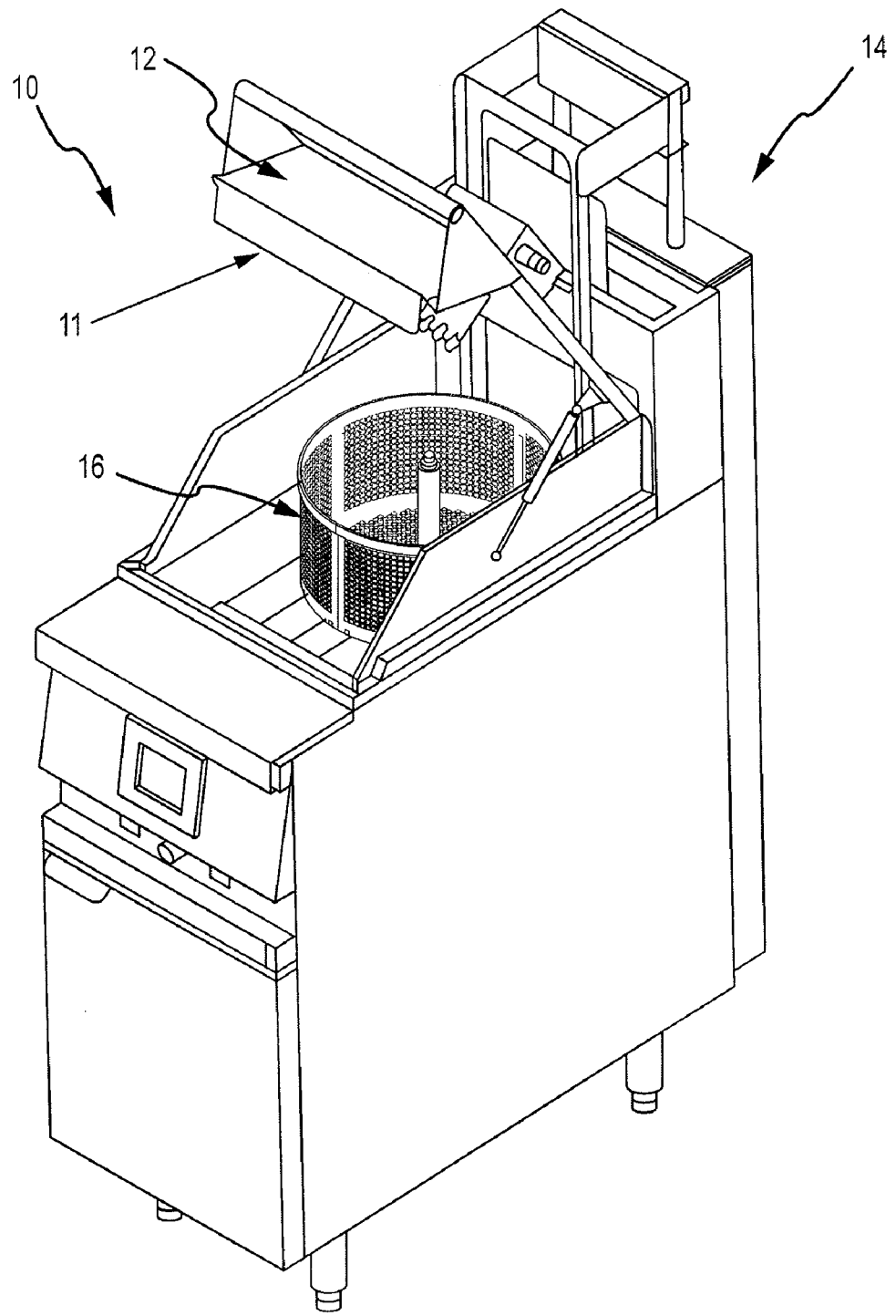
FIG. 2 illustrates a perspective view of a cooking device with an open cover according to an embodiment of the present invention.

Although it should be understood that cooking devices of various configurations are contemplated within the scope of the present invention, an exemplary embodiment is disclosed to illustrate various aspects of the invention. FIG. 1, for example, illustrates a fryer device 10 that comprises a hood 12 and a lifting mechanism 14. Hood 12 is configured to enclose a cooking section where food is cooked, and a spinning section and/or liquid removal section where a liquid such as oil is removed from the cooked food. With reference to FIG. 2, fryer device 10 may be configured to house a basket 16 that holds the food to be cooked, and lifting mechanism 14 may be configured to move basket 16 between the cooking section and the liquid removal section.

Figure 3:
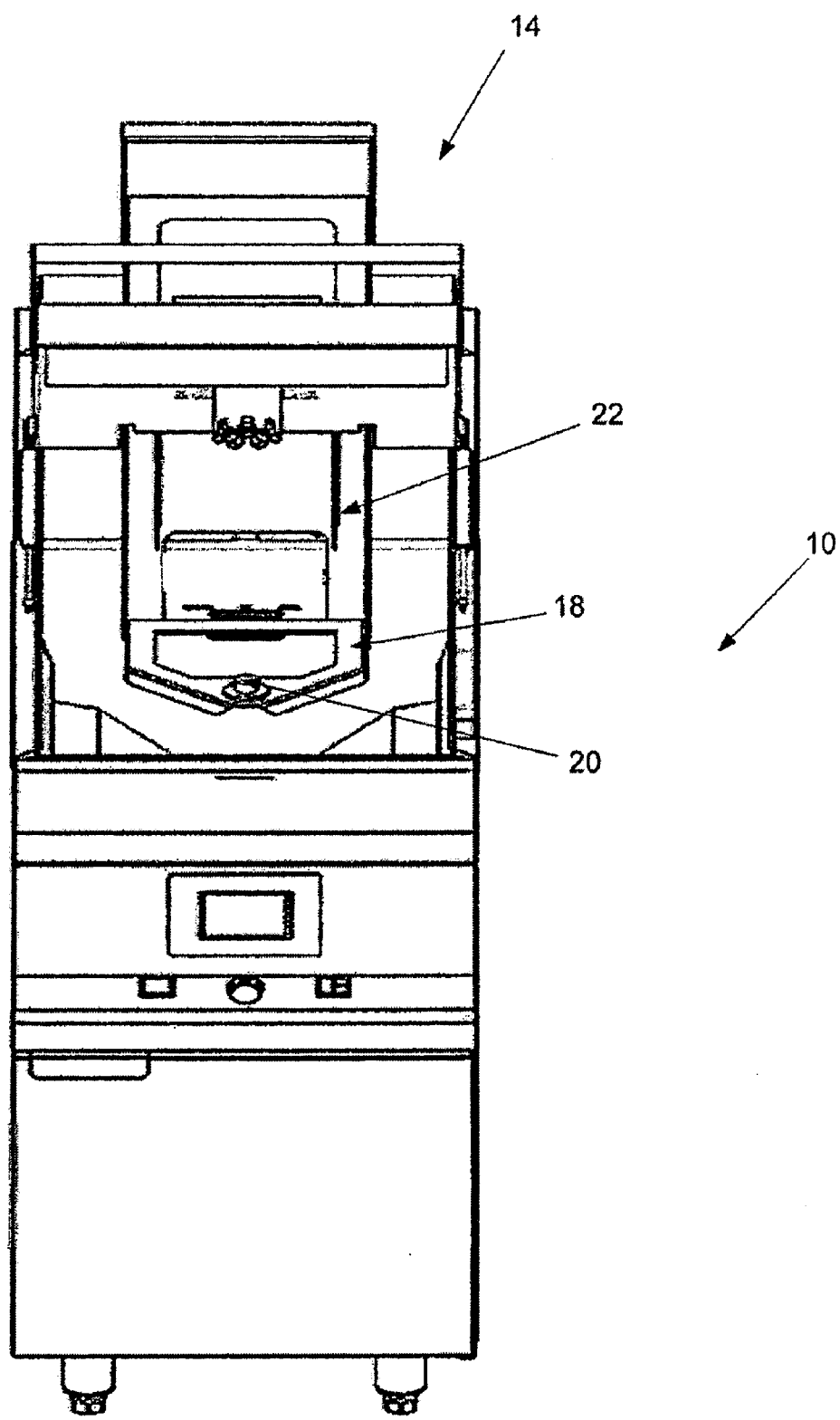
FIG. 3 illustrates a front view of a cooking device according to an embodiment of the present invention.
Figure 7:
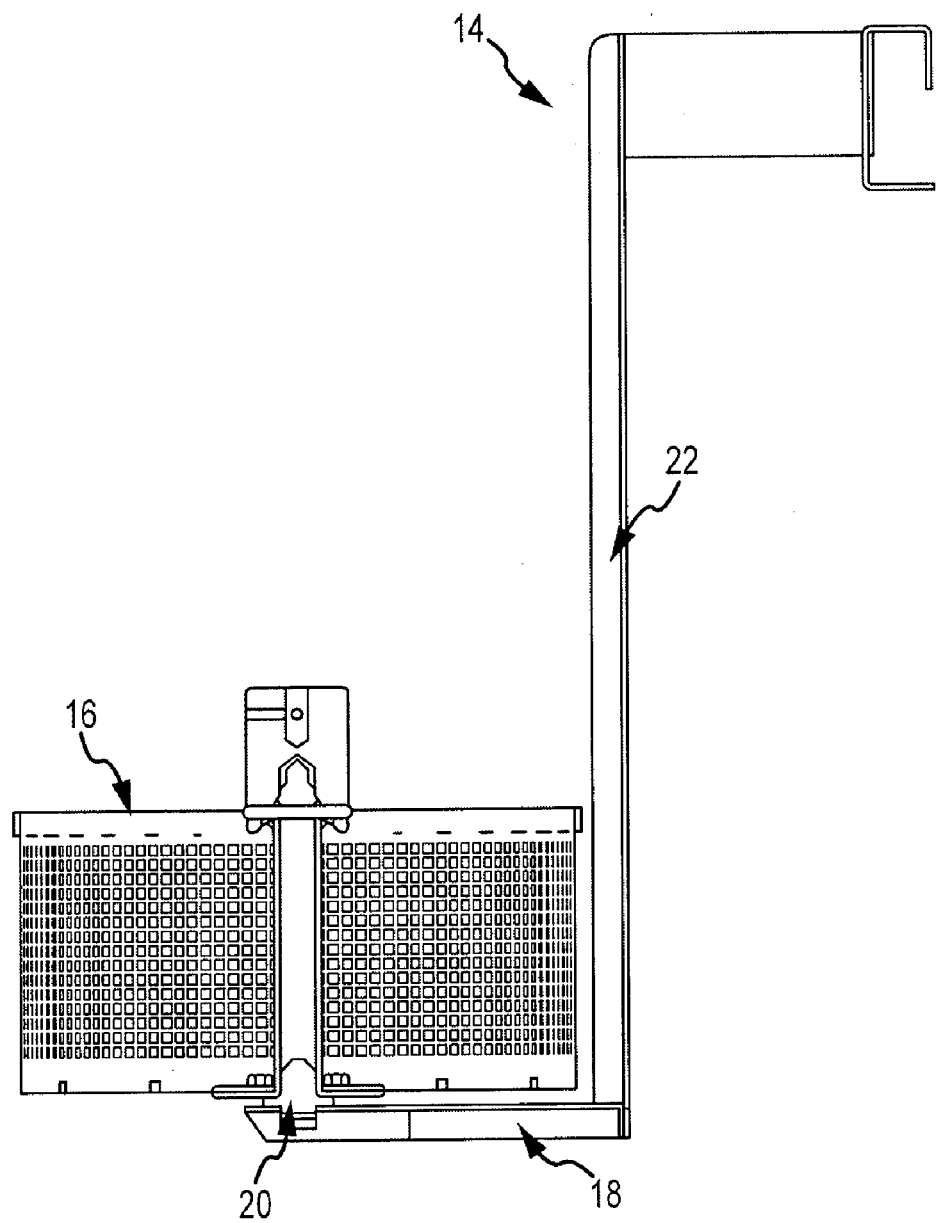
FIG. 7 illustrates a side view of a basket and a lifting mechanism according to an embodiment of the present invention.

In accordance with a further embodiment, and with reference to FIGS. 3 and 7, lifting mechanism 14 comprises a lifting arm and/or arms 22 configured to raise and lower lifting plate 20. As illustrated in FIGS. 4-7, lifting plate 18 may comprise a spindle 20 configured to facilitate locating basket 16 on lifting plate 18. Lifting plate 18 and lifting arms 22 are configured to facilitate moving basket 16 between the cooking and liquid removal sections of fryer device 10. The lifting plate 18 and/or lifting arms 22 may include bearings or a frame mounted on bearings and/or gear(s) in such a way as to allow the food basket to spin or rotate. In an embodiment, lifting plate 18 and/or lifting arms 22 are detachable from each other and/or from the cooking device or the lifting mechanism. Removal of lifting plate 18 and/or lifting arms 22 may facilitate cleaning of the cooking device.

Figure 4:
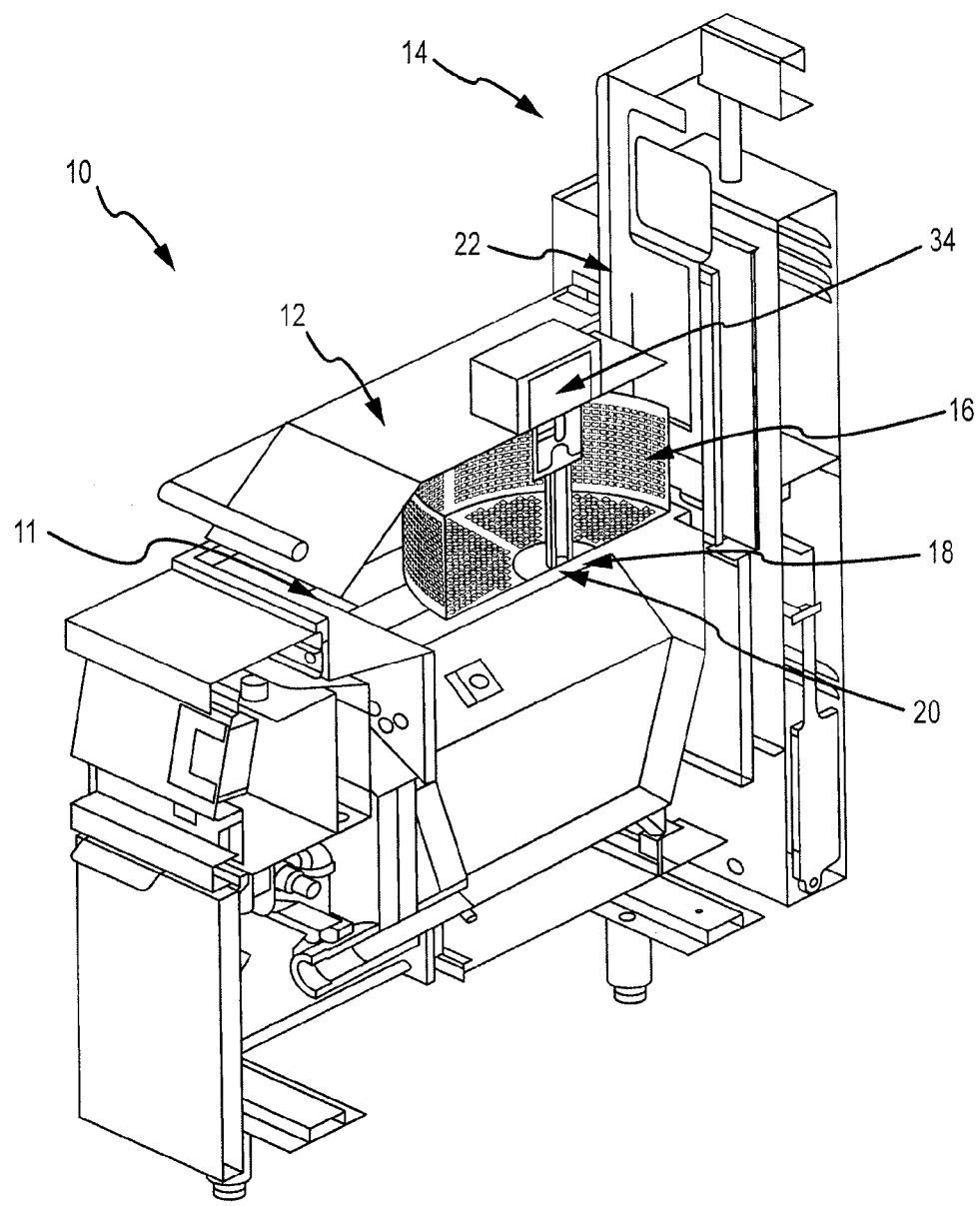
FIG. 4 illustrates a sectional perspective view of a cooking device according to an embodiment of the present invention.
Figure 5:
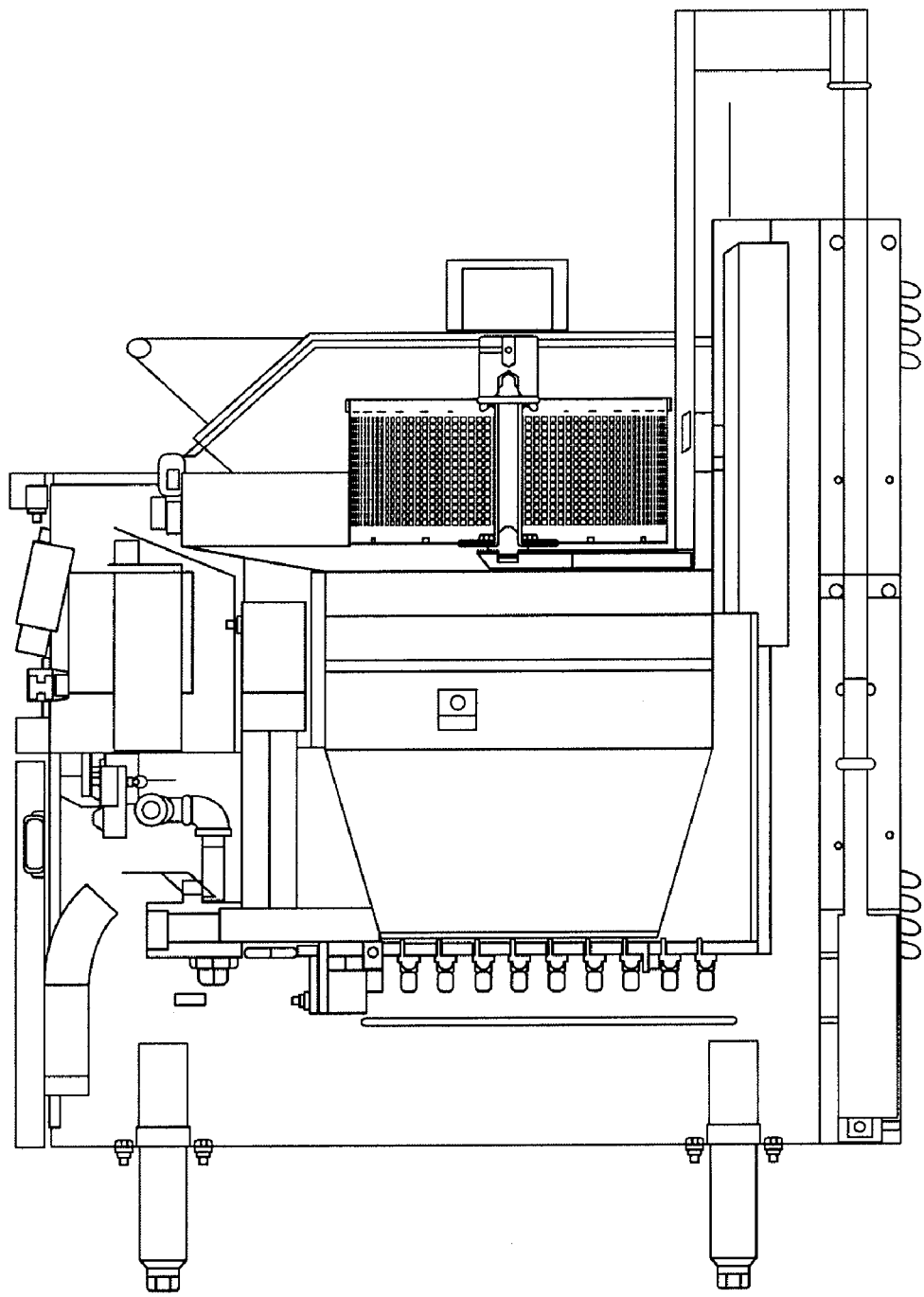
FIG. 5 illustrates a sectional side view of a cooking device according to an embodiment of the present invention.
Figure 6:
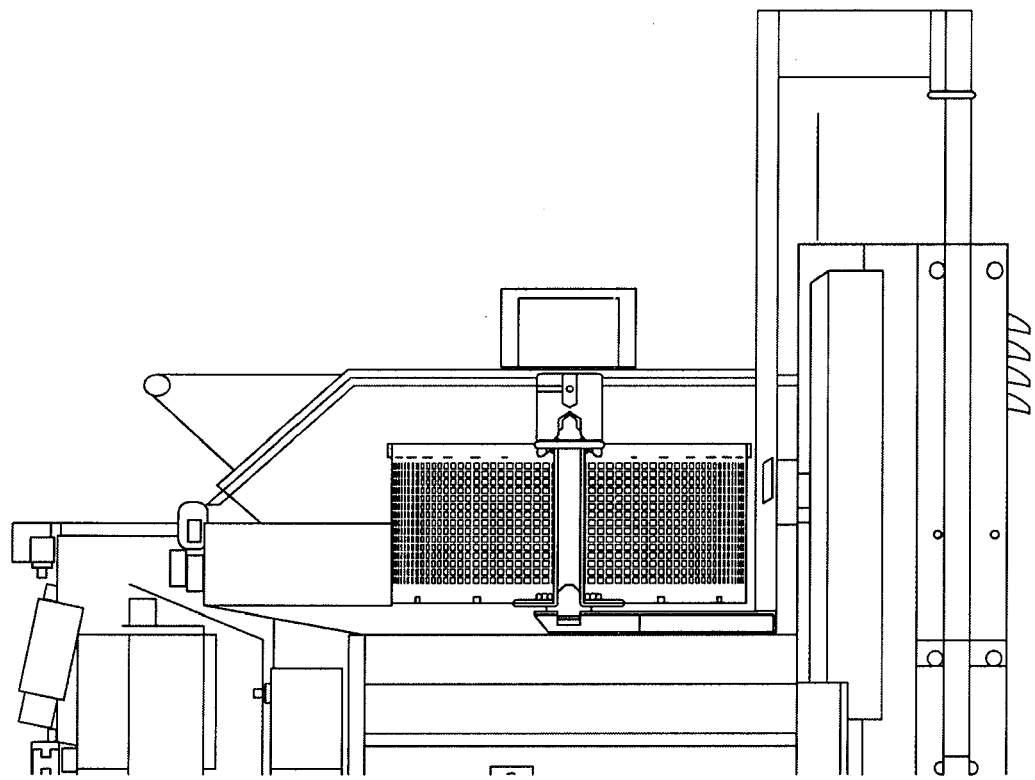
FIG. 6 illustrates a partial, sectional side view of a cooking device according to an embodiment of the present invention.
Figure 8:
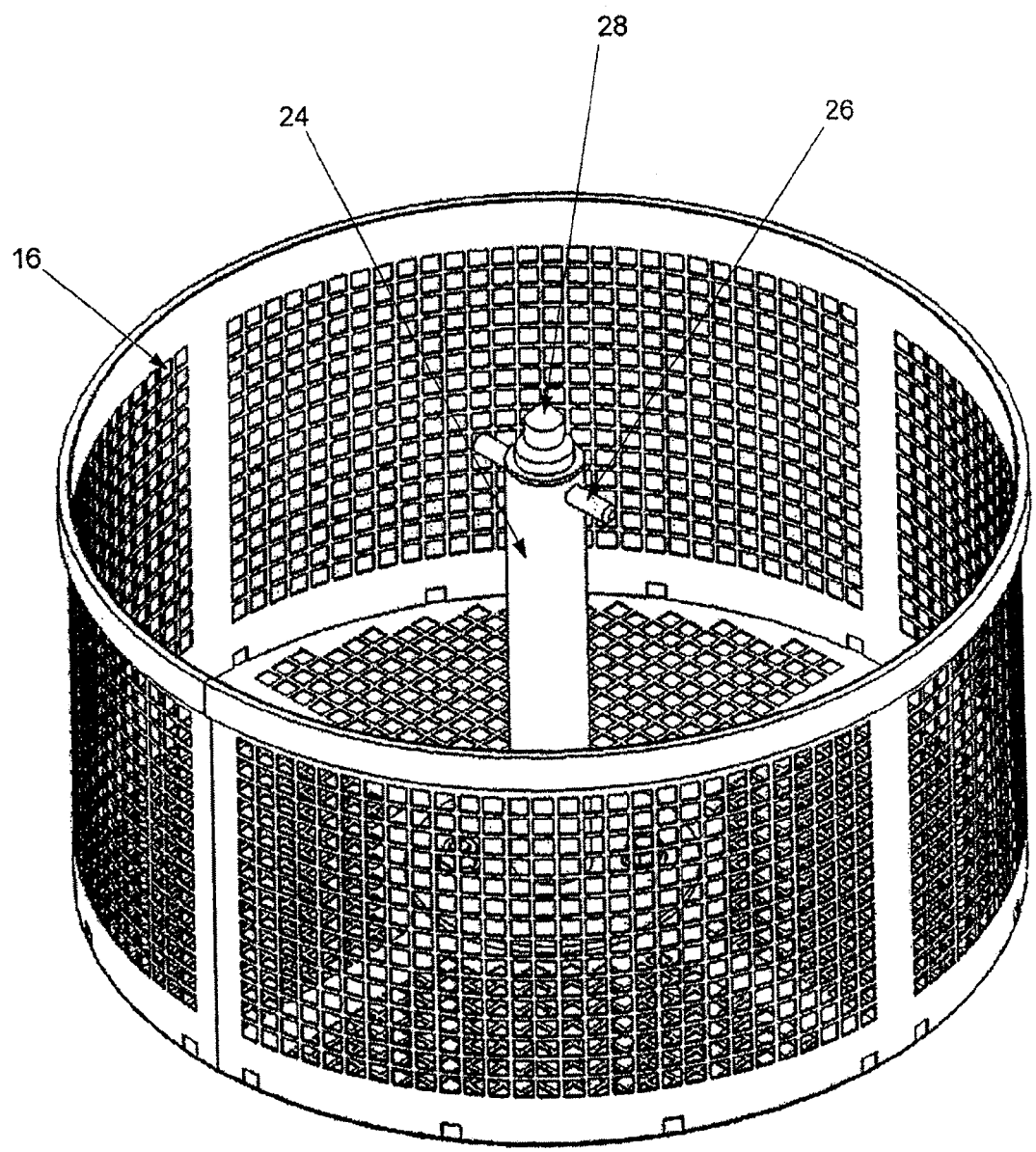
FIG. 8 illustrates a perspective view of a basket according to an embodiment of the present invention.
Figure 9:
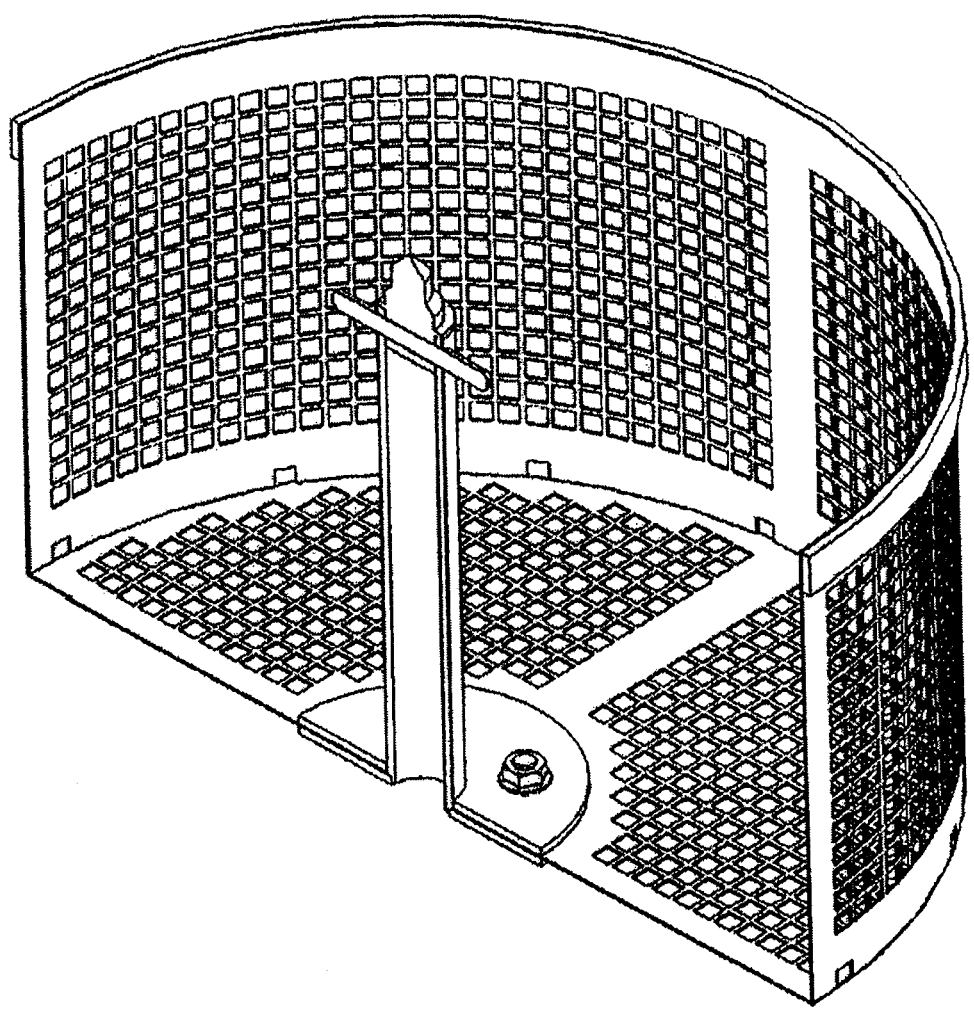
FIG. 9 illustrates a sectional perspective view of a basket according to an embodiment of the present invention.
Figure 10:
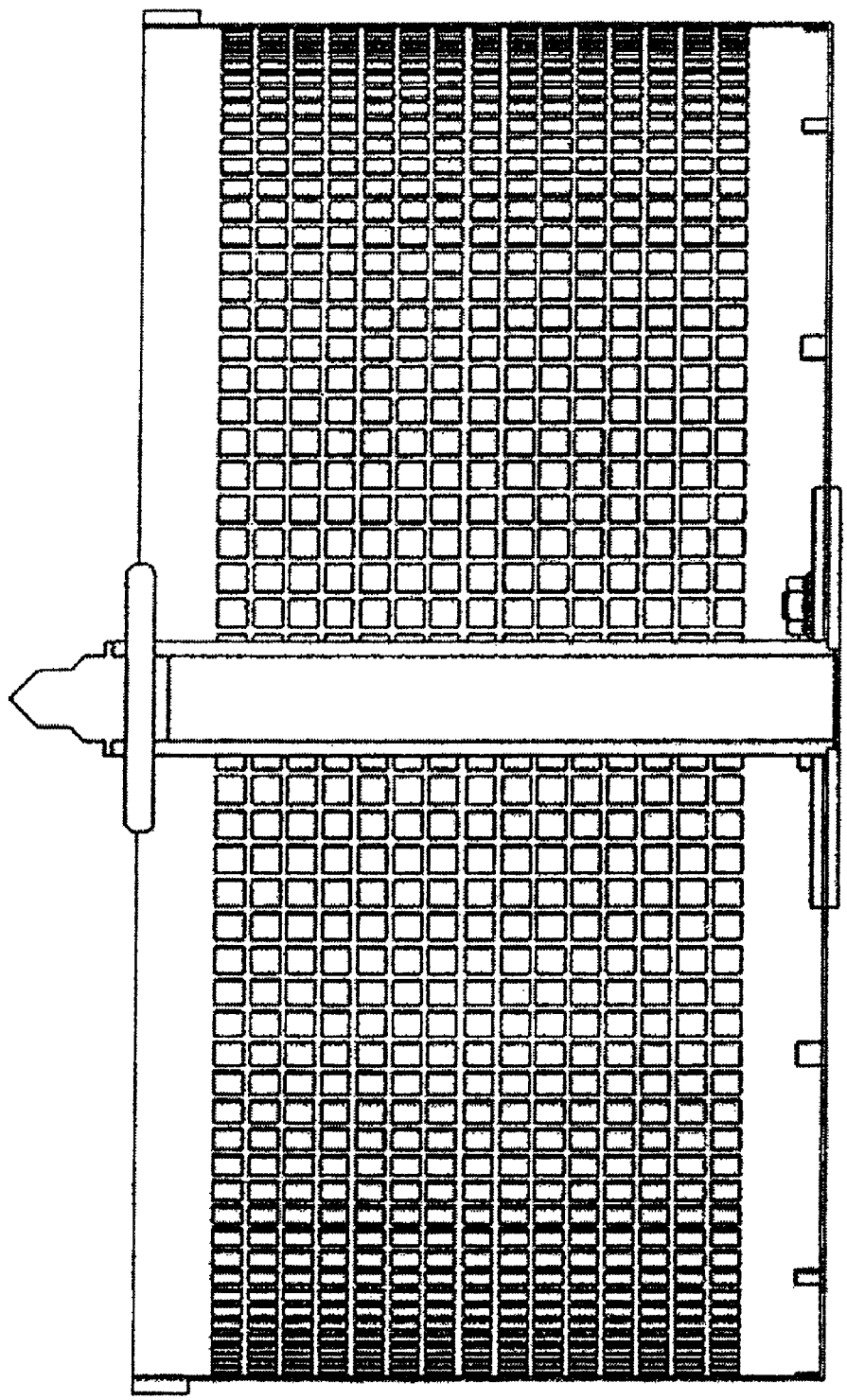
FIG. 10 illustrates a side view of a basket according to an embodiment of the present invention.

Basket 16, according to various embodiments, comprises a central shaft 24, a motor key 26, and motor spindle 28, for example, as illustrated in FIGS. 8-10. Motor spindle 28 and motor key 26 may be configured to interface with a motor gear 30 that is driven by a motor 34 in the hood 12 of cooking device 10 (see, for example, as illustrated in FIG. 4). Motor gear 30 may comprise a plurality of teeth 32 configured to facilitate spinning basket 16 when basket 16 is in the spinning and/or liquid removal section. For example, as basket 16 moves from the cooking section to the spinning section, motor key 26 causes basket 16 to rotate in one direction about spindle 20 to facilitate locating motor key 26 within a groove created by the plurality of teeth 32. Thus, in an exemplary embodiment, motor key 26 in conjunction with the plurality of teeth 32 facilitates automatic seating of motor key 26 with motor gear 30. For example, in an embodiment, the plurality of teeth 32 are configured to cause basket 16 to rotate in a counter-clockwise manner when basket 16 is raised into the spinning position, and the plurality of teeth are configured to cause basket 16 to rotate in a clockwise direction when motor 34 causes motor gear 30 to rotate. Motor 34 may cause motor gear 30 to rotate, and motor key 26 then transmits the rotary motion to shaft 24 and basket 16.

According to an embodiment, motor key 26 and motor gear 30 are configured to automatically engage to facilitate spinning basket 16. For example, an electromagnetic coupling between motor key 26 and motor gear 30 may be configured to secure motor key 26 within teeth 32 of motor gear 30. When basket 16 is raised such that motor key 26 engages motor gear 30, a current may automatically or manually flow through a circuit to create an electromagnetic coupling between motor key 26 and motor gear 30 and/or teeth 32.

It should be understood that although particular lifting mechanisms and rotating mechanisms have been disclosed herein, other lifting and rotating mechanisms are contemplated within the scope of the present invention. For example, PCT Application No. PCT/US2009/040451 discloses various lifting and rotating mechanisms, and the entirety of PCT/US2009/040451 is hereby incorporated herein by reference.

Figure 28:
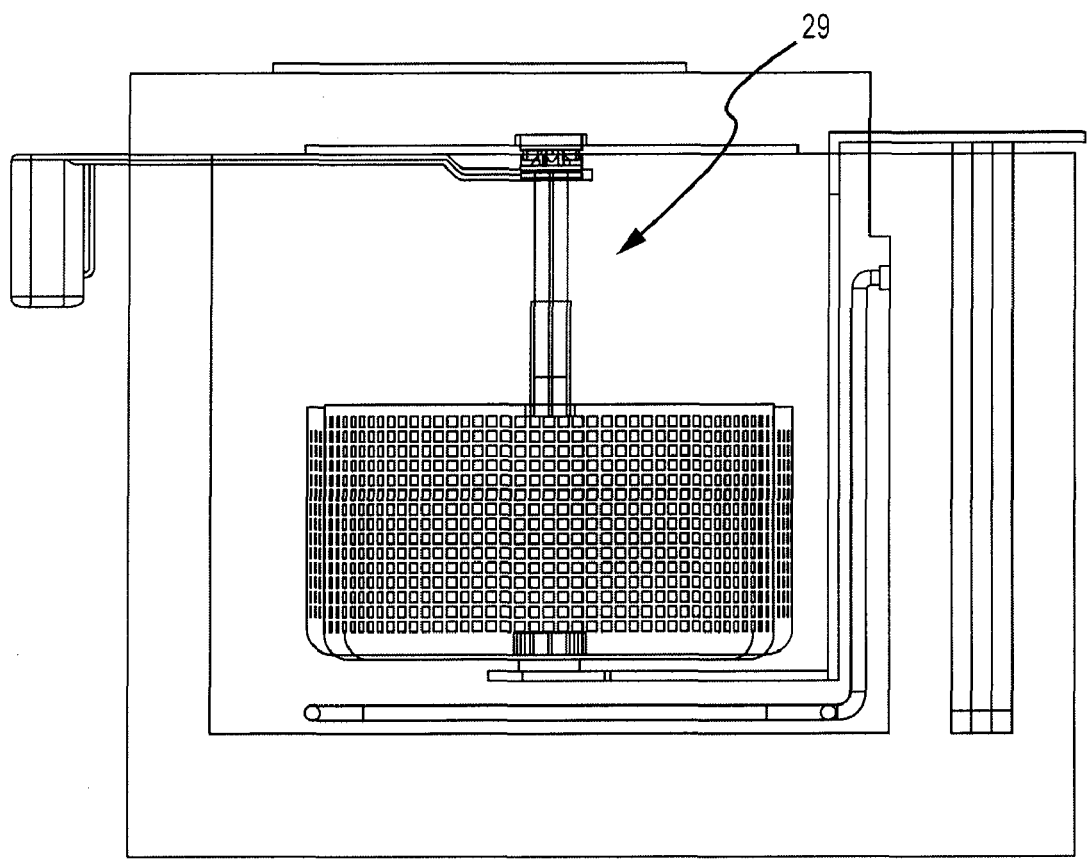
FIG. 28 illustrates a side view of a cooking device with a telescoping shaft according to an embodiment of the present invention.
Figure 29:
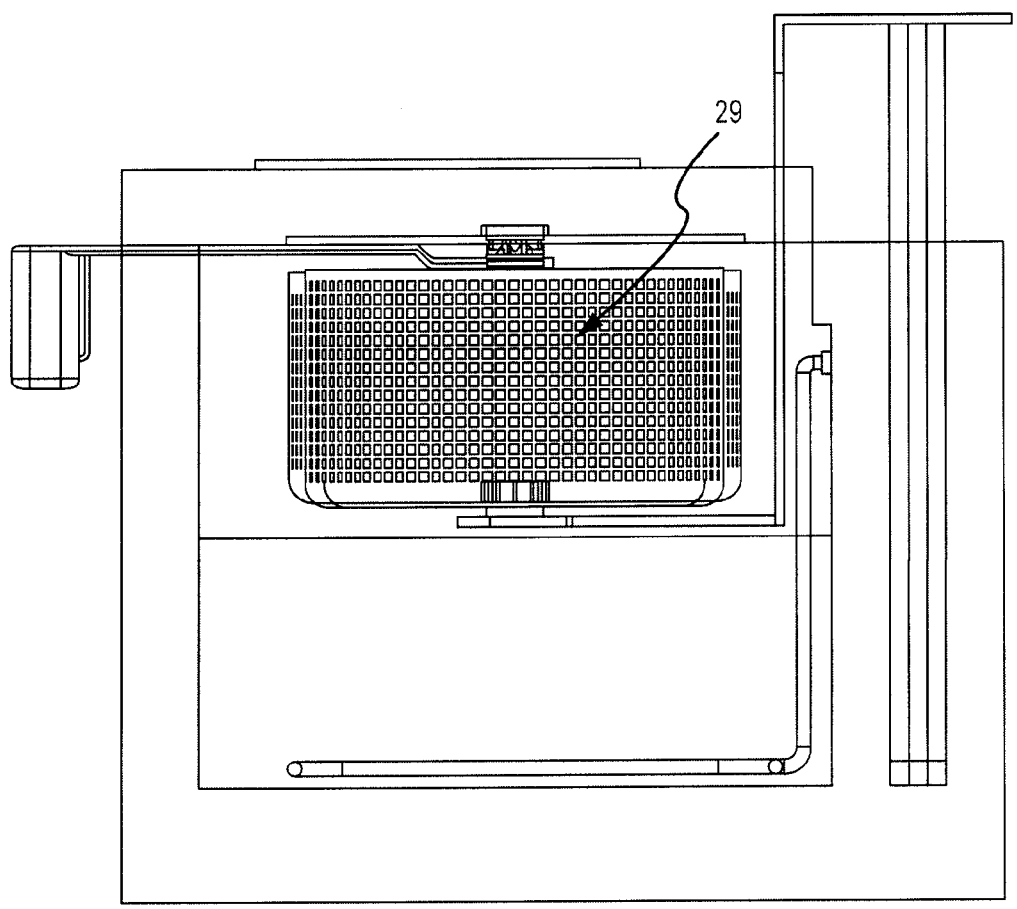
FIG. 29 illustrates a side view of a cooking device with a telescoping shaft according to another embodiment of the present invention.

Embodiments of the present invention include various mechanisms for rotating basket 16 in a cooking section and/or in a liquid removal section. For example, lifting plate 18 may include a motor, gear, drive mechanism and the like for rotating basket 16 in the cooking section, such as in the oil in a frying device. In other embodiments, for example, as illustrated in FIGS. 28-29, the cooking device may include a telescoping shaft 29 configured to interface with a motor in hood 12 of cooking device 10 while basket 16 is in the cooking section.

Figure 30:
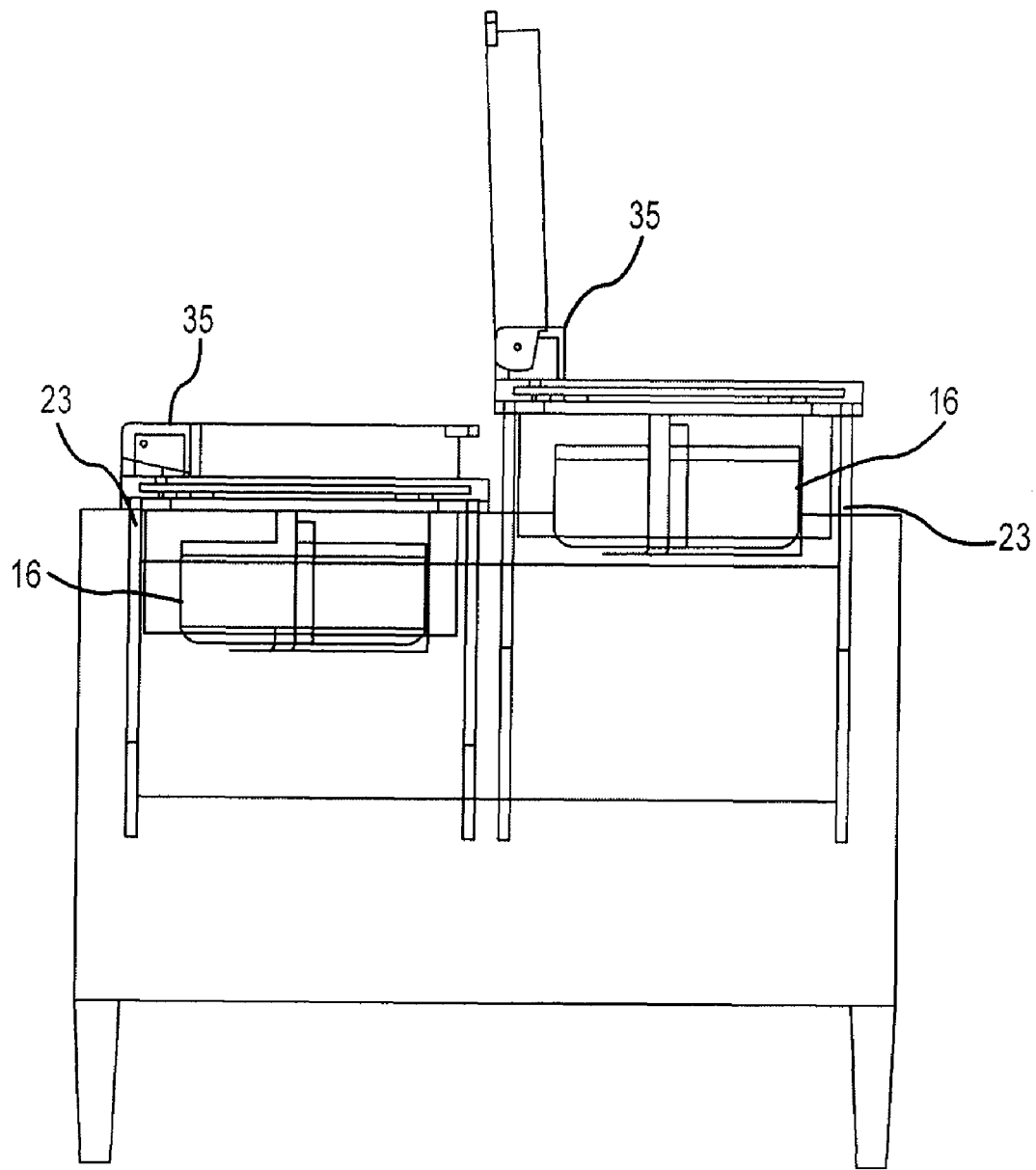
FIG. 30 illustrates a side view of a dual bay cooking device according to an embodiment of the present invention.
Figure 31:
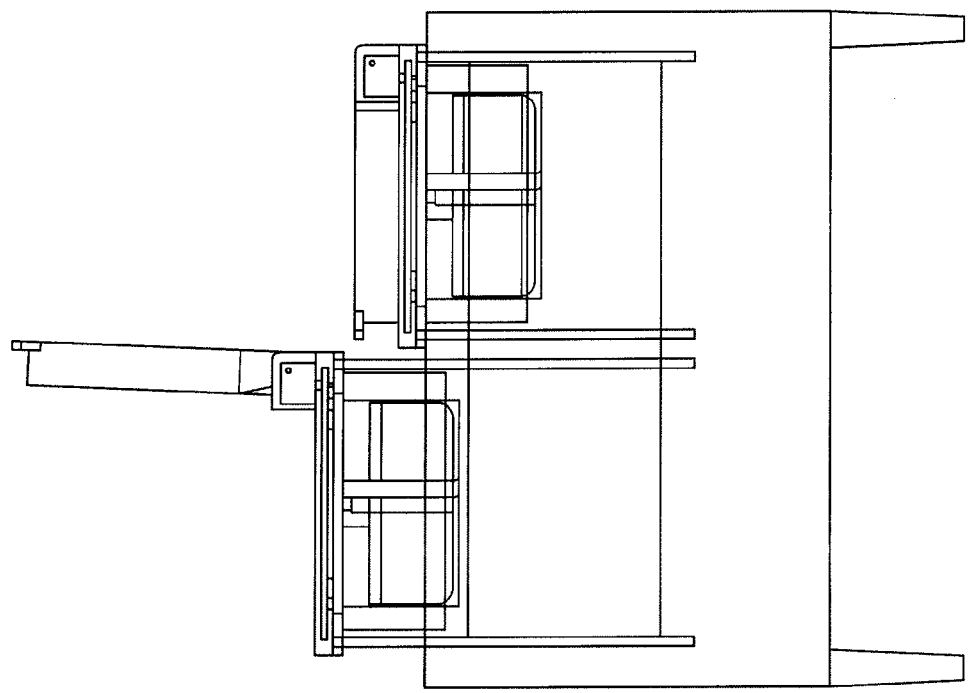
FIG. 31 illustrates a side view of a dual bay cooking device according to another embodiment of the present invention.
Figure 32:
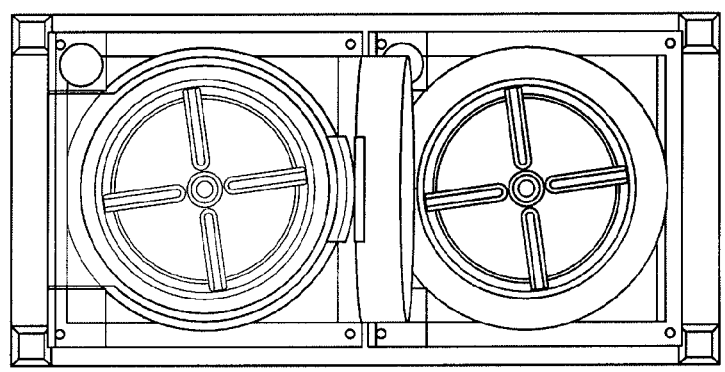
FIG. 32 illustrates a top view of a dual bay cooking device according to an embodiment of the present invention.
Figure 33:
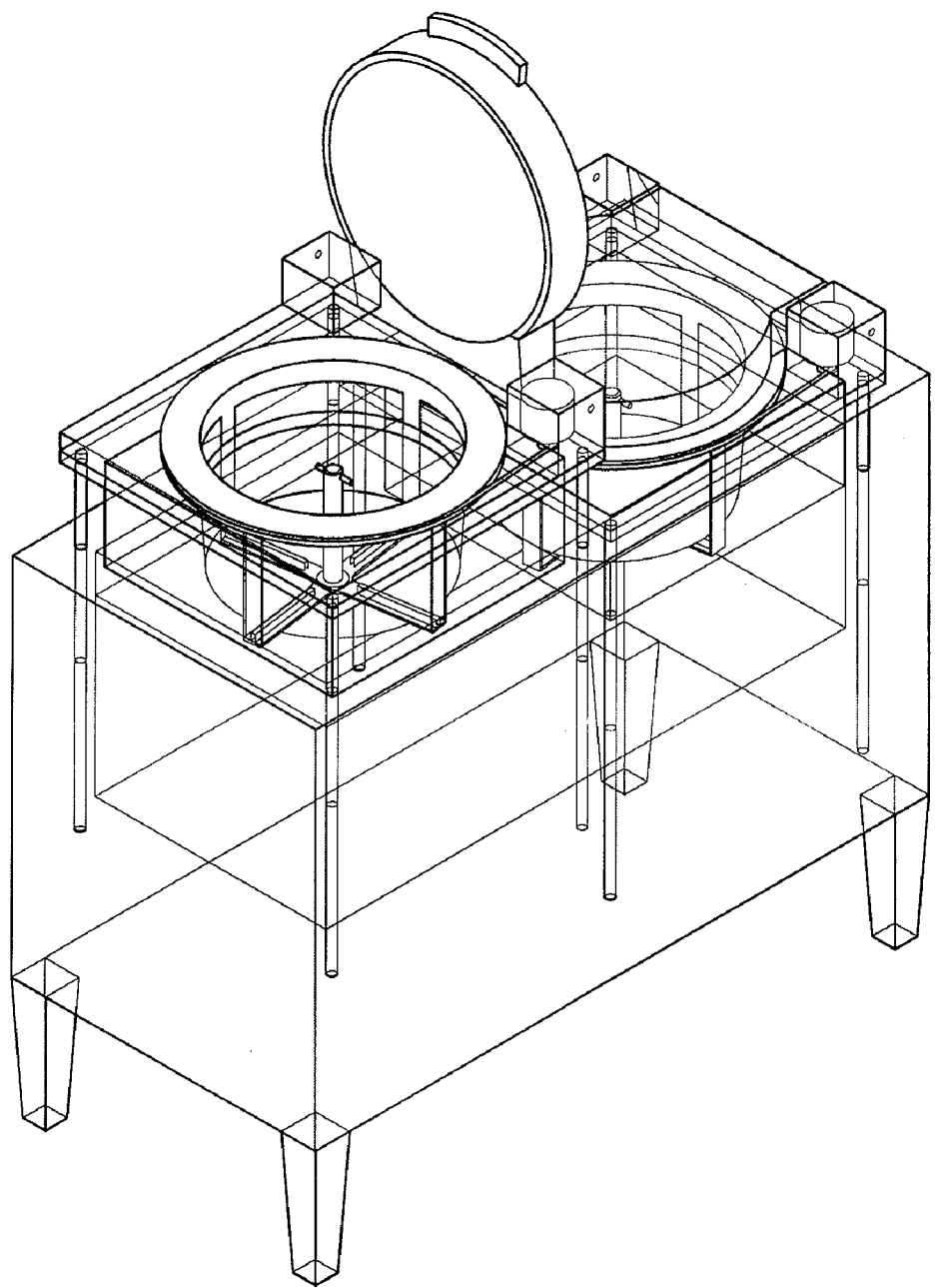
FIG. 33 illustrates a perspective view of a dual bay cooking device according to an embodiment of the present invention.
Figure 34:
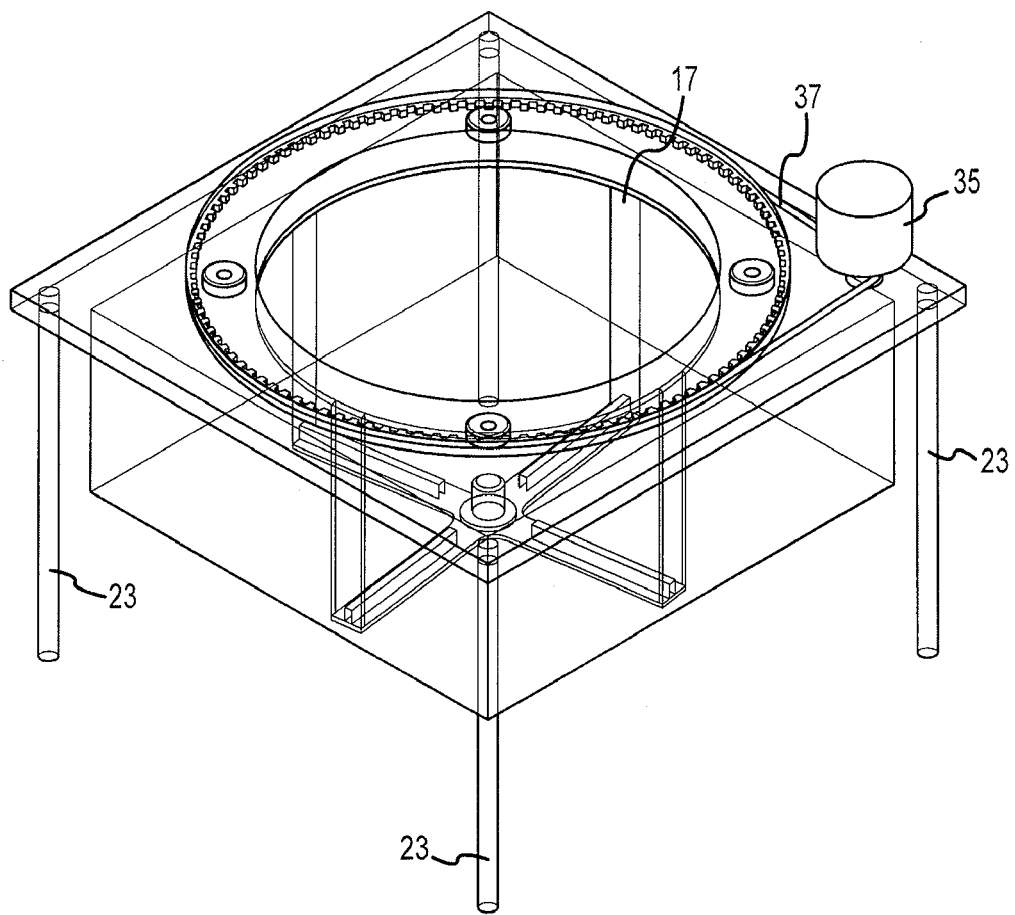
FIG. 34 illustrates a perspective view of a basket frame of a dual bay cooking device according to an embodiment of the present invention.

In further embodiments, for example, as illustrated in FIGS. 30 and 34, a basket rotating mechanism may be configured to move with basket 16, such that basket 16 may be spun both in the spinning section and the cooking section. Basket 16 may be disposed within basket well 17 to provide support to basket 16 and/or to facilitate spinning basket 16. In an embodiment, the cooking device includes a rotational motor 35 configured to drive a belt 37, chain drive, loop, gear and/or the like to facilitate rotating basket 16 and/or basket well 17. Motor 35 and basket 16 and/or basket well 17 are movable between the spinning and cooking sections via guide posts 23. Motor 35 may be a variable and/or constant speed motor configured to provide tailored spinning speed based on food, temperature, cooking liquid, desired cooking outcome, and the like. A motor and threaded gear may be proximate one or more of guide posts 23 and may be configured to raise and lower motor 35 and basket 16 assembly. In further embodiments, other lifting mechanisms may be employed to raise and lower motor 35 and basket 16, for example, lifting mechanisms as noted above.

Figure 35:
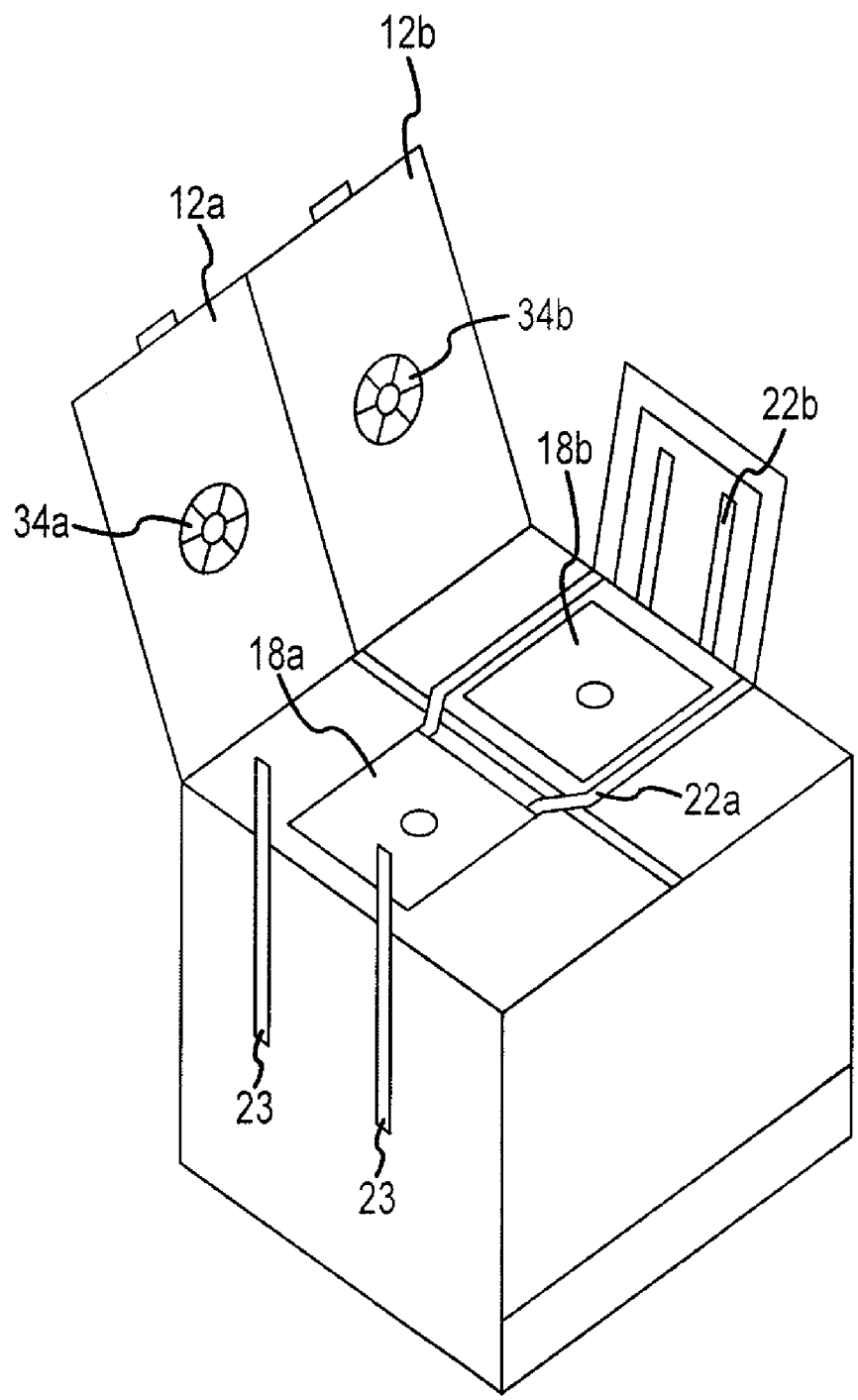
FIG. 35 illustrates a perspective view of a dual bay cooking device and lifting mechanism according to an embodiment of the present invention.

Various embodiments of the invention include multiple means for frying food within the same fryer bay. For example, with continued reference to FIGS. 30-36, multiple baskets 16 may be disposed within the same fryer bay, and these baskets are independently movable between the cooking and spinning sections, independently rotatable, and independently removable from the cooking device. In other embodiments, and with reference to FIG. 35, each basket may have its own lifting plate 18, 18b, and the lifting mechanisms for both baskets are located on one side of the cooking device. Lifting arms 22b are configured to raise and lower lifting plate 18b as discussed above. Lifting arms 22a extend around lifting plate 18b to lifting plate 18a such that lifting plate 18a may be raised and lowered irrespective of the location of lifting plate 18b. Guide posts and/or tracks 23 may be disposed proximate lifting plate 18a and/or lifting plate 18b to facilitate guiding the motion of the lifting plates between the cooking and spinning sections. The cooking device may include a separate cover 12a, 12b and motor 34a, 34b for each of the baskets to facilitate independent operation of each of the baskets.

Figure 36:
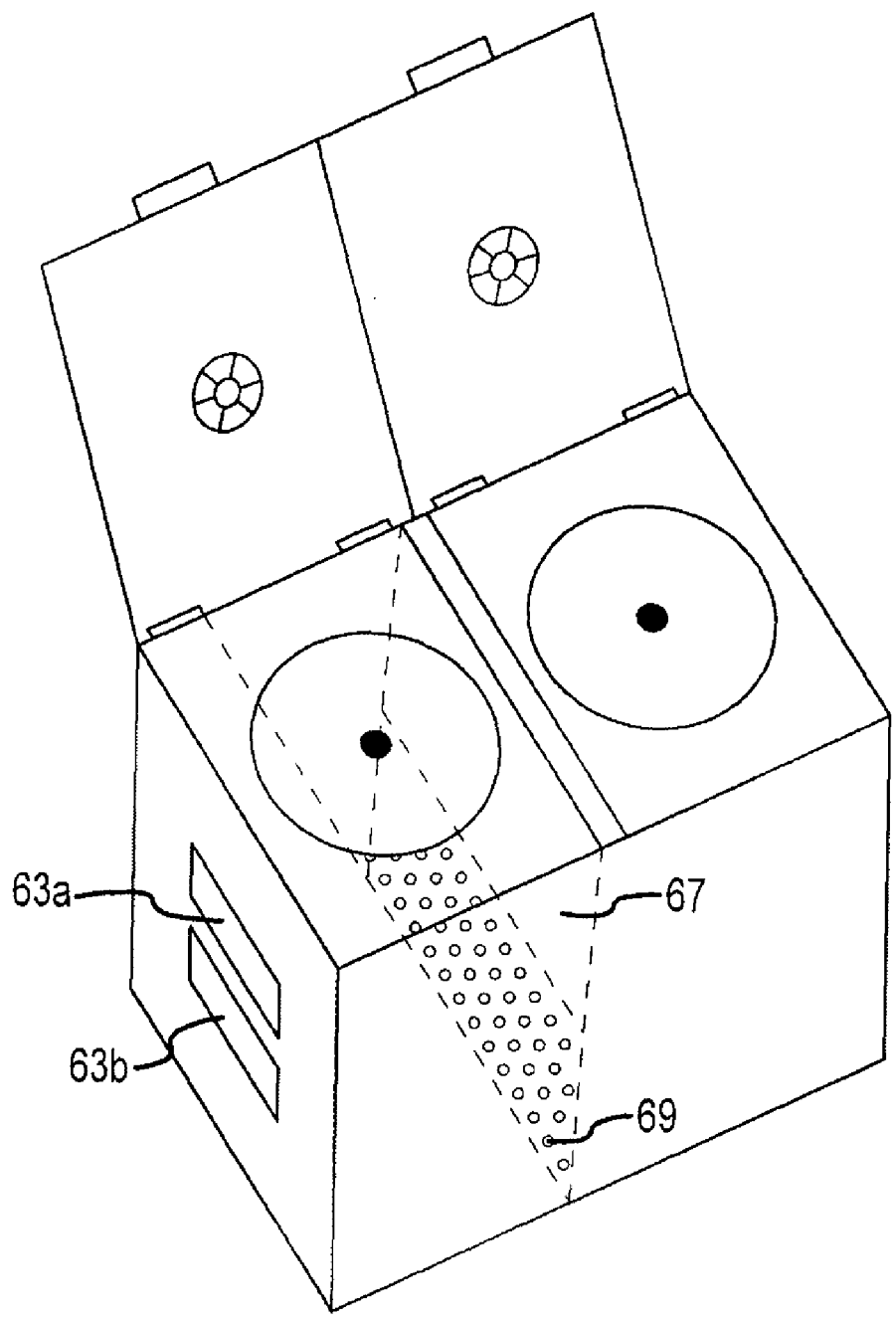
FIG. 36 illustrates a side view of a dual bay cooking device according to an embodiment of the present invention.
Figure 37:
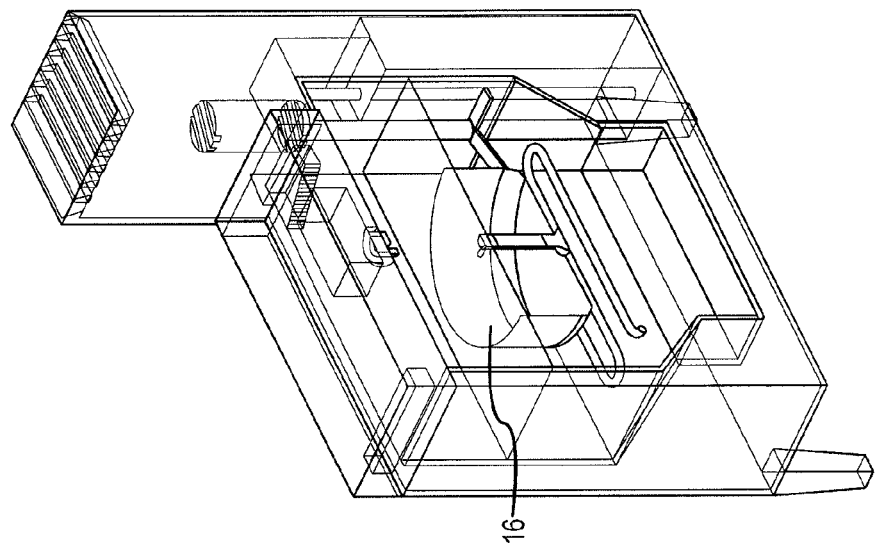
FIG. 37 illustrates a perspective view of a cooking device with a vacuum motor according to an embodiment of the present invention.
Figure 38:
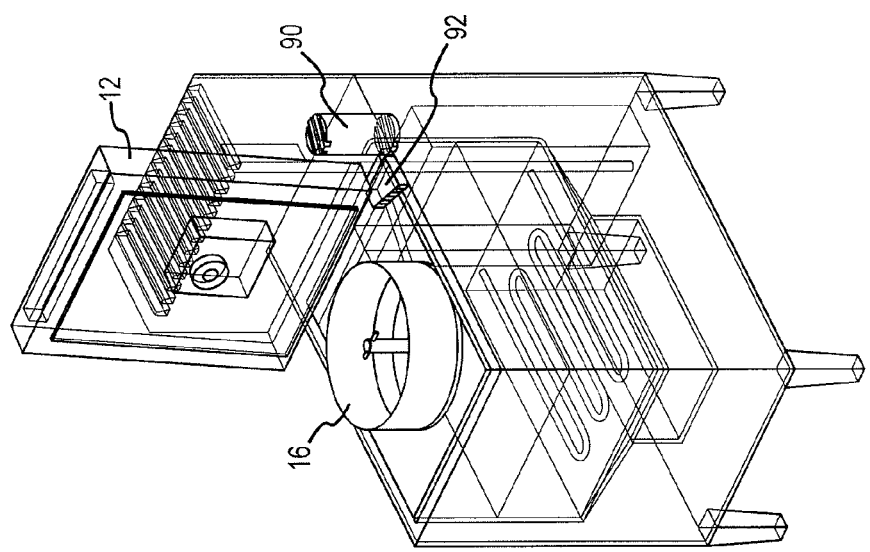
FIG. 38 illustrates a perspective sectional view of a cooking device with a vacuum motor according to an embodiment of the present invention.
Figure 39:
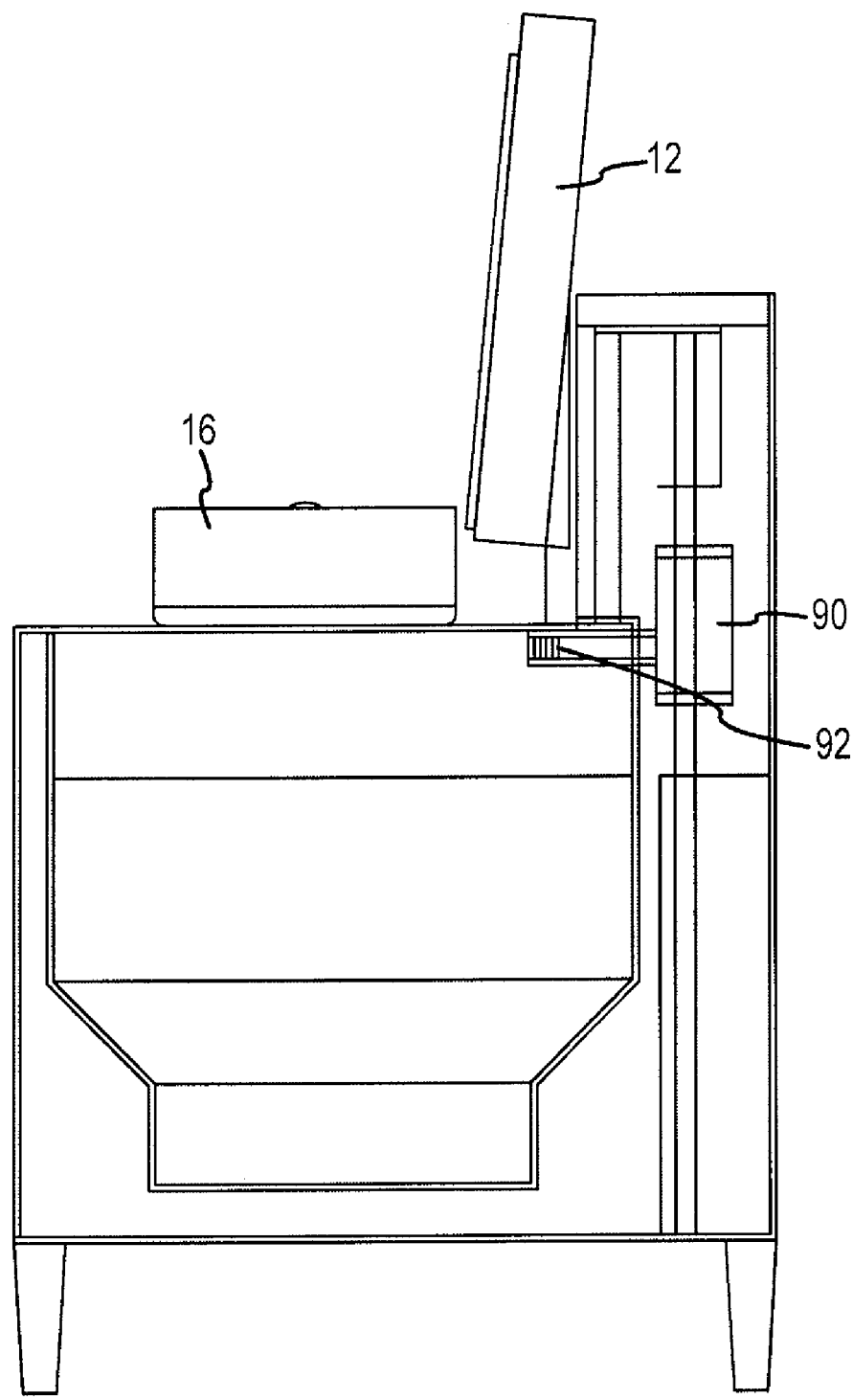
FIG. 39 illustrates a side view of a cooking device with a vacuum motor according to an embodiment of the present invention.
Figure 40:
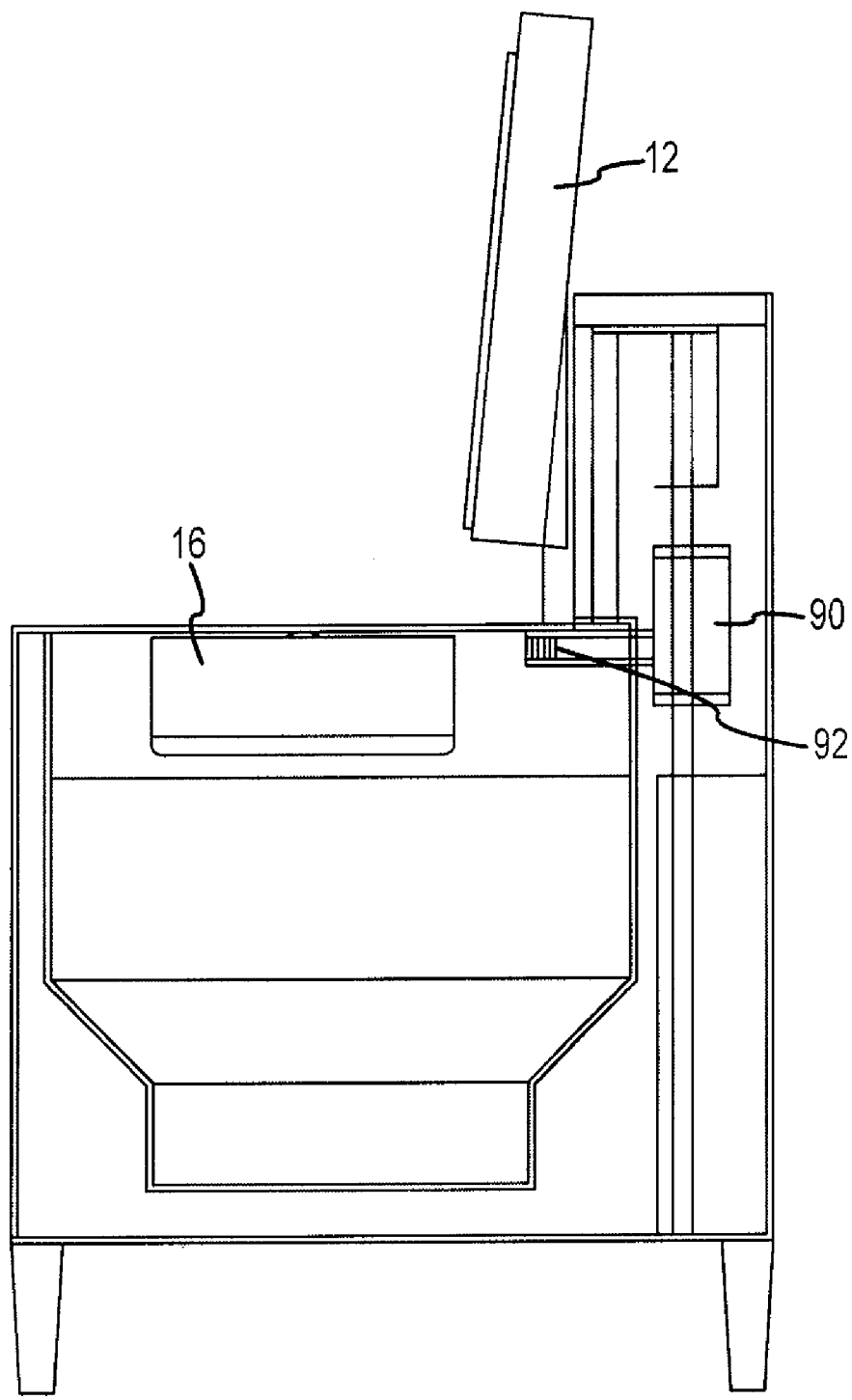
FIG. 40 illustrates a side view of a cooking device with a vacuum motor according to another embodiment of the present invention.
Figure 41:
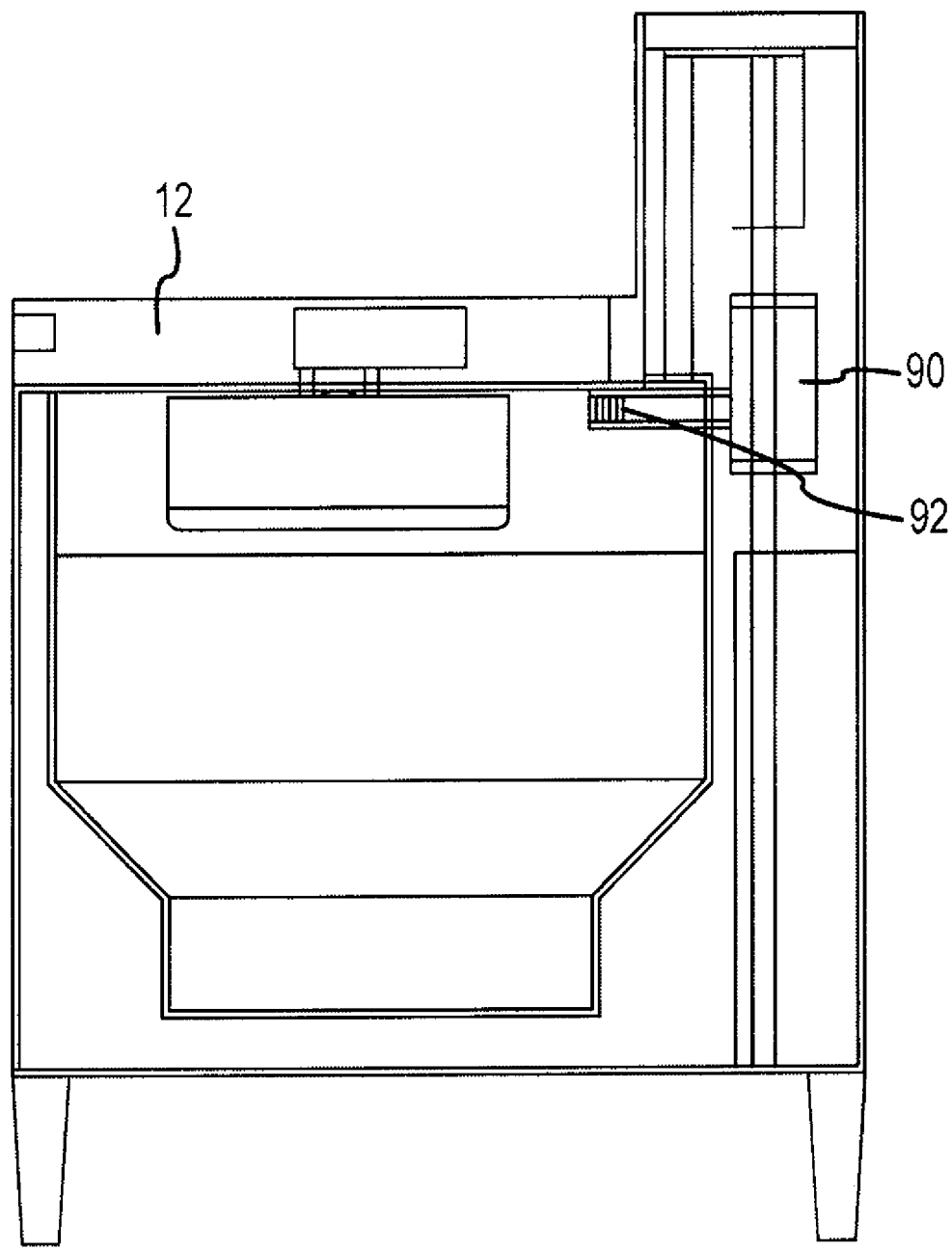
FIG. 41 illustrates a side view of a cooking device with a vacuum motor according to still another embodiment of the present invention.
Figure 42:
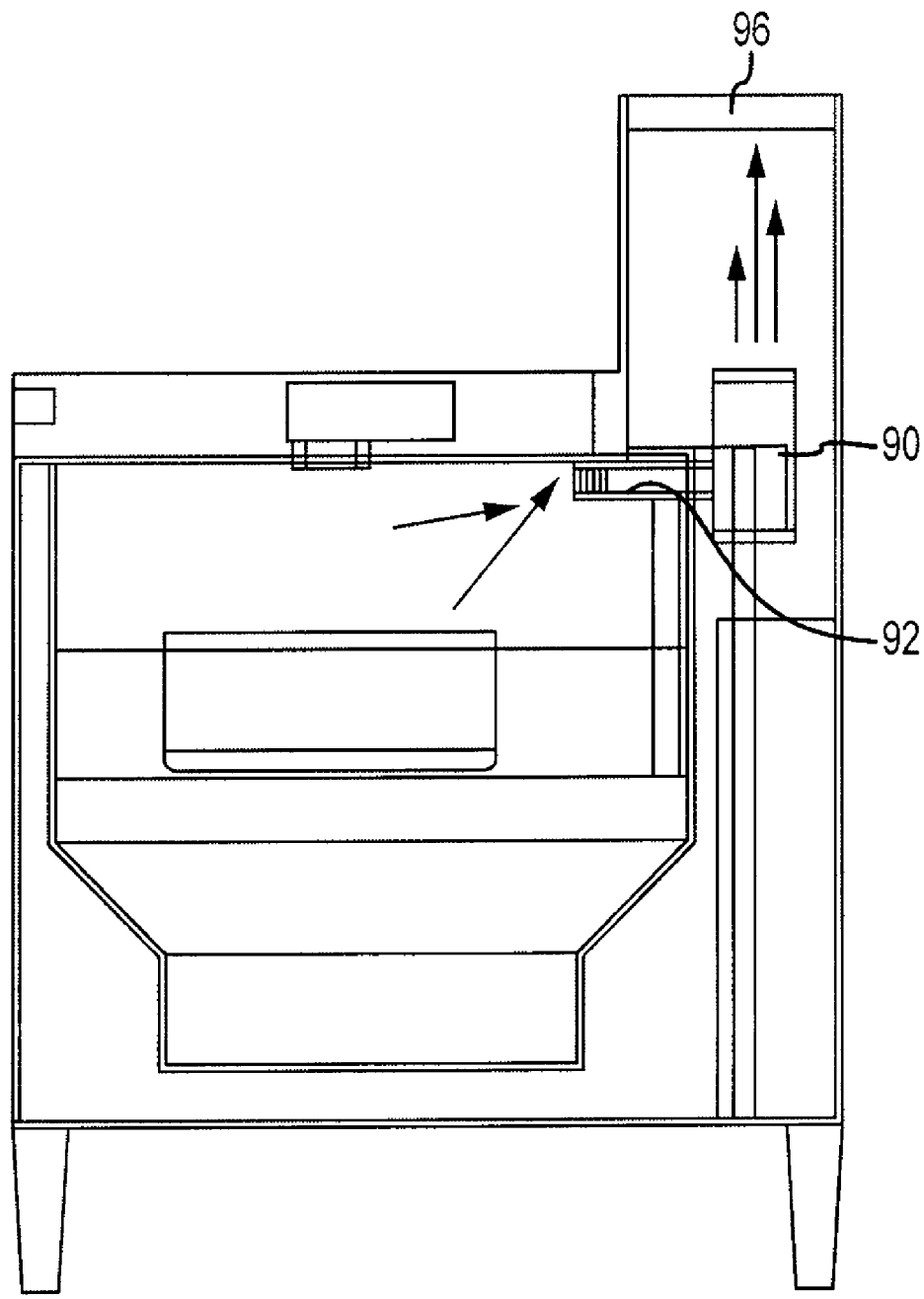
FIG. 42 illustrates a side view of a cooking device with a vacuum motor and a closed lid according to an embodiment of the present invention.

In accordance with a further embodiment, and with reference to FIG. 36, a cooking device with two baskets may include a separating portion between each of the baskets. In the spinning section, for example, a substantially solid plate 67 may be utilized to prevent food particles from one basket being spun into the cooking/spinning section of the other basket. Additionally, in the cooking section, a perforated plate 69 may be utilized to allow the cooking liquid to move between the cooking areas for both baskets, but may prevent migration of larger cooking debris between each of the areas. In other embodiments, perforated plate 69 may not be utilized, and in further embodiments, solid plate 67 may extend through the spinning and cooking sections to facilitate maintaining the cooking liquid separate for each of the baskets. One or more controllers 63a, 63b may be utilized to provide independent, individualized, and/or simultaneous control of each of the baskets.

In accordance with another embodiment, the cooking device may comprise a mister configured to moisten, dampen and/or wet the cooked food after and/or during the spinning process. For example, it may be desirable to add salt and/or other seasonings to a food (e.g., french fries) after the cooking process, but with the reduced cooking liquid content of the cooked food after the spinning process, sufficient liquid may not be present on the surface of the cooked food to allow the seasonings to stick to the food. Therefore, a misting device may distribute an amount of a liquid sufficient to allow the seasoning to adhere to the cooked food. The misting device may be configured to provide the misting liquid at an elevated temperature to facilitate maintaining an elevated temperature of the cooked food. The misting device may be controlled manually and/or automatically, for example, via a microcontroller configured to control various aspects of the cooking device.

Further, according to an embodiment, the cooking device may include different components and/or mechanisms for facilitating cleaning the cooking device. For example, a removable shield may be disposed along the internal sides of the cooking device (e.g., within a bay of a fryer), or the shield may be a cylindrical shield disposed a certain distance from the rotating food basket. These shields may be removed so that food and/or oil residue may be cleaned from the surfaces. Additionally, in another embodiment, a gutter may be disposed along the internal sides of the cooking device such that the gutter is configured to catch oil and/or food particles that are spun off the food during the spinning process. The gutter may reduce debris deposited in the cooking liquid by catching the debris. The gutter may be removable to facilitate removing the debris from the gutter and otherwise cleaning the gutter.

In accordance with various embodiments, cooking devices as disclosed herein may be used in conjunction with existing cooking devices to retrofit the existing cooking device with the devices disclosed herein. Existing cooking devices may also be designed to incorporate aspects of the present invention. For example, with reference to FIGS. 1-6, an open bay fryer may be fitted with lifting plate 18, basket 16, cover 12 and/or other aspects of the present invention to facilitate operating the open bay fryer as a closed fryer with spinning capabilities as disclosed herein.

Adding cover 12, in various embodiments, to an open bay fryer, or utilizing cover 12 in a centrifugal cooking device, allows for energy savings due at least in part to a more efficient heating system. For example, utilizing cover 12 in a fryer as illustrated in FIGS. 1-6 results in an energy savings of about 13%, or about 10-15% or more compared to operating the fryer without cover 12. Cover 12, in various aspects of the present invention acts as a thermal break keeping the surface heat, air heat, and/or oil heat from being removed from the fryer, for example, from being removed by the exhaust system, ventilation system, and/or other systems or mechanisms (e.g., heat loss to the ambient environment). Additionally, cover 12 in various embodiments includes an oil filter to facilitate removing oil from the air in the spinning section before the oil is exhausted from the cooking device. Furthermore, retrofitting existing cooking devices according to various embodiments facilitates utilizing existing energy efficient heating systems in those existing cooking devices, such as those devices that employ heating systems with tube designs.

According to a further embodiment, and with reference to FIGS. 2 and 4, cover 12 comprises a lip 11 disposed at the end of cover 12 opposite where cover 12 hinges to cooking device 10. Lip 11 is angled toward the inside of cooking device 10. When cover 12 is closed, lip 11 is configured to extend at least partially below the surface upon which cover 12 rests. As basket 16 spins liquid off the cooked food in the spinning section, lip 11 is configured to catch at least some of the liquid to prevent the liquid from exiting cooking device 10. Additionally, lip 11 may be configured to prevent a straight edge at the side of cover 12 where lip 11 is located—without lip 11, cover 12 may exhibit a guillotine-type effect when cover 12 is closed, potentially resulting in an unsafe operating condition.

In accordance with various embodiments of the present invention, cooking device 10 may utilize different mechanisms for heating the cooking liquid. For example, electrical heating elements may run through and/or proximate to the cooking section. A gas flame burner may be utilized to heat the oil. In certain embodiments, tube heating may be employed, for example, where tubes carrying a liquid and/or gas coolant at an elevated temperature run through and/or proximate to the liquid in the cooking section. To conserve energy and to facilitate making the heating process more efficient, exhaust heat from the spinning section of the cooking device may be utilized to preheat and/or reheat the coolant running through the heating tubes.

In embodiments of a dual basket fryer as illustrated in FIGS. 30-36, different heating mechanisms may be utilized to heat each section, but it should be understood that the same heating mechanism may be utilized to heat the cooking liquid in both sections. For example, the first section may employ electrical heating elements, and the second section may employ tube heating elements. Exhaust heat from the first section may be utilized to preheat and/or reheat a coolant in the tube heating elements in the second section, thereby increasing efficiency and decreasing energy consumption of the dual basket fryer.

According to further embodiments, it may be desirable to create a vacuum and/or substantially reduce the pressure in the cooking device. Reducing the pressure during frying facilitates a lower frying temperature and longer oil life. Reducing the pressure during spinning may facilitate better oil removal from the cooked food. For example, with reference to FIGS. 37-42, cooking device 10 comprises vacuum motor 90 and vacuum vent 92. Cooking device 10 may comprise a plurality of vacuum motors 90 and vacuum vents 92.

With cover 12 open, basket 16 may be configured to extend above the fryer bay to facilitate removing the basket and loading and unloading cooked food. Once basket 16 is filled with food, it is lowered into the cooking device, and cover 12 is closed and sealed. Basket 16 is lowered into the cooking section, and vacuum motor 90 removes air from the cooking and spinning sections via vacuum vent 92 until a suitable pressure level is reached. Air removed from the cooking and spinning sections may be vented externally to the cooking device via exhaust vent 96. In an embodiment as mentioned above, the removed air may be utilized to reheat and/or preheat coolant in heating tubes that may be employed to heat the cooking liquid. After cooking is completed, basket 16 is raised to the spinning section, and the pressure level may be altered or maintained during spinning to achieve the desired outcome for the cooked food.

These aspects of a centrifugal cooking device are configured to individually and/or collectively affect the outcome of food that is cooked in the centrifugal cooking device. For example, spinning oil out of fried food may result in up to approximately a 24% decrease in fat calories. This reduced oil content results in a desirable difference in taste of the fried food because the fried food is crispy on the outside without an oily residue. Furthermore, up to approximately 48.8% less oil is consumed during cooking because it is spun off the food, thereby resulting in less oil loss. In embodiments where gas is used to heat the oil, gas consumption my be reduced by up to approximately 13.1%. Many other advantages may apparent to one skilled in the art.

Vibration in cooking devices with rotating parts may be caused when oscillatory actions occur around an equilibrium point. This circumstance may occur in a fryer device that includes a basket or container of food that is spun to remove excess oil from the food. Spinning in and of itself may cause these oscillatory actions. Additionally, if the food load in the basket is not equally distributed, the oscillatory actions may be exacerbated creating more vibration.

Figure 16:
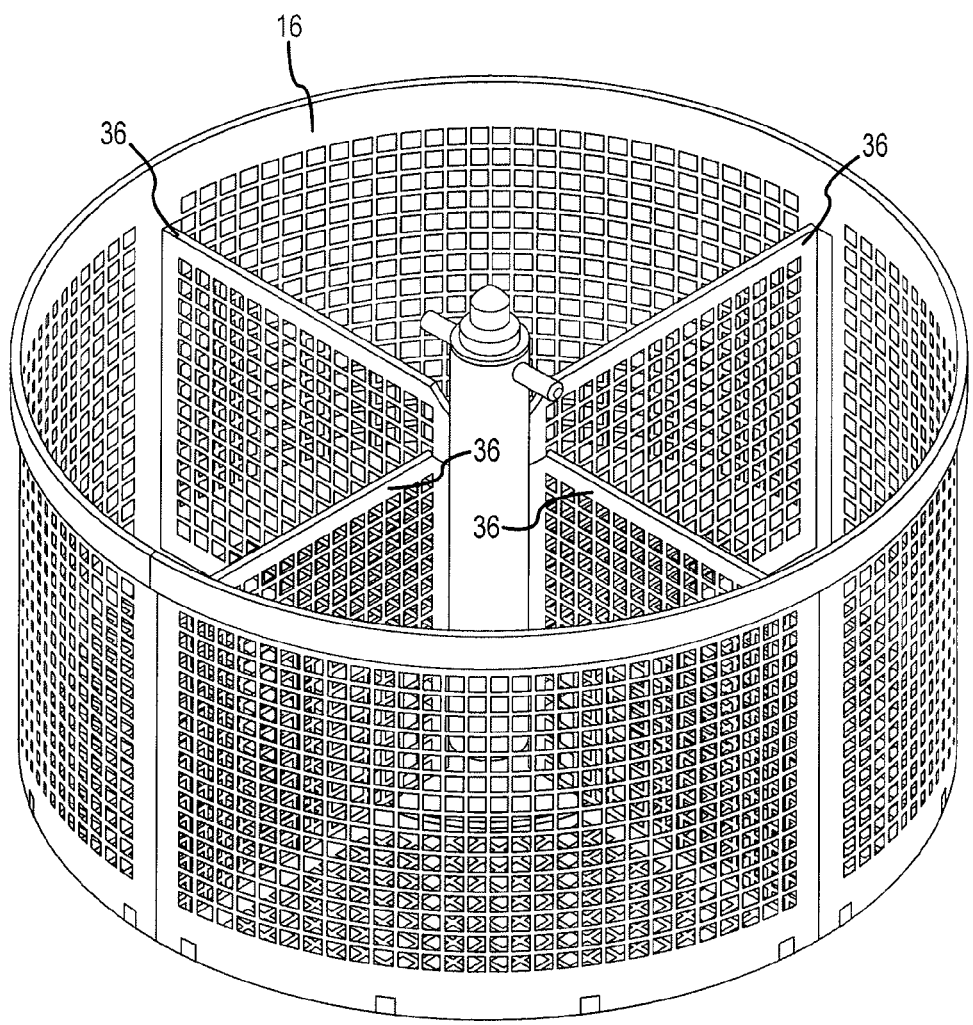
FIG. 16 illustrates a perspective view of a basket with partitions according to an embodiment of the present invention.
Figure 17:
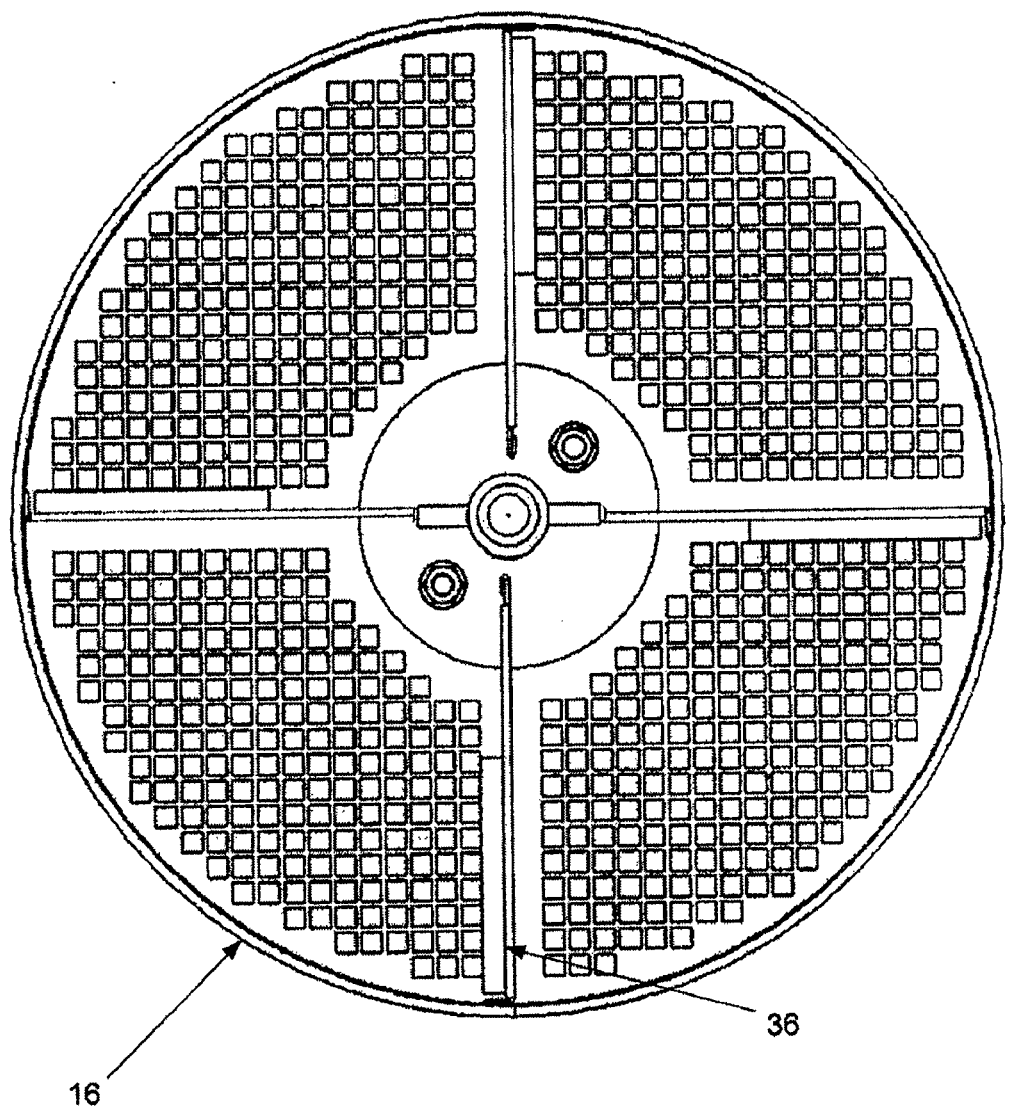
FIG. 17 illustrates a top view of a basket according to an embodiment of the present invention.

In accordance with various embodiments, the vibration generated by the spinning basket may be reduced by balancing the load within the fryer basket or container. The basket may be partitioned in such a way as to create a balanced load, for example, as illustrated in FIGS. 16-17, basket 16 may comprise basket partitions 36. Fried foods, when placed in the fry vessel containing the frying oil, may migrate as they are cooked. Creating partitions 26 within the fry basket or container may thus facilitate restricting this migration and maintaining a balanced or substantially balanced load. In other embodiments, basket 16 may comprise shelves and/or horizontal inserts configured to create layers in basket 16 to facilitate distributing the food in basket 16 and/or to accommodate different foods in the same basket.

Figure 18:
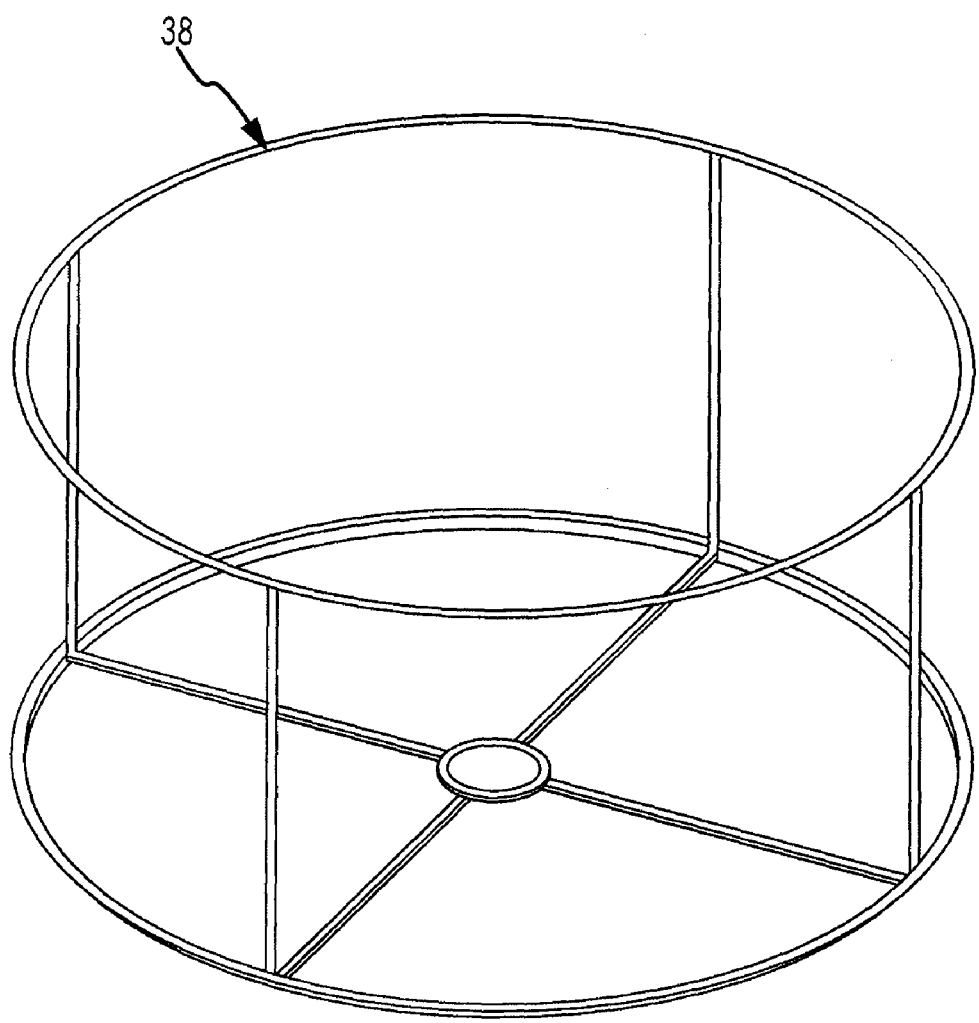
FIG. 18 illustrates a perspective view of a wire frame according to an embodiment of the present invention.
Figure 19:
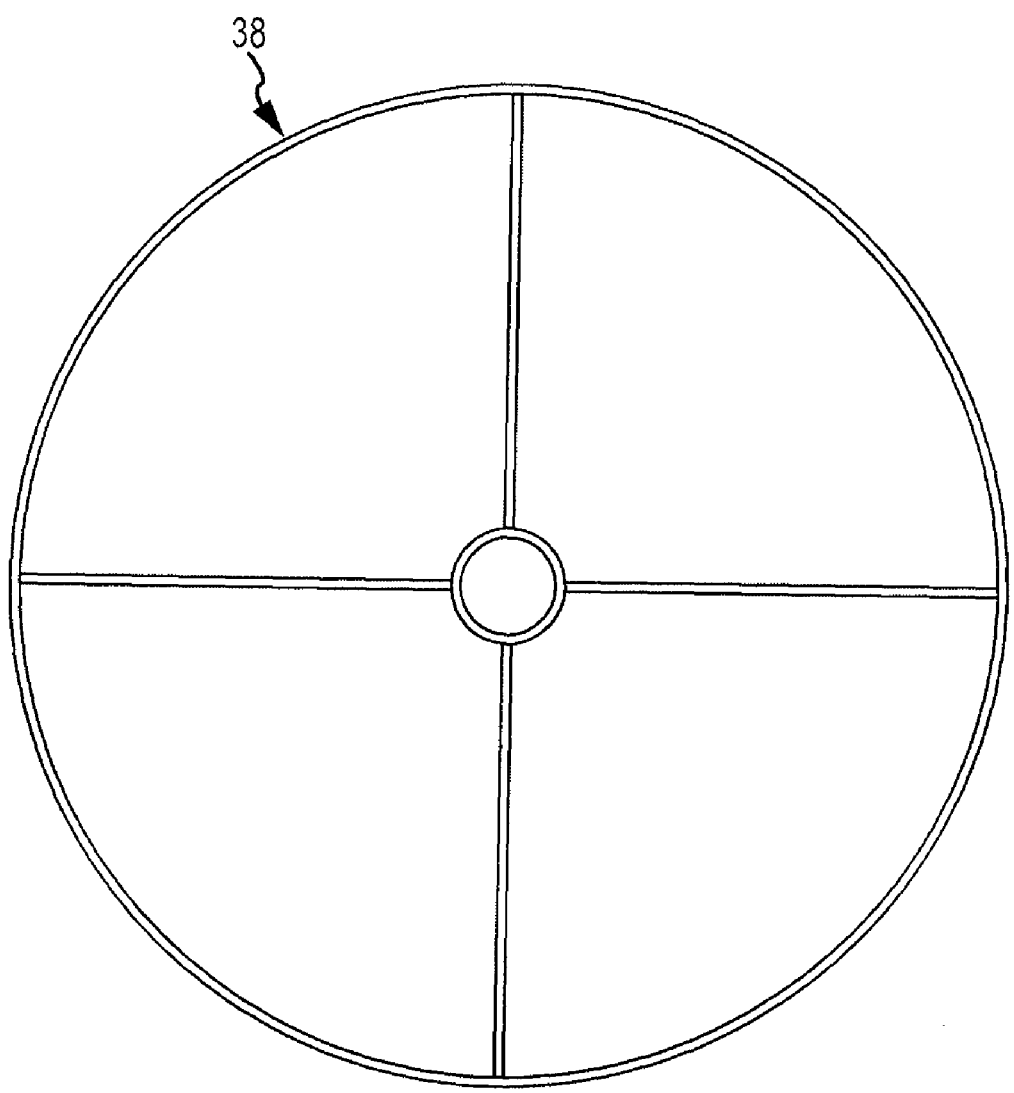
FIG. 19 illustrates a top view of a wire frame according to an embodiment of the present invention.
Figure 21:
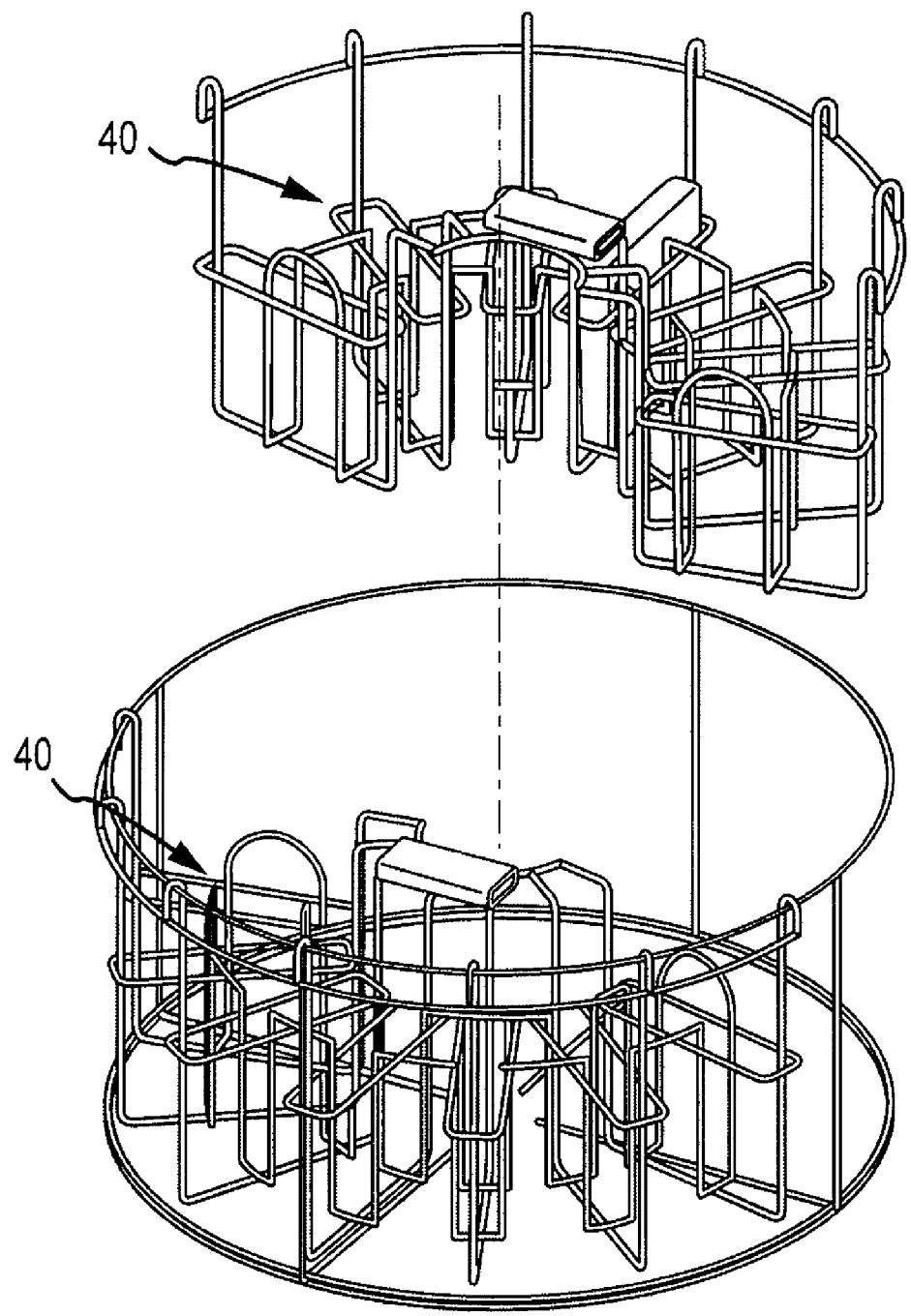
FIG. 21 illustrates an exploded perspective view of a wire frame with inserts according to an embodiment of the present invention.
Figure 22:
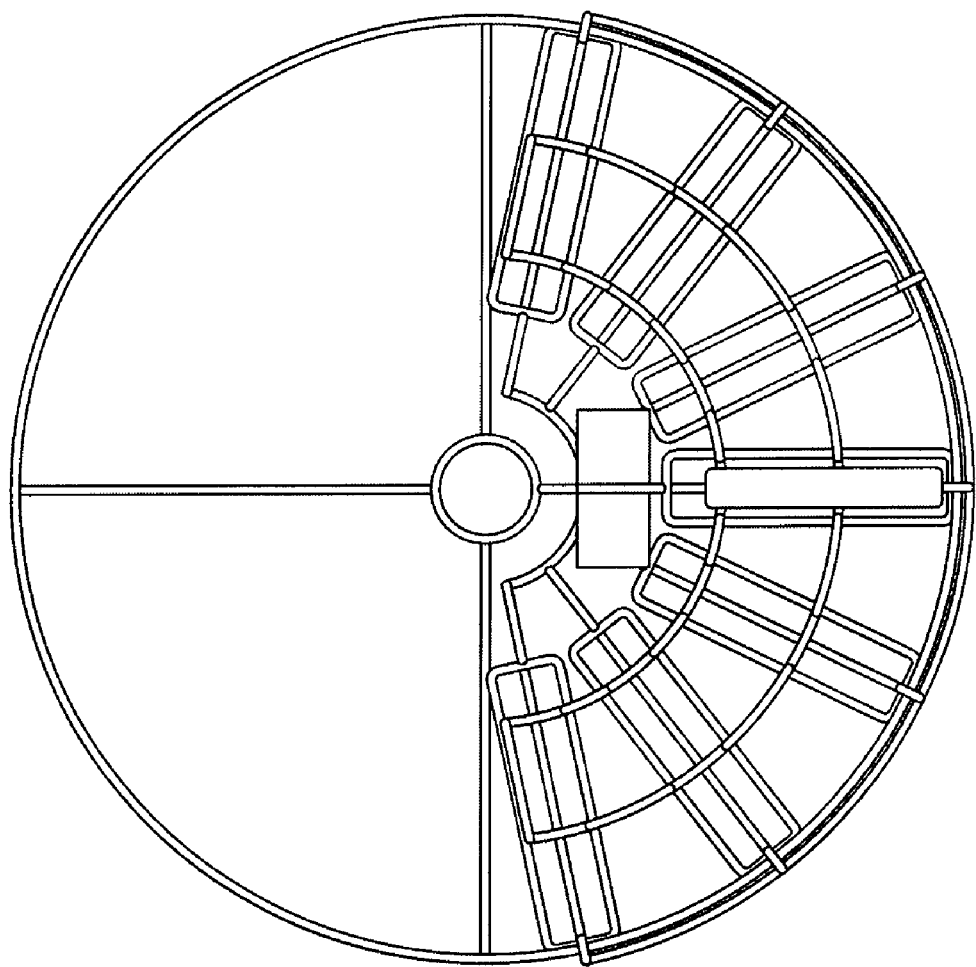
FIG. 22 illustrates a top view of a wire frame with an insert according to an embodiment of the present invention.
Figure 25A:
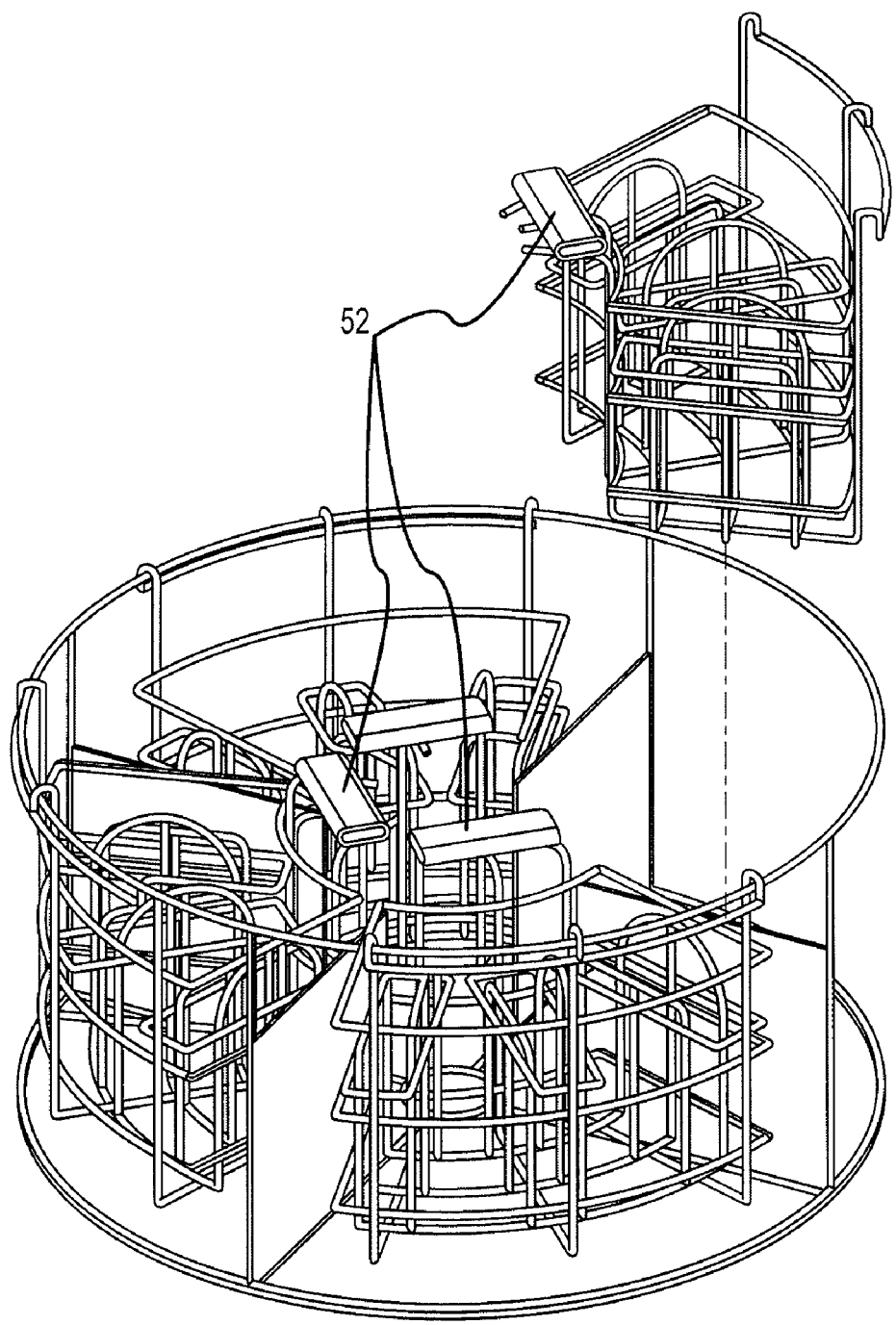
FIG. 25A illustrates an exploded perspective view of a wire frame with inserts according to an embodiment of the present invention.
Figure 25B:
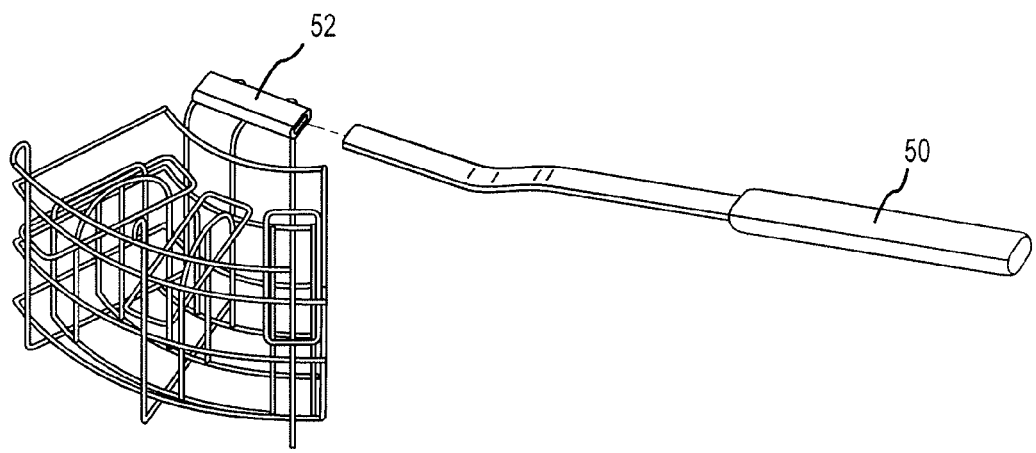
FIG. 25B illustrates an exploded perspective view of a handle and an insert according to an embodiment of the present invention.
Figure 25C:
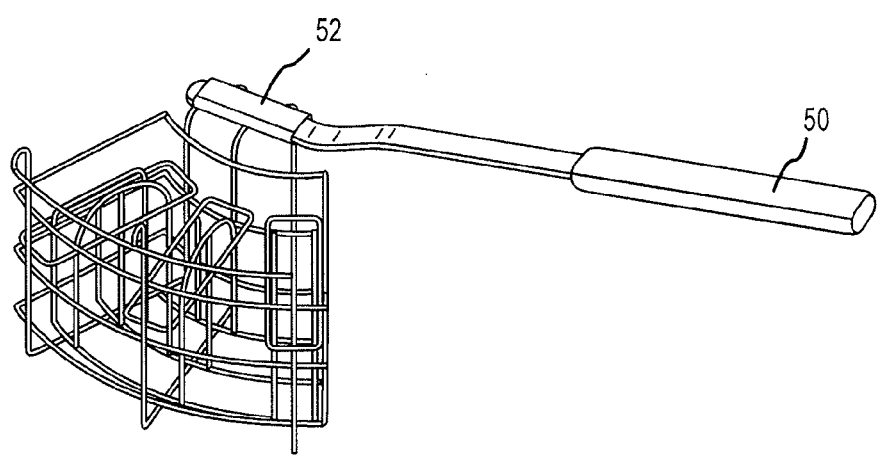
FIG. 25C illustrates a perspective view of a handle and an insert according to an embodiment of the present invention.
Figure 26:
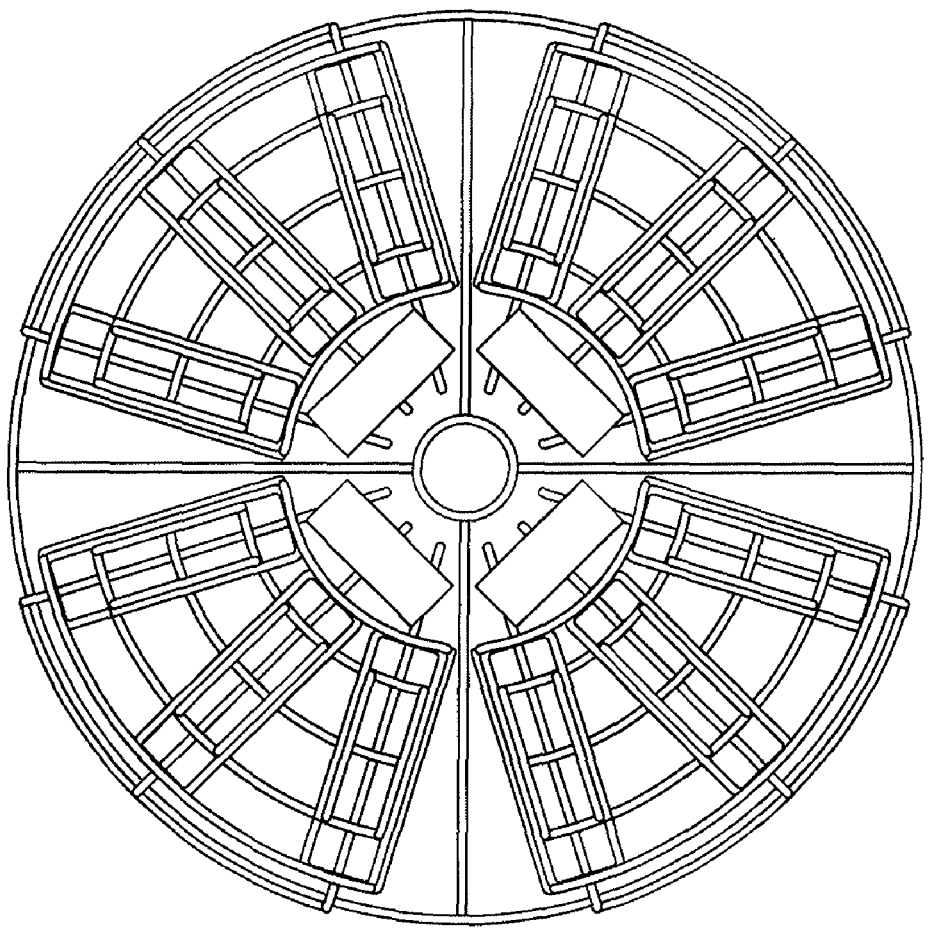
FIG. 26 illustrates a top view of a wire frame with four inserts according to an embodiment of the present invention.

In an embodiment, as illustrated for example in FIGS. 18-19, basket 16 may comprise a wire frame 38 configured to hold one or more basket inserts. For example, different basket inserts may be configured to hold different types of food to be fried, or basket inserts may facilitate frying different types of foods in different orientations within basket 16. Various embodiments of the present invention comprise different numbers of basket inserts 40, for example 2 (as illustrated in FIG. 21), 3, 4 (as illustrated in FIG. 25), or more. It should be understood that the basket inserts may be used with basket 16 with or without wire frame 38.

Figure 20:
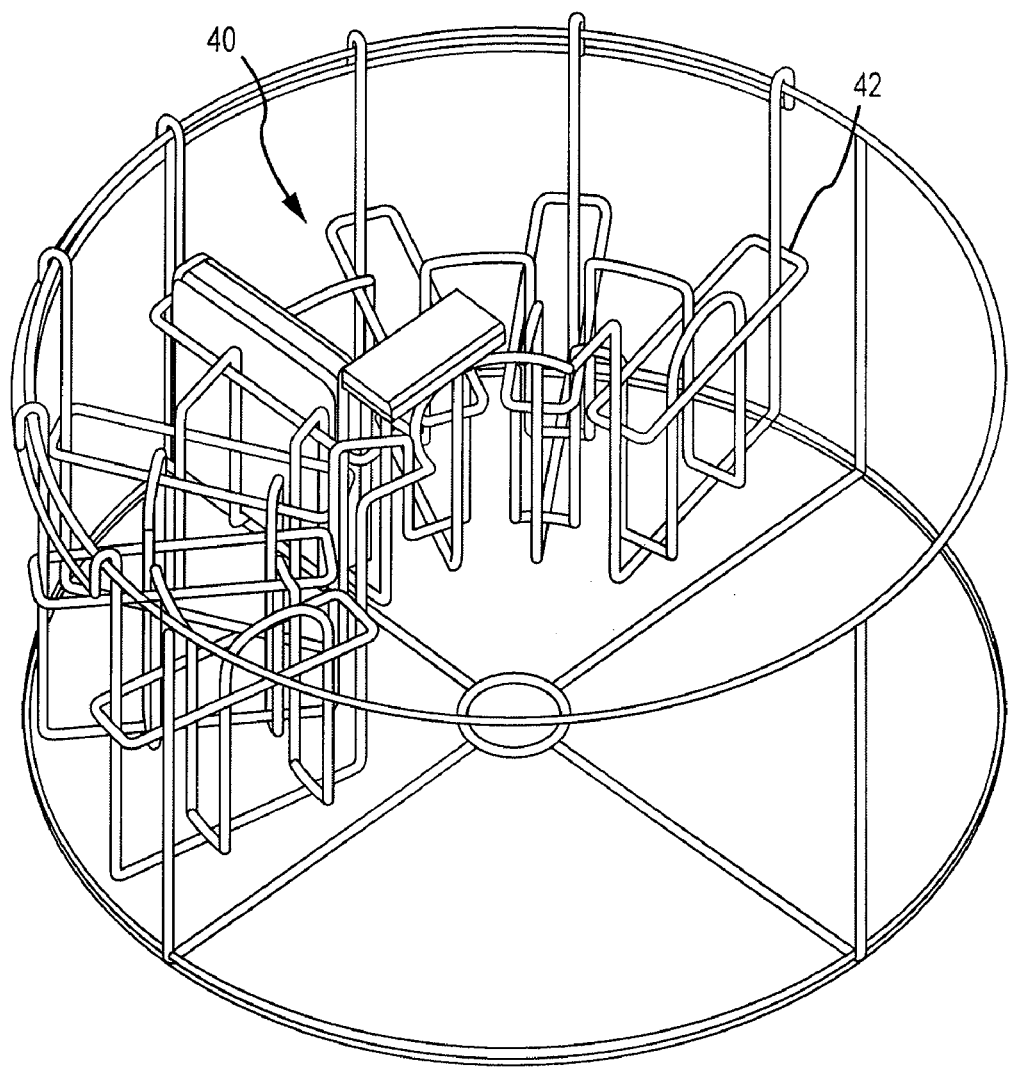
FIG. 20 illustrates a perspective view of a wire frame with an insert according to an embodiment of the present invention.

With reference to FIG. 20, in accordance with various aspects of the present invention, basket insert 40 may comprise a plurality of slots configured to maintain a food in a substantially vertical orientation. For example, it may be desirable to maintain hash brown patties in a substantially vertical orientation during the cooking and spinning processes.

Figure 23A:
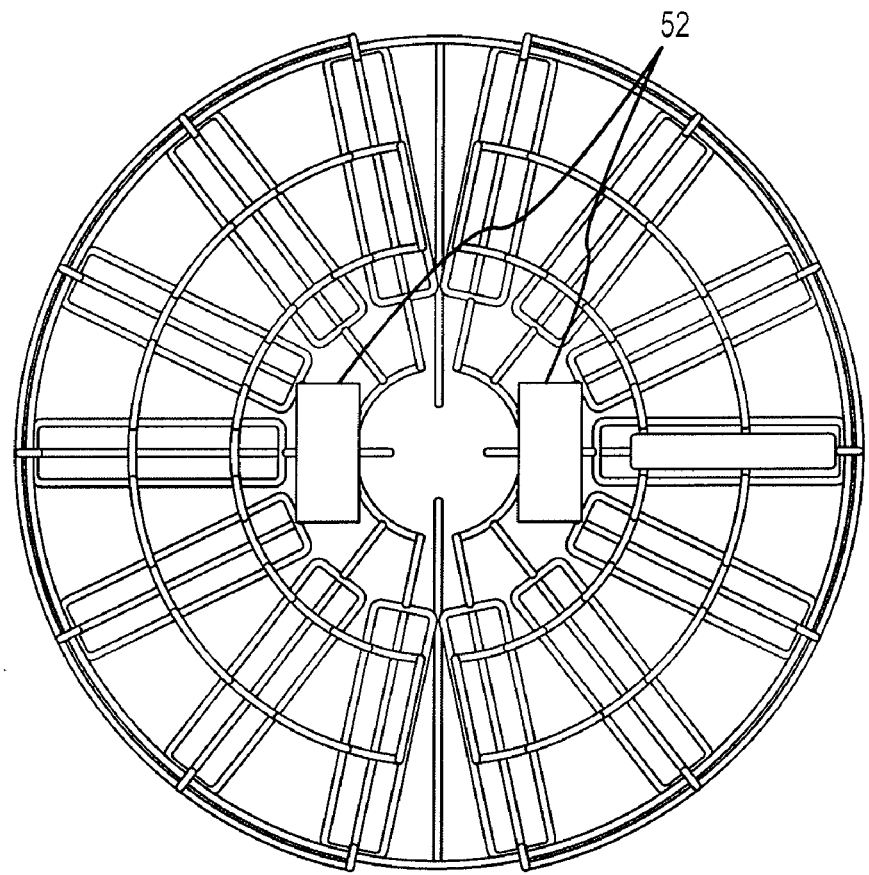
FIG. 23A illustrates a top view of a wire frame with inserts having handle slots according to an embodiment of the present invention.
Figure 23B:
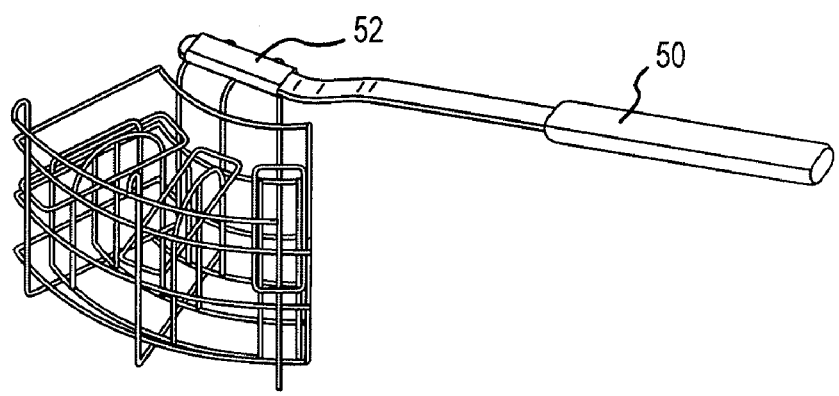
FIG. 23B illustrates a perspective view of a handle and an insert according to an embodiment of the present invention.

According to various embodiments, and with reference to FIGS. 23 and 25, basket inserts 40 may comprise a handle slot 52 configured to receive a handle 50. Handle 50 may be utilized to facilitate removing basket inserts 40 from basket 16 and/or wire frame 38. For example, handle 50 may be inserted into handle slot 52 before, during, or after the cooking or spinning processes to facilitate inserting basket insert 40 into and/or removing basket insert 40 from basket 16 and/or wire frame 38.

Figure 24:
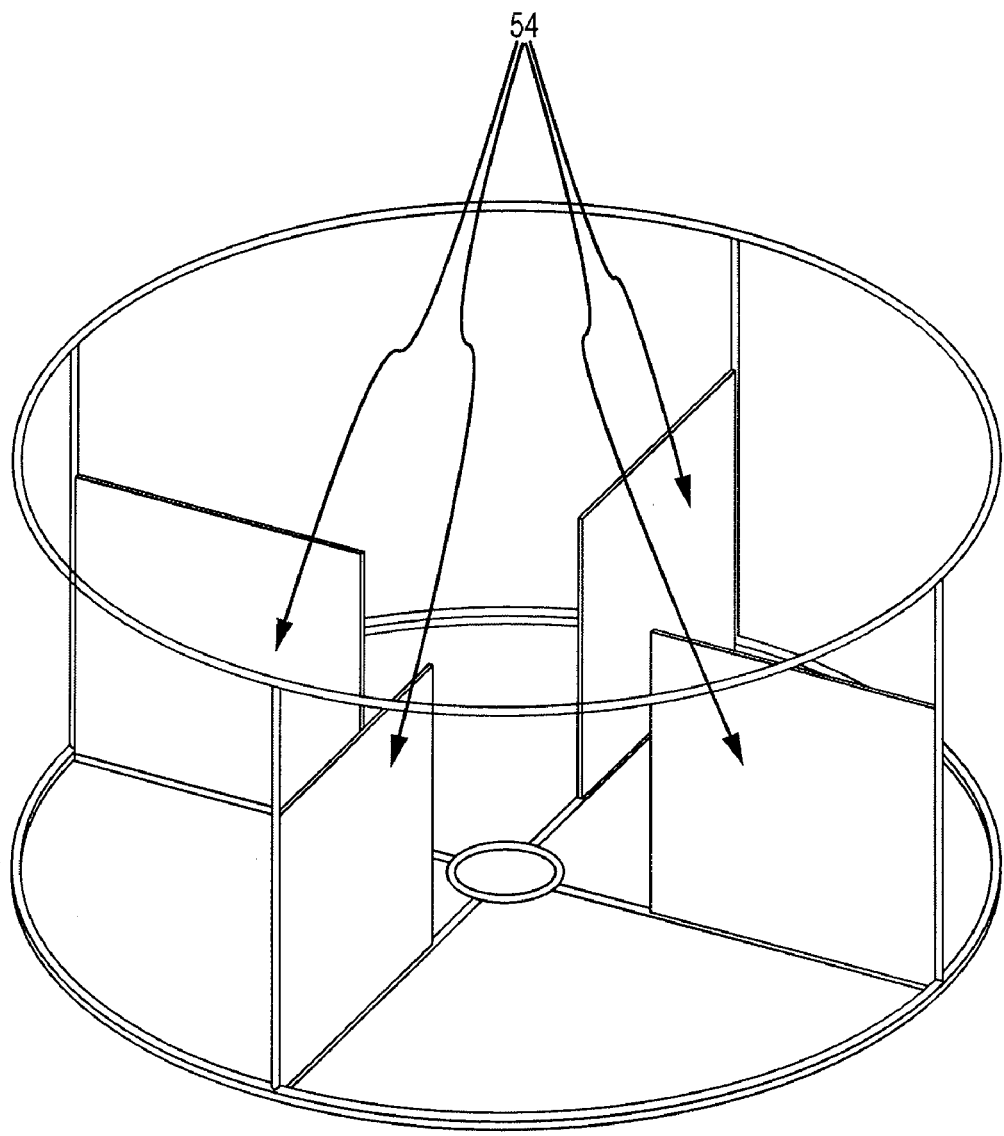
FIG. 24 illustrates a perspective view of a wire frame with partitions according to an embodiment of the present invention.
Figure 27:
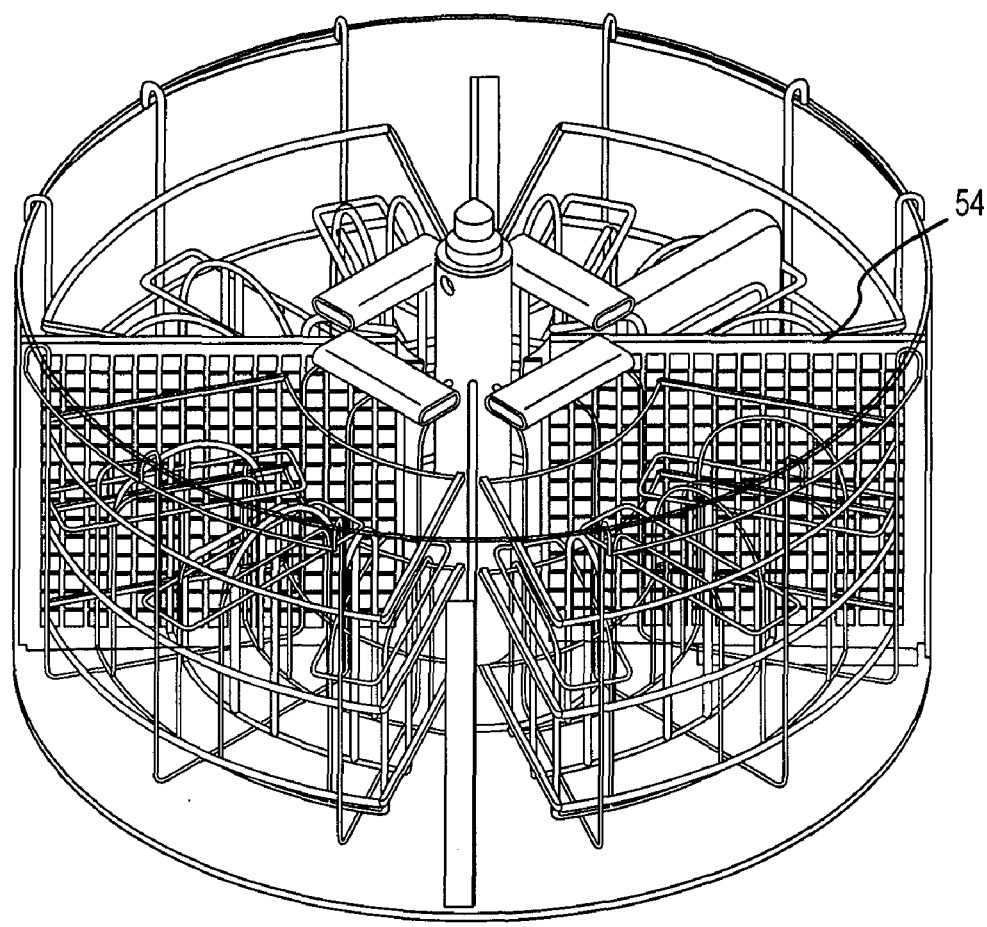
FIG. 27 illustrates a perspective view of a wire frame with four inserts according to an embodiment of the present invention.

In accordance with an embodiment, and with reference to FIG. 24, wire frame 38 comprises a vertical portion 54. Vertical portion 54 may be a solid or substantially solid wall configured to separate portions of wire frame 38. For example, vertical portion 54 may facilitate defining sections of wire frame 38 into which basket inserts 40 may be inserted. Vertical portions 54 may facilitate centering and/or locating basket inserts 40 within wire frame 38. In various embodiments, for example, as illustrated in FIG. 27, vertical portions 54 may include mesh portions. In further embodiments, vertical portions 54 may exist in basket 16, and may facilitate cooking a food without using inserts 40.

Further, according to an aspect of the present invention, it may be desirable to utilize basket materials that facilitate reducing vibration in the cooking device. Basket 16 may be constructed out of stainless steel to provide a rugged basket that is resistant to damage. However, heavier baskets may create greater vibration during spinning. Therefore, it may be desirable to utilize lighter weight basket materials, such as aluminum, composites, ceramics, high-temperature polymers, and the like. Any material may be used that is configured to withstand the high operating temperatures and that is safe for use in connection with food products. In an embodiment, meshes of between approximately 8 squares per inch and approximately 16 squares per inch may be utilized.

Notwithstanding the placement of partitions in the fry basket and/or using basket inserts, unbalanced loads may still occur in the fry basket. When this condition of an unbalanced load occurs, further action may be utilized to reduce and/or eliminate vibration generated by the spinning of the fry basket.

Vibration may be transmitted through solid materials so that substantial isolation of specific areas of the fryer may serve to reduce or "damp" the vibration. Where a fry vessel is rigidly affixed to a frame of a fryer device, vibrations that affect the fry vessel may be transmitted to the frame of the fryer device. Hence, according to various embodiments, substantially isolating the fry vessel from the frame by means of damping techniques may serve to absorb and thereby reduce the vibration of the entire fryer device. This damping process may include having the fry vessel mounted on springs or other energy absorbing materials designed to handle heat and oil. This damping process may occur at the edge of the fry vessel, under the fry vessel, or at any other location configured to facilitate damping the vibrations to which the fry vessel and/or fryer device are subject.

Vibratory energy may be transmitted to the frame of the fryer in many ways. If the damping procedures on the fry vessel are inadequate or do not sufficiently absorb the energy of the vibration caused by the spin motion, then further damping procedures may be employed on the frame of the fryer. In an embodiment, the damping mechanism may be employed in the area where the fryer frame comes in contact with the floor or counter top where the fryer device is mounted and/or positioned. The damping techniques employed according to various embodiments may be springs or energy absorbing materials configured to operate in a heated, oil laden environment. These absorption devices may be mounted on or about the "feet" or supports for the fryer frame. In other embodiments, affixing the fryer frame to the floor or countertop through the use of bolts or locking devices may also serve to help absorb vibratory energy.

In accordance with further aspects of the invention, as the basket spins within the fryer, the spinning may cause vibration within the fryer. If the food becomes unequally distributed within the fryer, additional vibration may occur. Vibration is undesirable, particularly in counter top models, because the fryer may walk off the counter. Further, in large fryer applications, vibrations may substantially increase the noise in the area where the fryer is located.

In an embodiment of the cooking device comprising a spinning shaft, one end of the shaft may have a spring or other vibration damping mechanism to absorb energy and reduce vibration. The spring may be at either end of the shaft and may be enclosed by a compartment configured to receive one end of the shaft and to allow the shaft to rotate with or without the spring also rotating. A spring or other damping device may be used to connect the basket to the shaft to facilitate damping vibrations generated when the basket is spinning. In another embodiment, a bearing may be configured to interface with the shaft to facilitate rotation of the shaft. The bearing may comprise a vibration damping material, or the bearing may be disposed in a bearing block comprising vibration damping material such as rubber.

Figure 11:
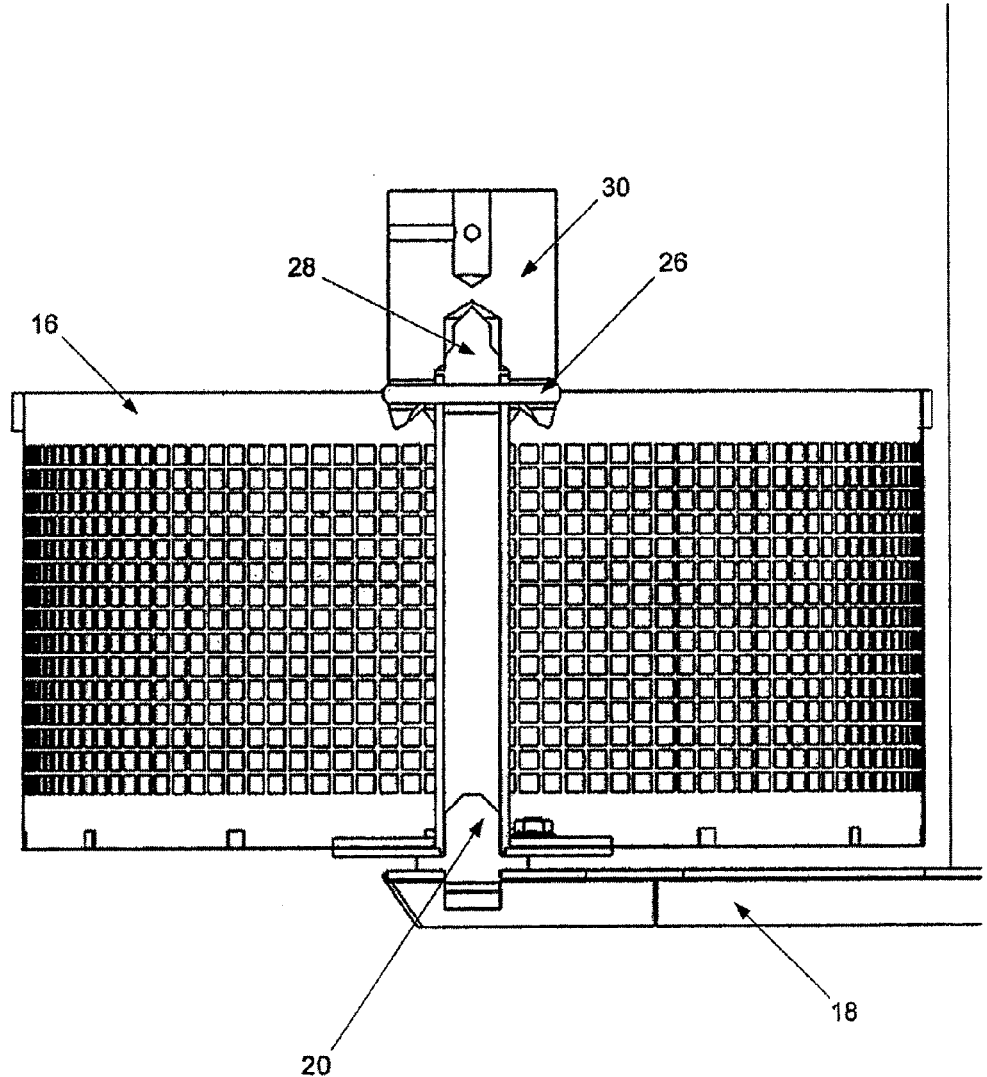
FIG. 11 illustrates a side view of a basket with a motor according to an embodiment of the present invention.
Figure 12:
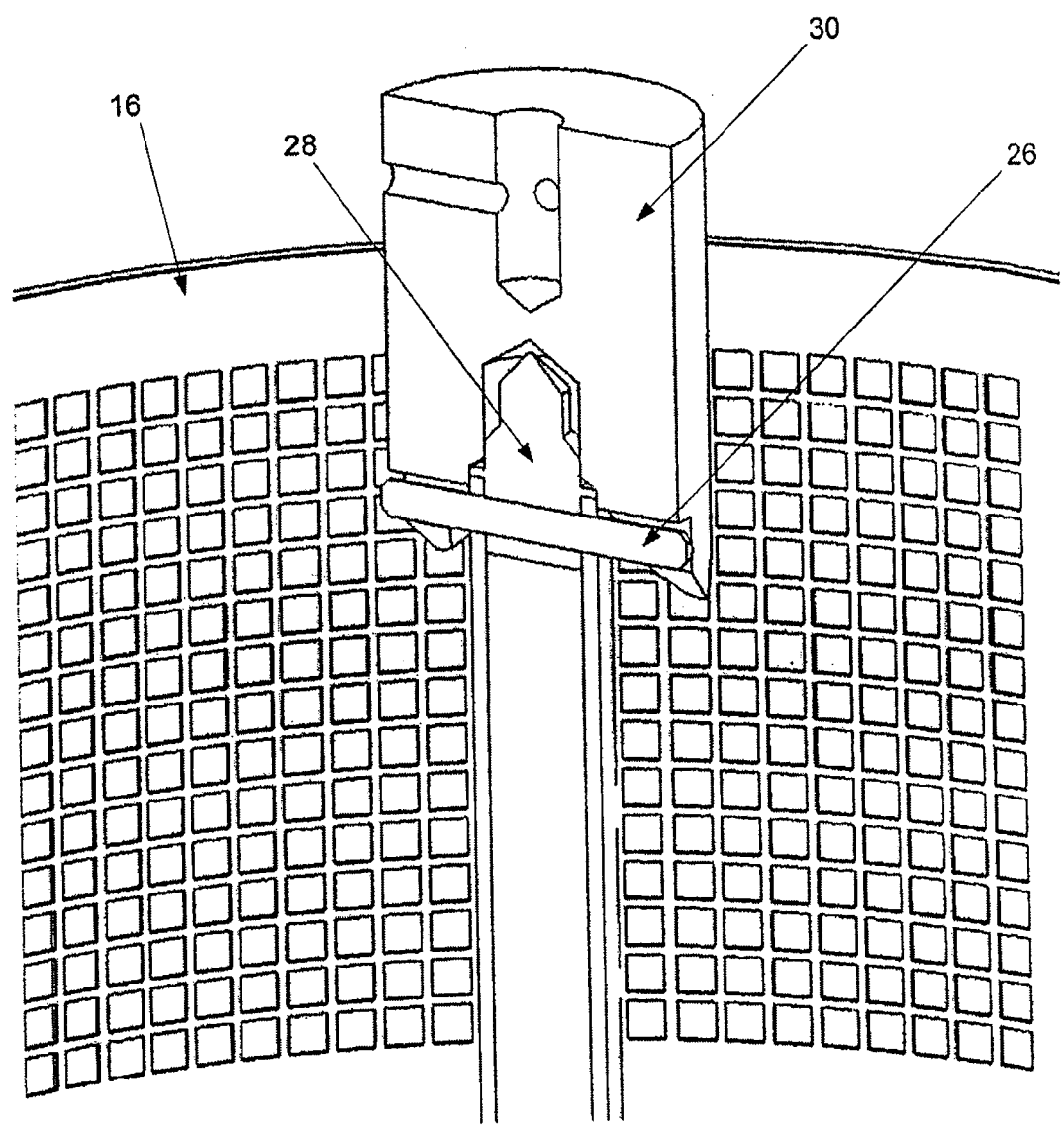
FIG. 12 illustrates a sectional perspective view of a basket and a motor according to an embodiment of the present invention.
Figure 13:
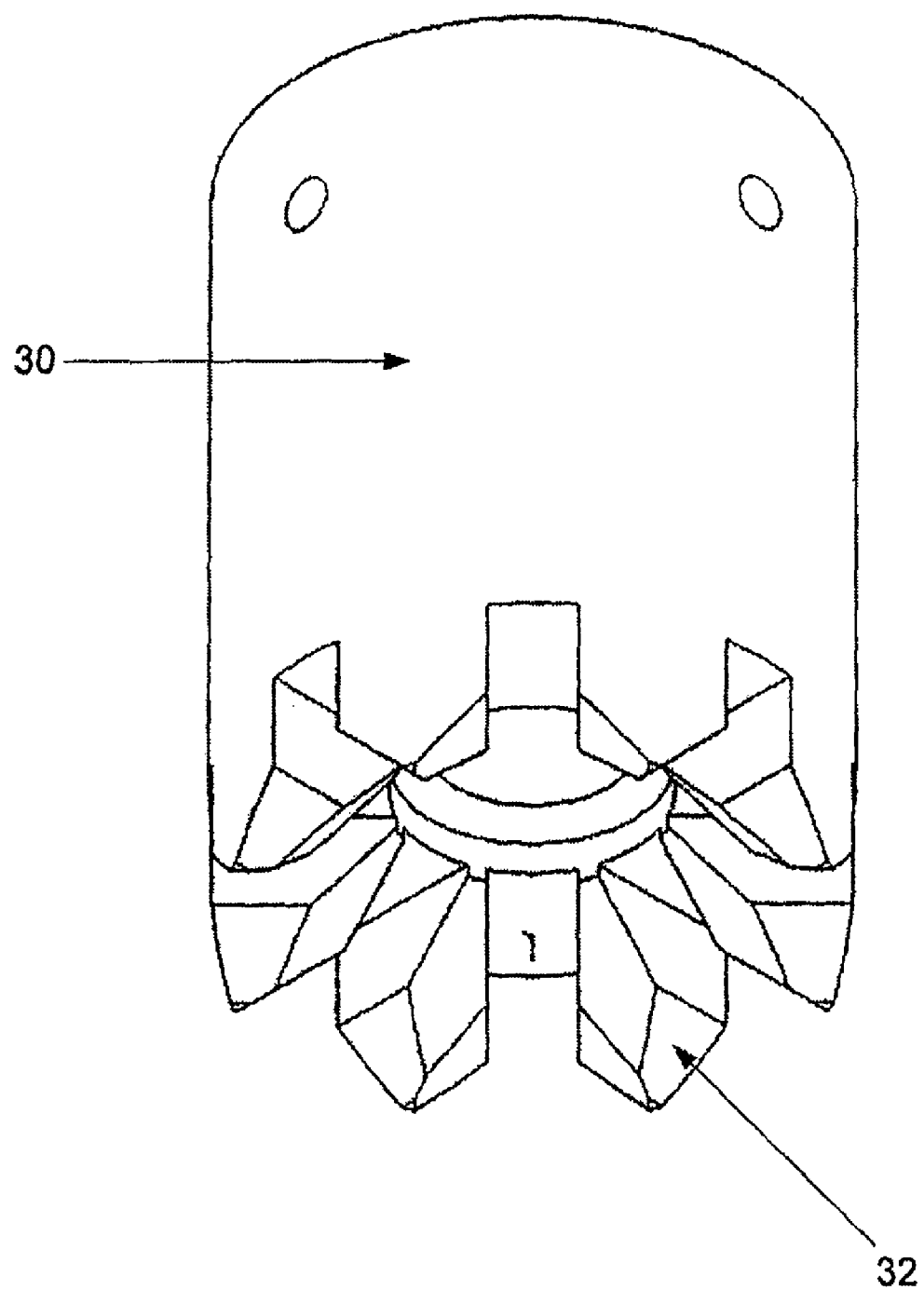
FIG. 13 illustrates a perspective view of a motor gear according to an embodiment of the present invention.
Figure 14:
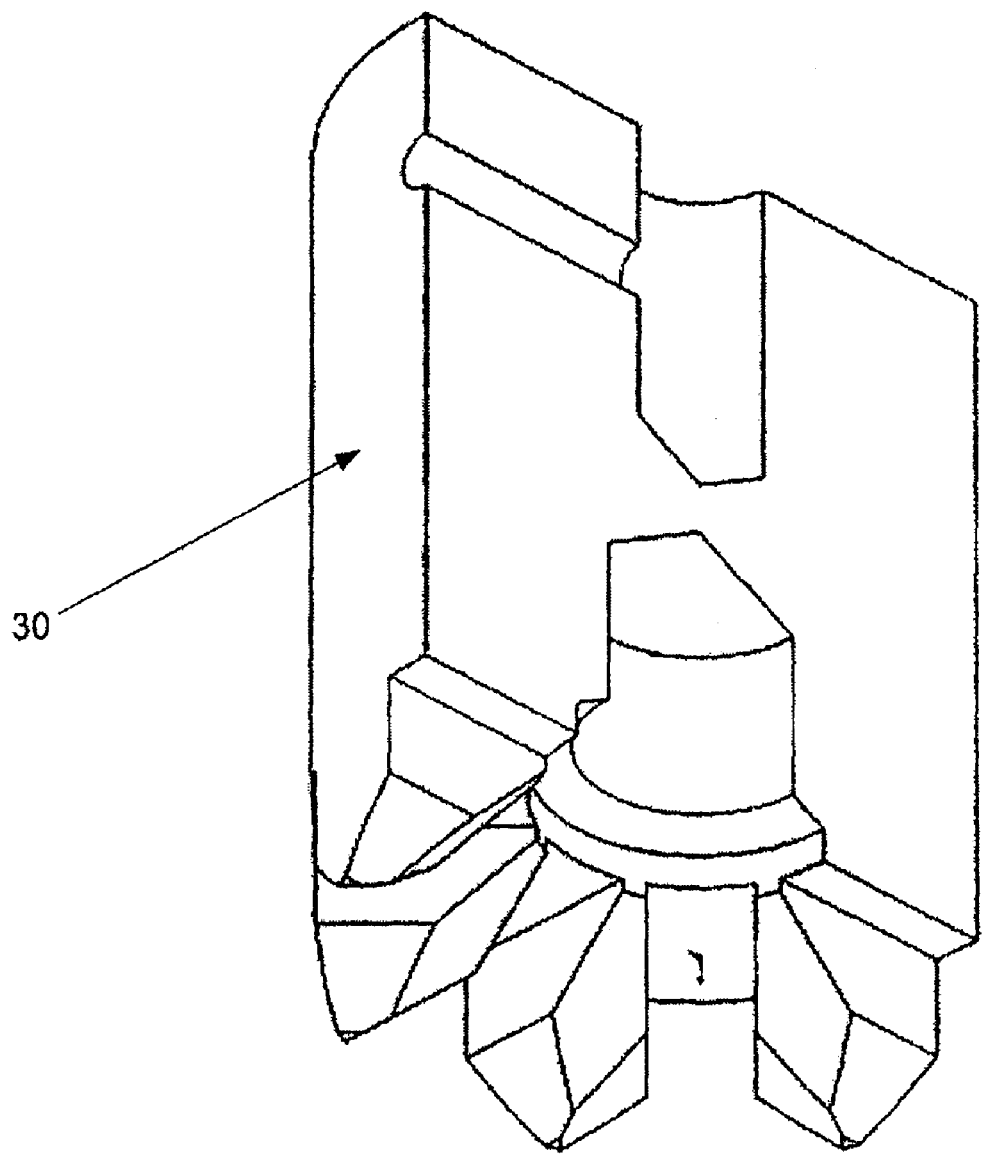
FIG. 14 illustrates a sectional perspective view of a motor gear according to an embodiment of the present invention.
Figure 15:
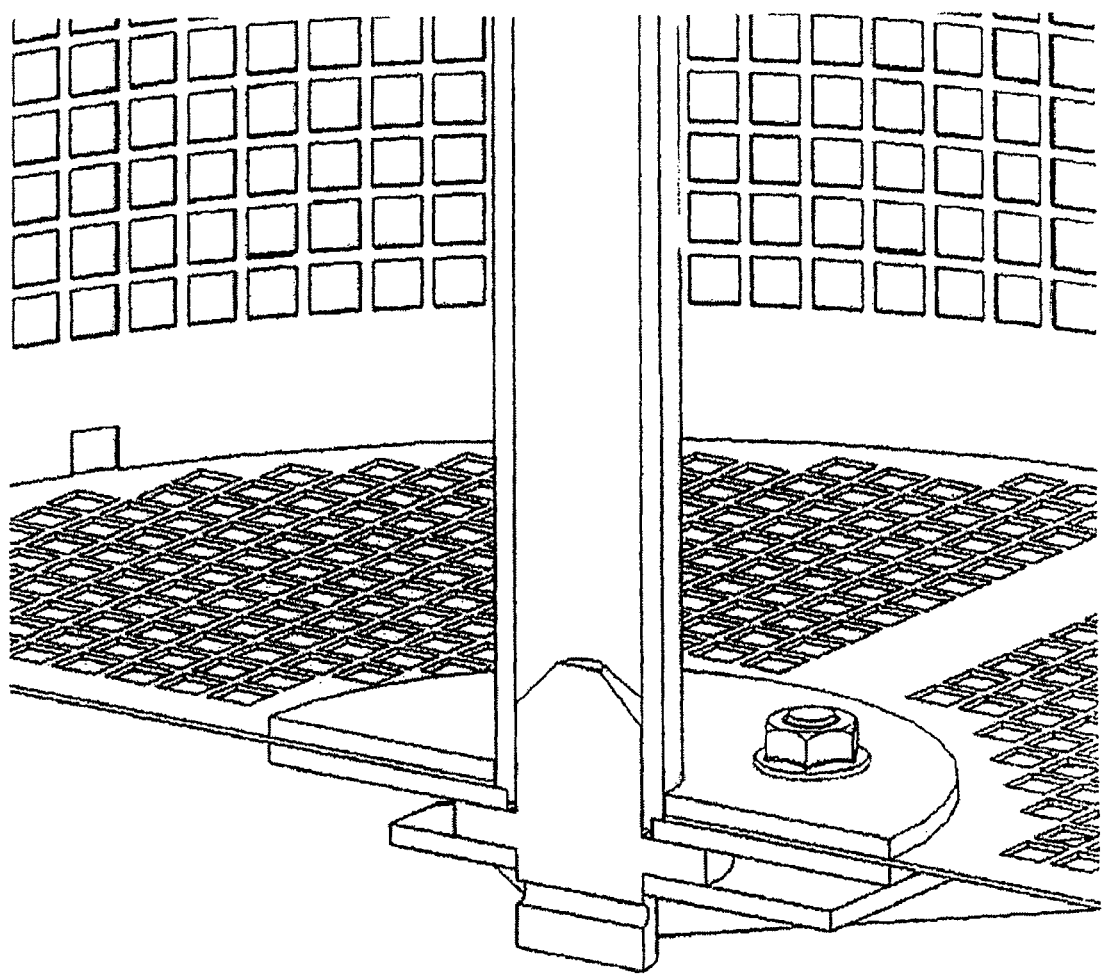
FIG. 15 illustrates a sectional perspective view of a basket and a lifting plate according to an embodiment of the present invention.

In accordance with a further embodiment, as discussed above, a lifting plate may be utilized to facilitate raising and lowering the basket. The lifting plate (or other support for the basket) may be secured to the fryer via a connector that provides damping functionality. For example, a spring may be connected between the lifting plate and the body of the fryer. In such a configuration, the spring may be configured to absorb vibration energy generated by the spinning basket and transmitted to the lifting plate. In further embodiments, a damping mechanism may be deployed between the lifting plate and the basket to facilitate damping vibrations when the basket is spinning (for example, between basket 16 and spindle 20 as illustrated in FIG. 11). In other embodiments, the lifting plate may comprise damping material itself.

In accordance with another embodiment, the cooking device may comprise a frame disposed within the cooking device that is configured to provide support to the cooking device. The frame of the cooking device may have vibration damping elements, for example, in the legs of the frame or the body of the cooking device. The frame inside the body of the cooking device may be secured to the body via vibration damping mechanisms such as springs. For example, shafts with corresponding springs may be used as shock absorbers at each corner of the frame to facilitate damping vibrations. A vibration damping material such as foam rubber may be disposed between the frame and the body of the cooking device and/or between the cooking vessel and the body of the cooking device, thereby absorbing vibration generated within the cooking vessel before it is transmitted to the body of the cooking device. In accordance with another embodiment, springs may be attached between the cooking vessel and the body and/or frame of the cooking device to facilitate absorbing vibration of the cooking vessel generated when the basket spins within the cooking vessel. The cooking device may also be mounted on a surface that is configured to damp vibrations.

In accordance with further embodiments, the cooking vessel may have rods mounted about the circumference of the cooking vessel. The rods may be secured to the lid of the cooking device, to the frame of the cooking device, or to the body of the cooking device. Where the rods interface with the cooking device, a damping mechanism may be disposed between the rods and the body. For example, springs may be disposed about the rod at the end where it connects to the cooking device and may be configured to be slightly movable with respect to the cooking device. For example, when the cooking vessel vibrates, the rods may move slightly with resistance from the springs, such that vibration energy is absorbed by the springs. In another embodiment, the rods may be flexible rods and they may extend to the bottom of the cooking device where they contact the surface whereon the cooking device sits. Springs or other vibration damping means may be disposed in feet configured to receive the flexible rods in order to further facilitate damping vibrations. In another embodiment, a vibration damping material such as rubber may be disposed between the cooking vessel and the body of the cooking device and/or where the cooking vessel is connected to the body of the cooking device.

In various embodiments, the cooking device may have legs configured to locate the cooking device in a desired location. The legs of the cooking device may comprise a vibration damping material such as rubber. The legs may further comprise other vibration damping mechanisms such as springs disposed in the legs of the cooking device, for example, where a rod is secured to the flyer, and the other end of the rod is disposed within a spring and configured to compress the spring into a foot wherein the spring is disposed.

In accordance with an embodiment where a motor may be mounted within the lid of the cooking device (for example, as illustrated in FIGS. 1-6), the lid-mounted motor may comprise a housing that includes a vibration damping mechanism. For example, the housing may comprise rubber or another vibration damping material. The rubber may facilitate absorbing vibration generated by the spinning motor and/or basket such that the transmission of the vibratory oscillations to the lid of the cooking device is substantially reduced.

In other embodiments, various motors may be secured within the cooking device via a clamp and/or bracket. The clamp or bracket may comprise bolts configured to facilitate operation of the clamp or bracket. A spring may be disposed around the bolts between the faces of the clamp, such that the spring may facilitate absorbing vibrations generated by the motor.

Further embodiments comprise a lazy suzie-type disk disposed within the opening of the cooking basket to facilitate rotating the basket. The lazy suzie disk may be configured to interface with the basket or basket well via a vibration damping material such as rubber. For example, a gasket may be disposed between the disk and the basket well and/or basket such that the rubber absorbs vibration energy generated by spinning the basket.

According to another embodiment for vibration damping, with reference to FIGS. 45-53, basket 16 may be configured to be rotatably connected to a cross bar 118. Cross bar 118 may include four or more cross bar members 119. Two collinear cross bar members 119 are configured to receive lift arms 117 that facilitate raising and lowering basket 16 in connection with a lift mechanism. Cross bar members 119 interface with basket 16 via spindle 123 to facilitate rotation of basket 16 with respect to cross bar 118. Spring docking stations 120 are disposed about the vertical side of the inside of cooking device 10 proximate the location of the ends of cross bar members 119. Balls 121 on cross bar members 119 interface with spring 122 in spring docking station 120. Basket 16 transmits vibration energy to cross bar 118 during spinning, and spring docking stations 120 are configured to absorb some of that vibration energy to reduce the amount of vibration transferred to the cooking device itself.

Figure 43:
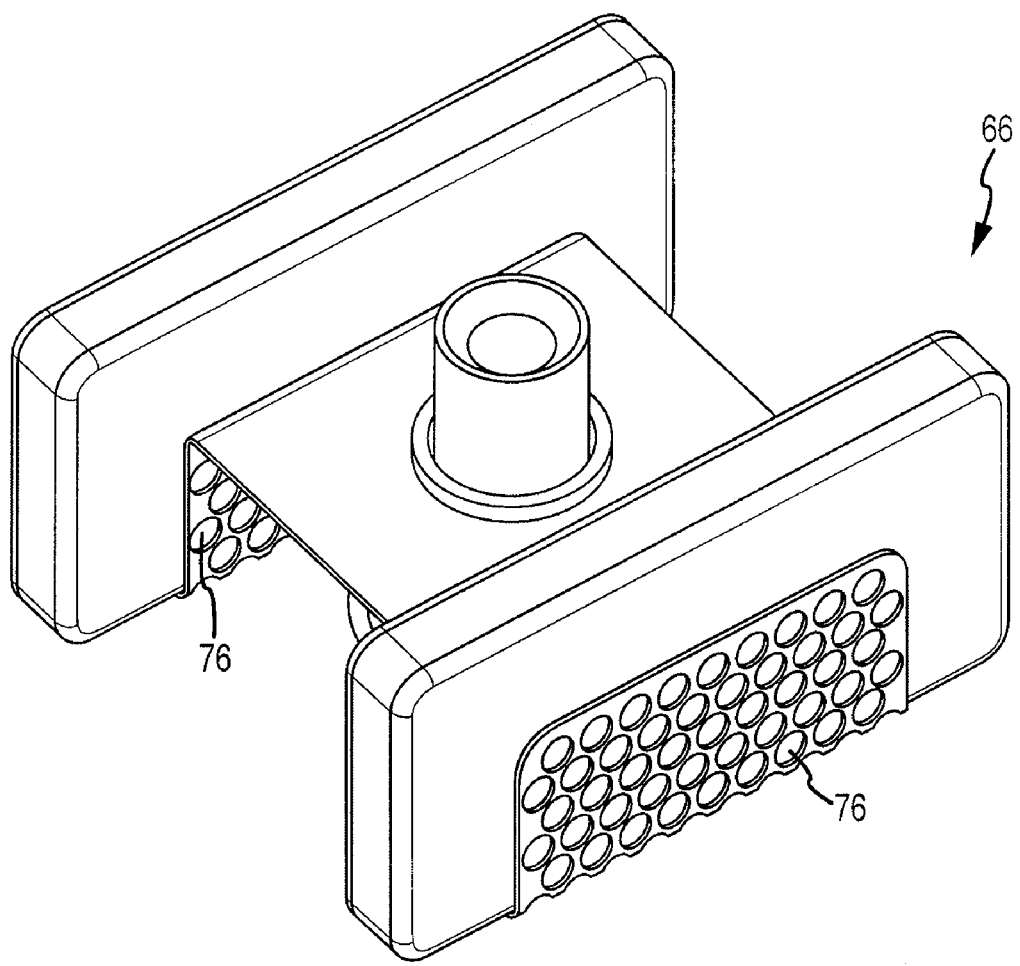
FIG. 43 illustrates a perspective view of a hash brown insert according to an embodiment of the present invention.
Figure 44:
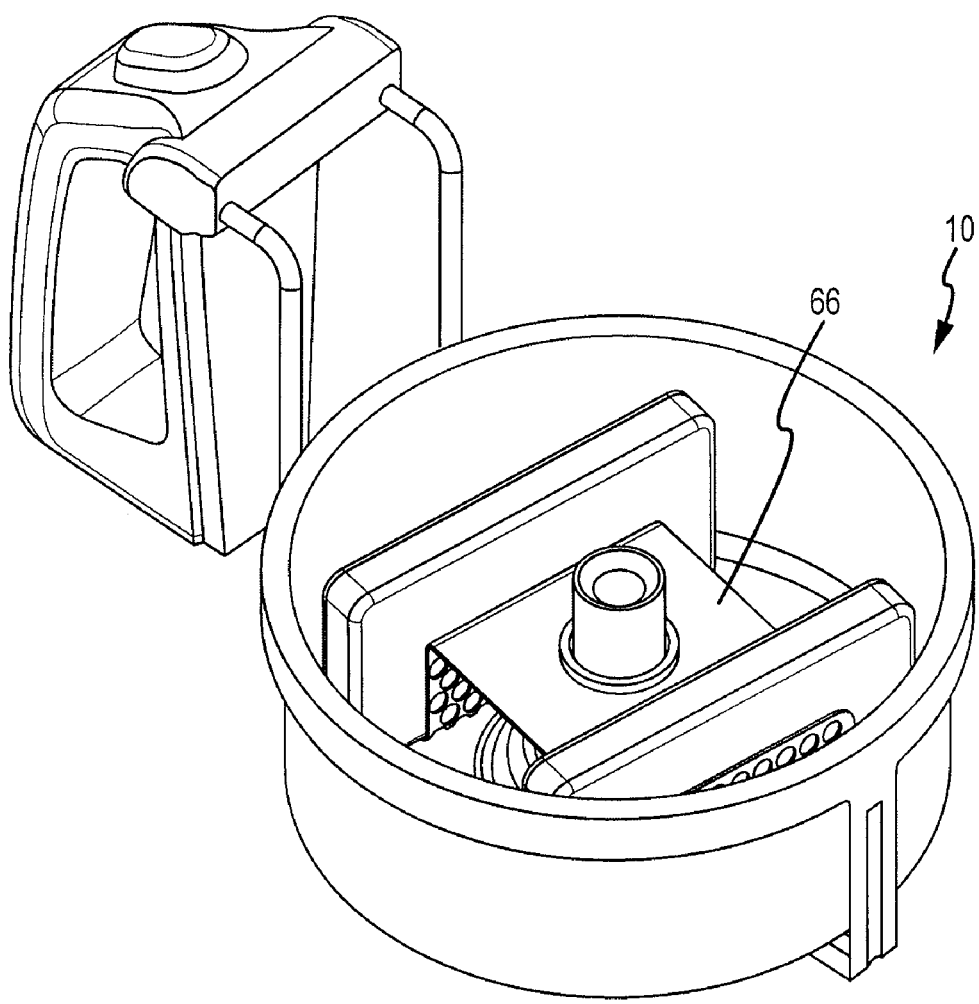
FIG. 44 illustrates a perspective view of a portion of a cooking device with a hash brown insert according to an embodiment of the present invention.
Figure 45:
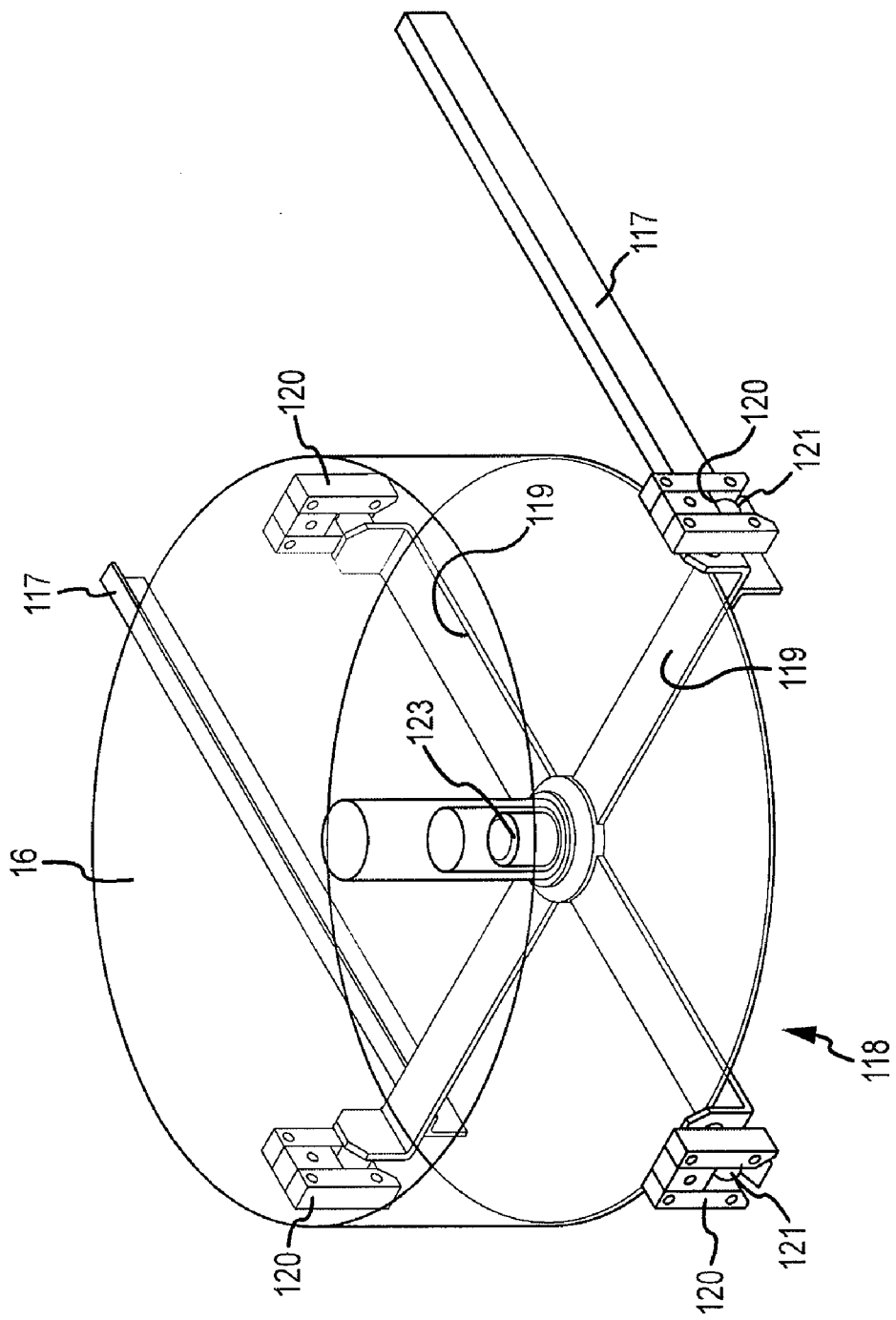
FIG. 45 illustrates a perspective view of a basket and vibration damping mechanism according to an embodiment of the present invention.
Figure 46:
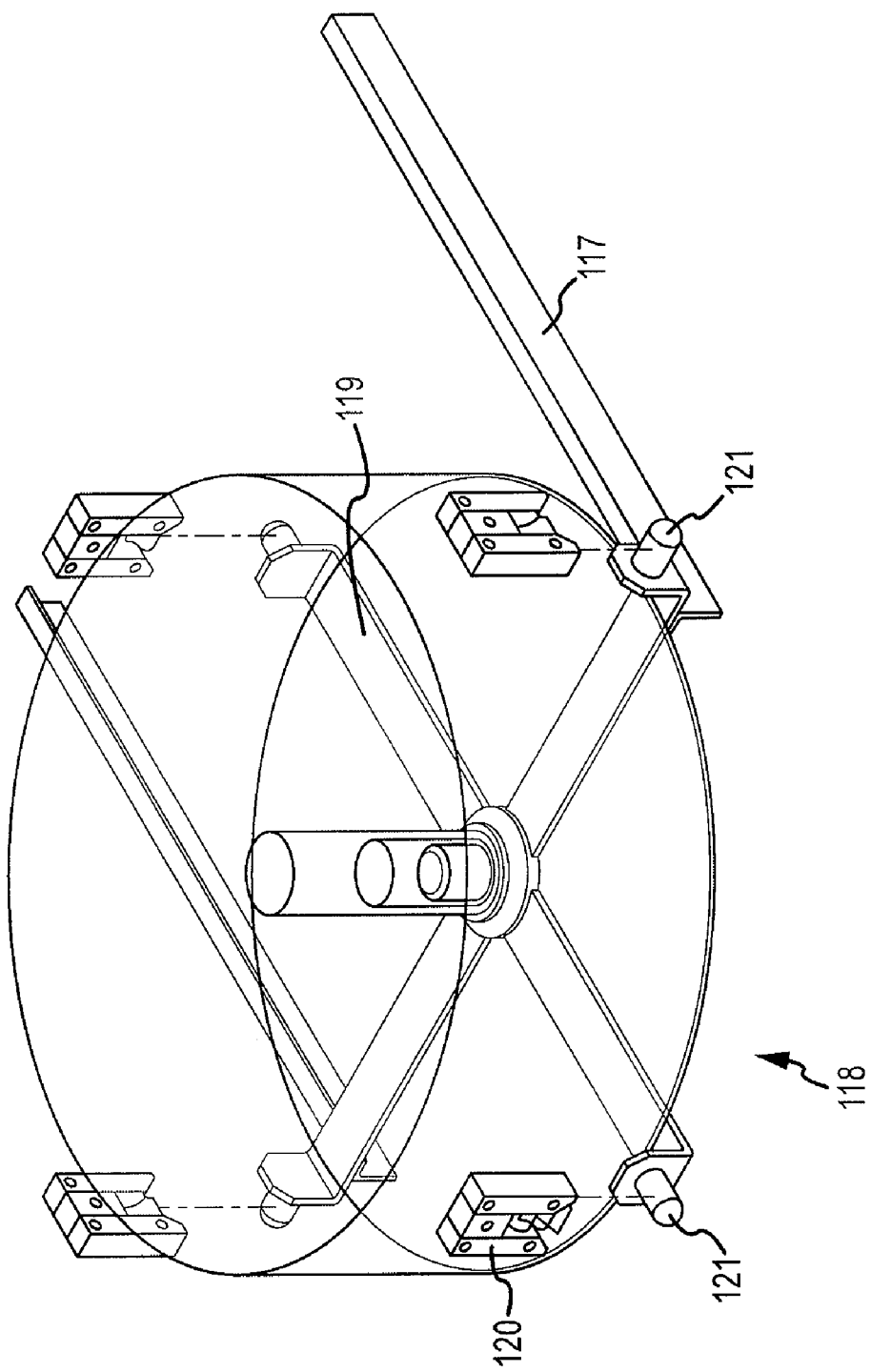
FIG. 46 illustrates a perspective view of a basket and vibration damping mechanism according to another embodiment of the present invention.
Figure 47:
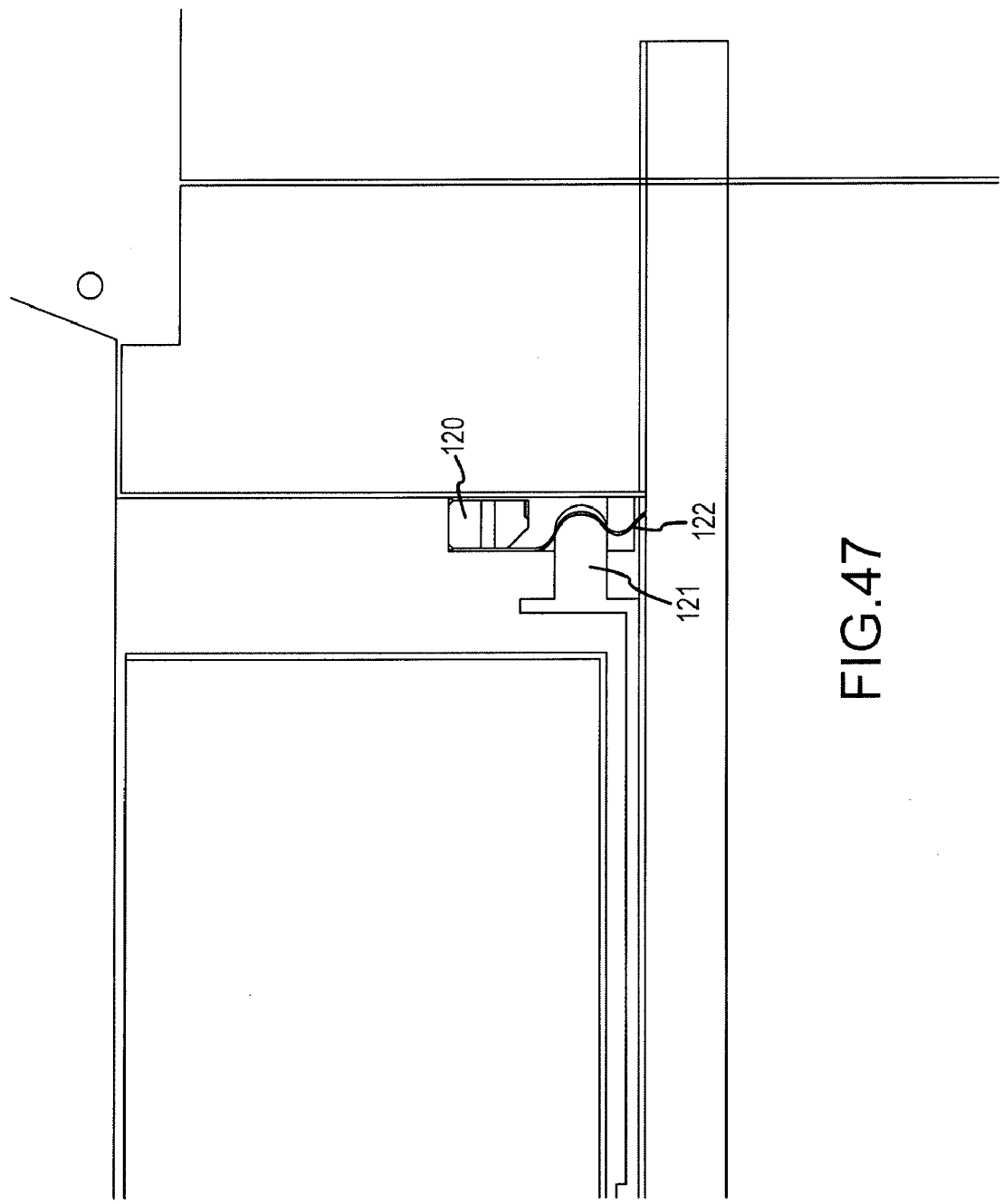
FIG. 47 illustrates a side sectional view of a vibration damping mechanism according to an embodiment of the present invention.
Figure 48:
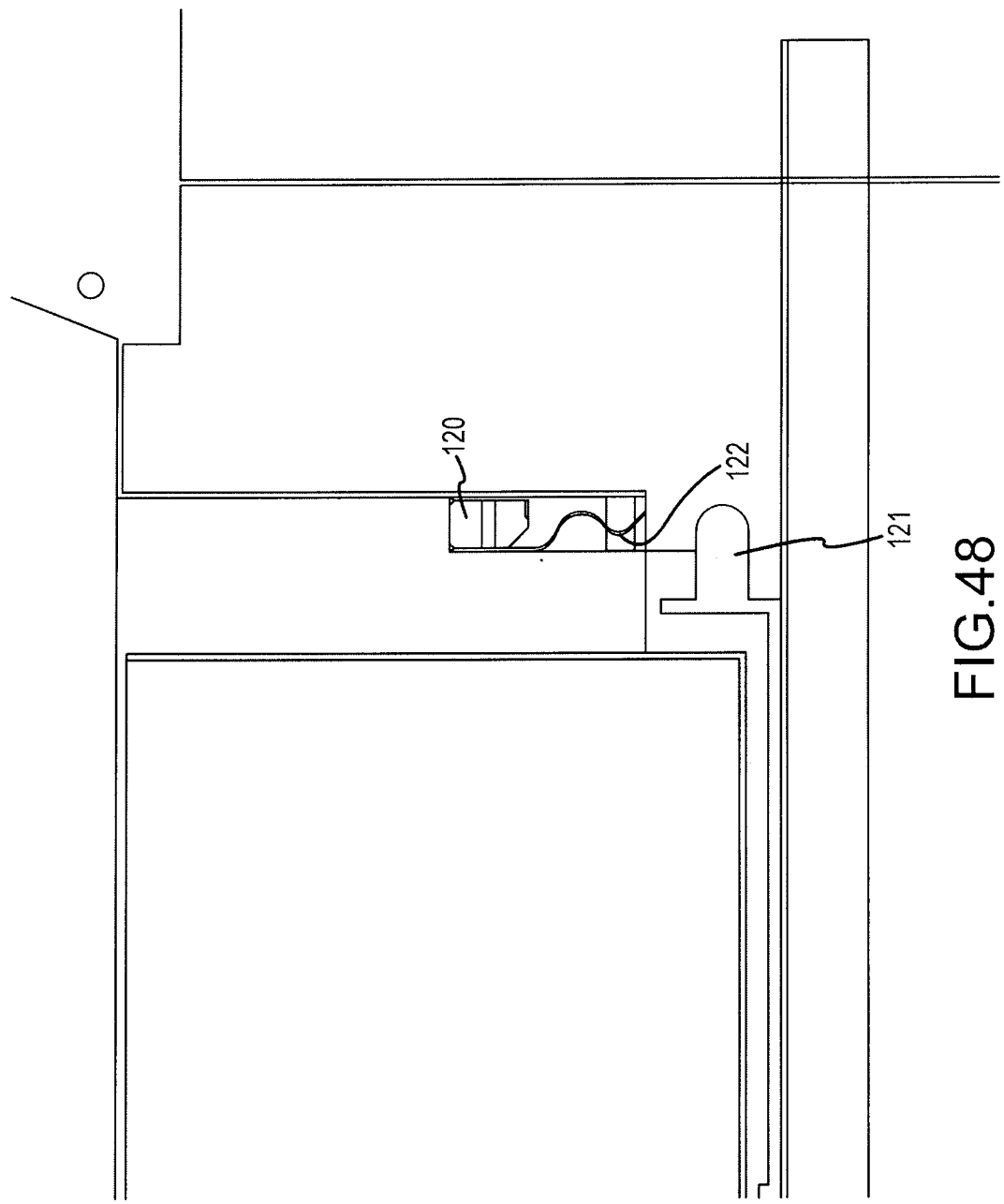
FIG. 48 illustrates a side sectional view of a vibration damping mechanism according to another embodiment of the present invention.
Figure 49:
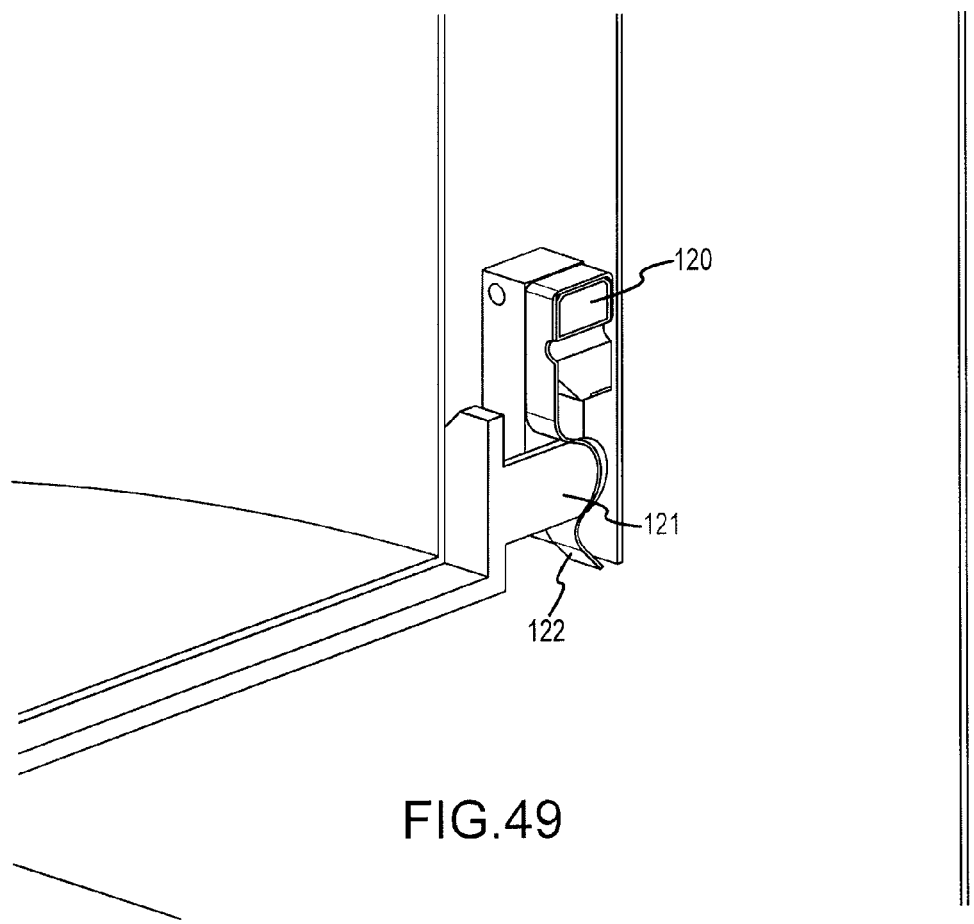
FIG. 49 illustrates a perspective sectional view of a vibration damping mechanism according to an embodiment of the present invention.
Figure 50:
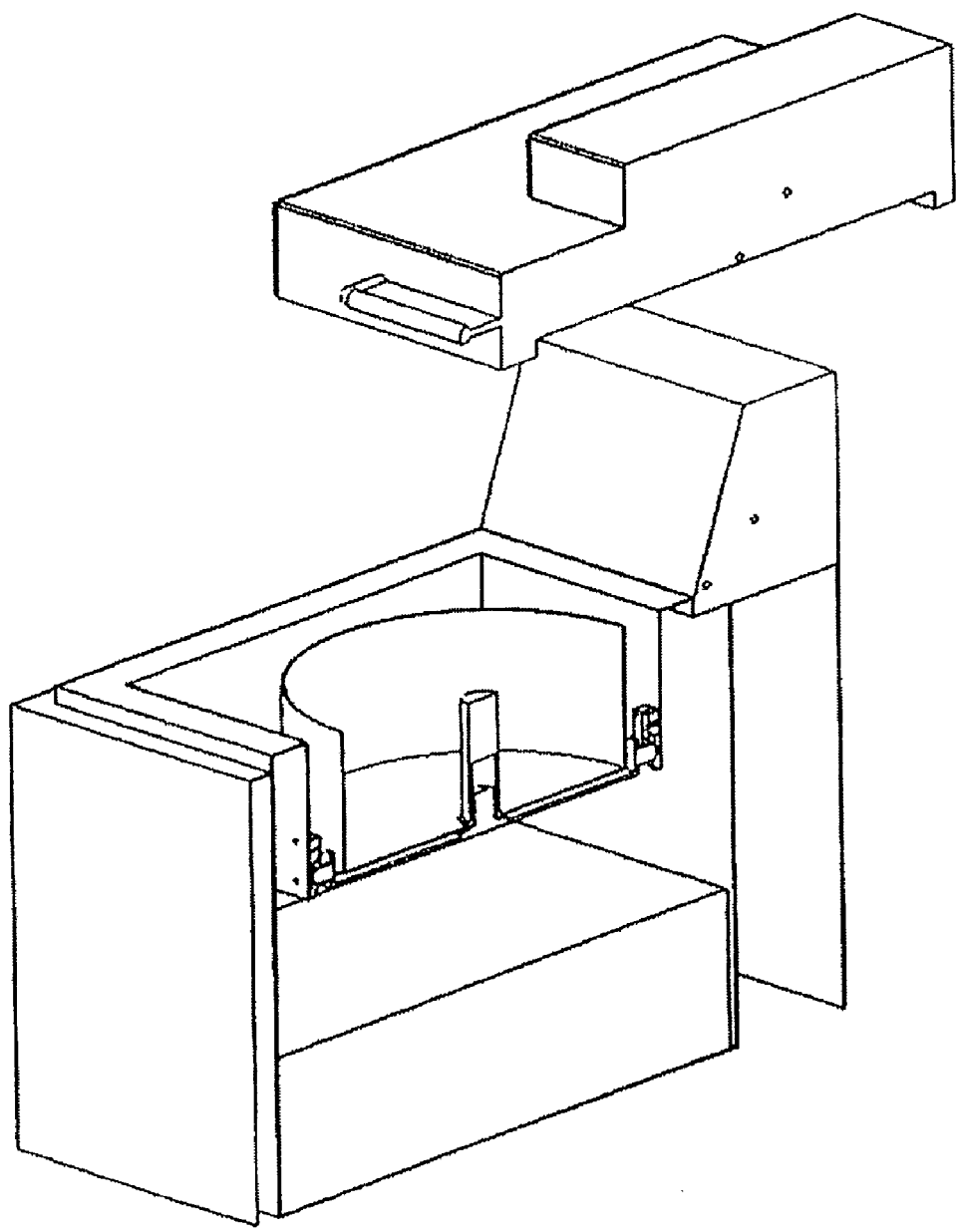
FIG. 50 illustrates a perspective view of a cooking device and vibration damping mechanism according to an embodiment of the present invention.
Figure 51:
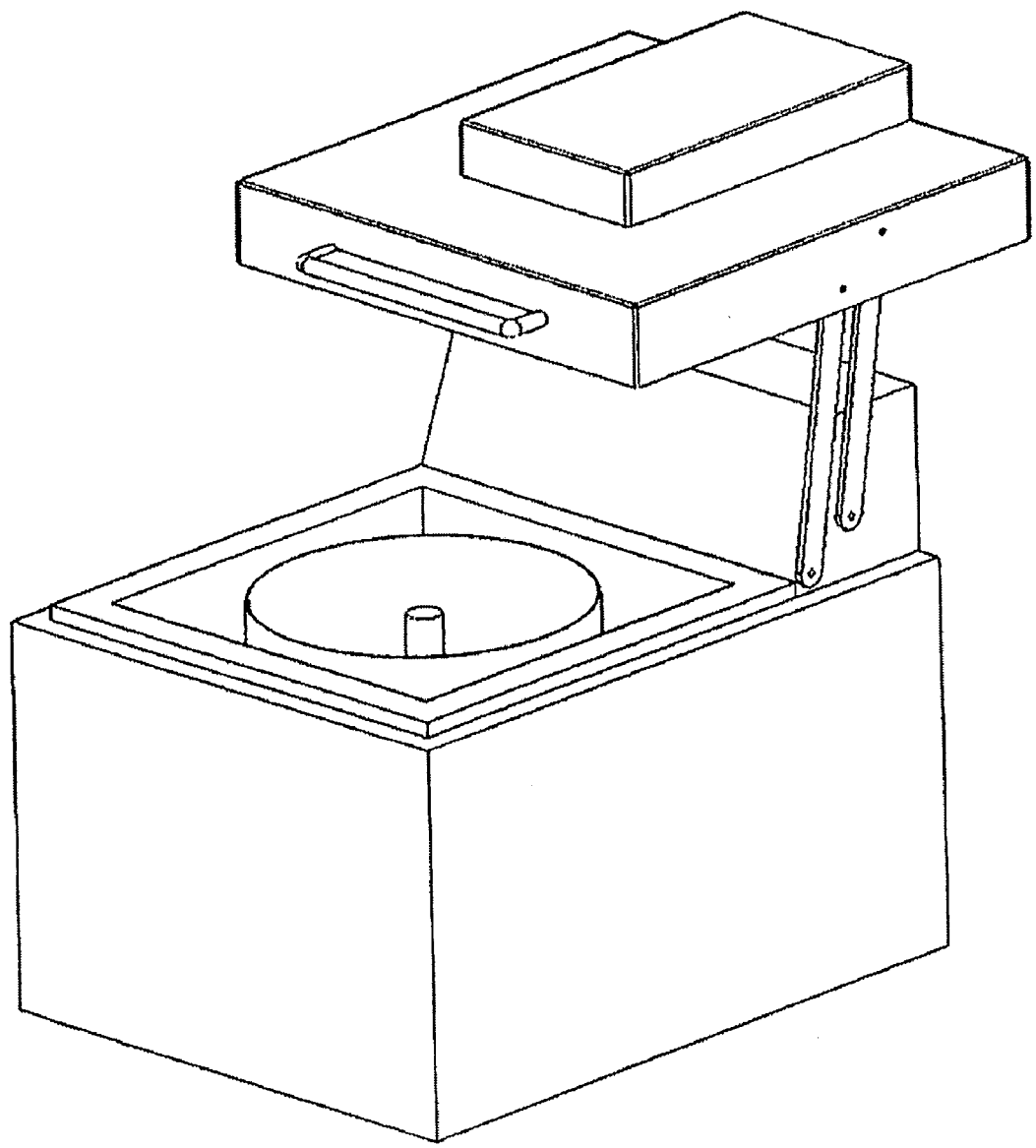
FIG. 51 illustrates a perspective view of a cooking device with a vibration damping mechanism according to an embodiment of the present invention.
Figure 52:
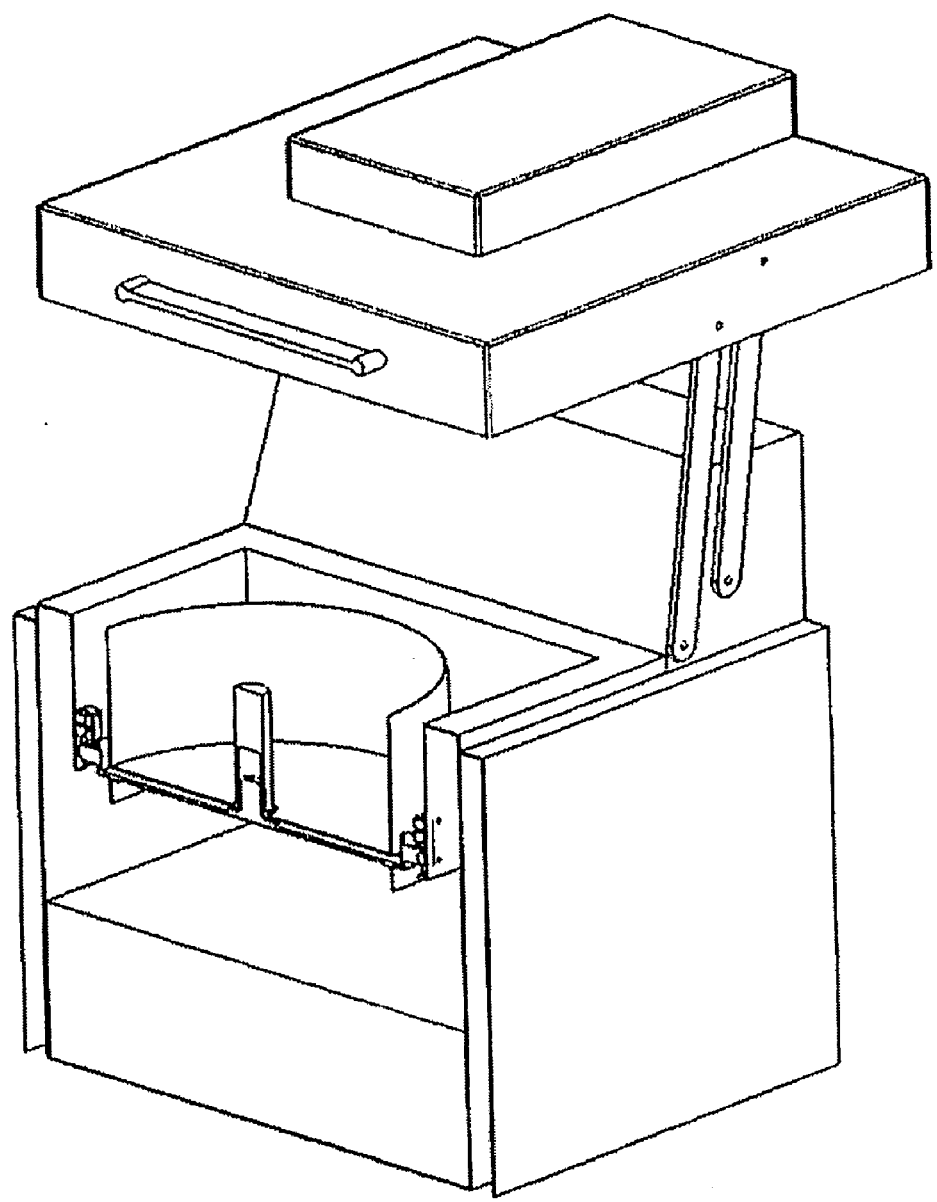
FIG. 52 illustrates a perspective sectional view of a cooking device with a vibration damping mechanism according to an embodiment of the present invention.
Figure 53:
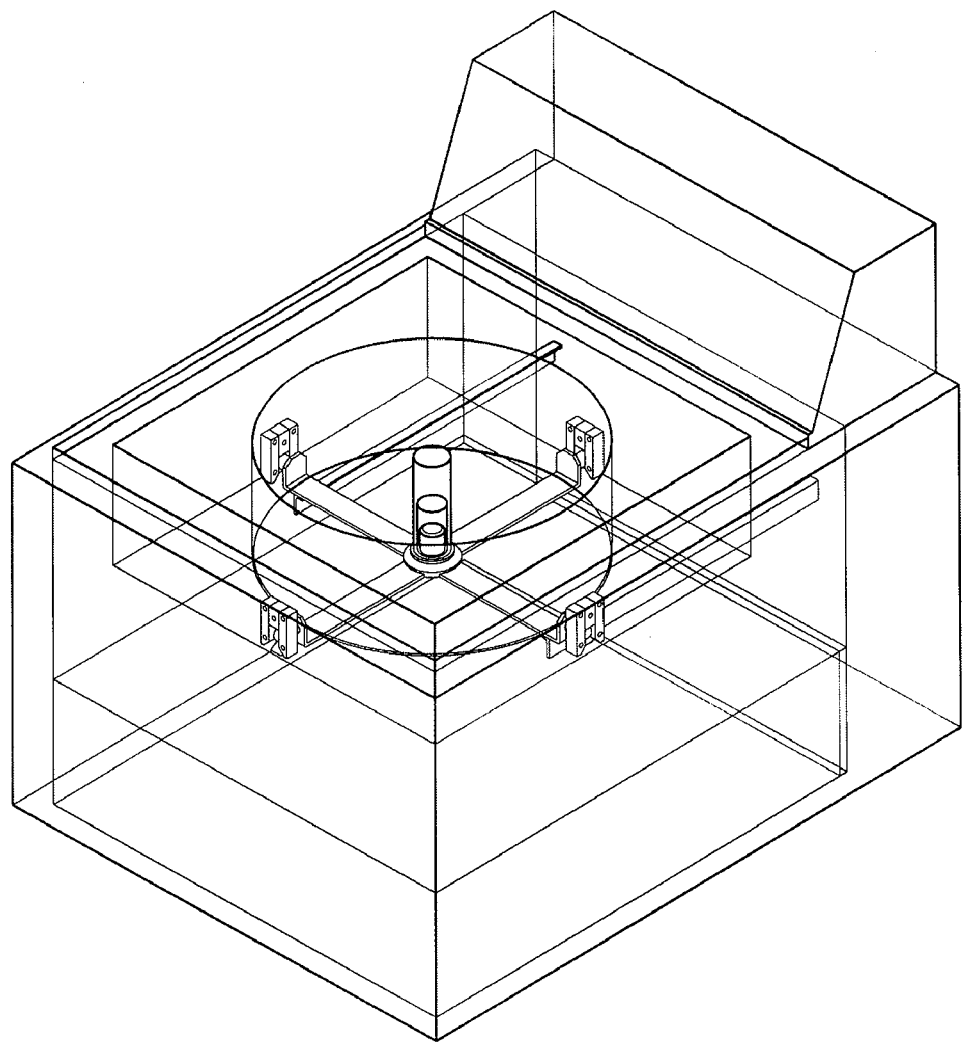
FIG. 53 illustrates a perspective view of a cooking device with a vibration damping mechanism according to yet another embodiment of the present invention.
Figure 54A:
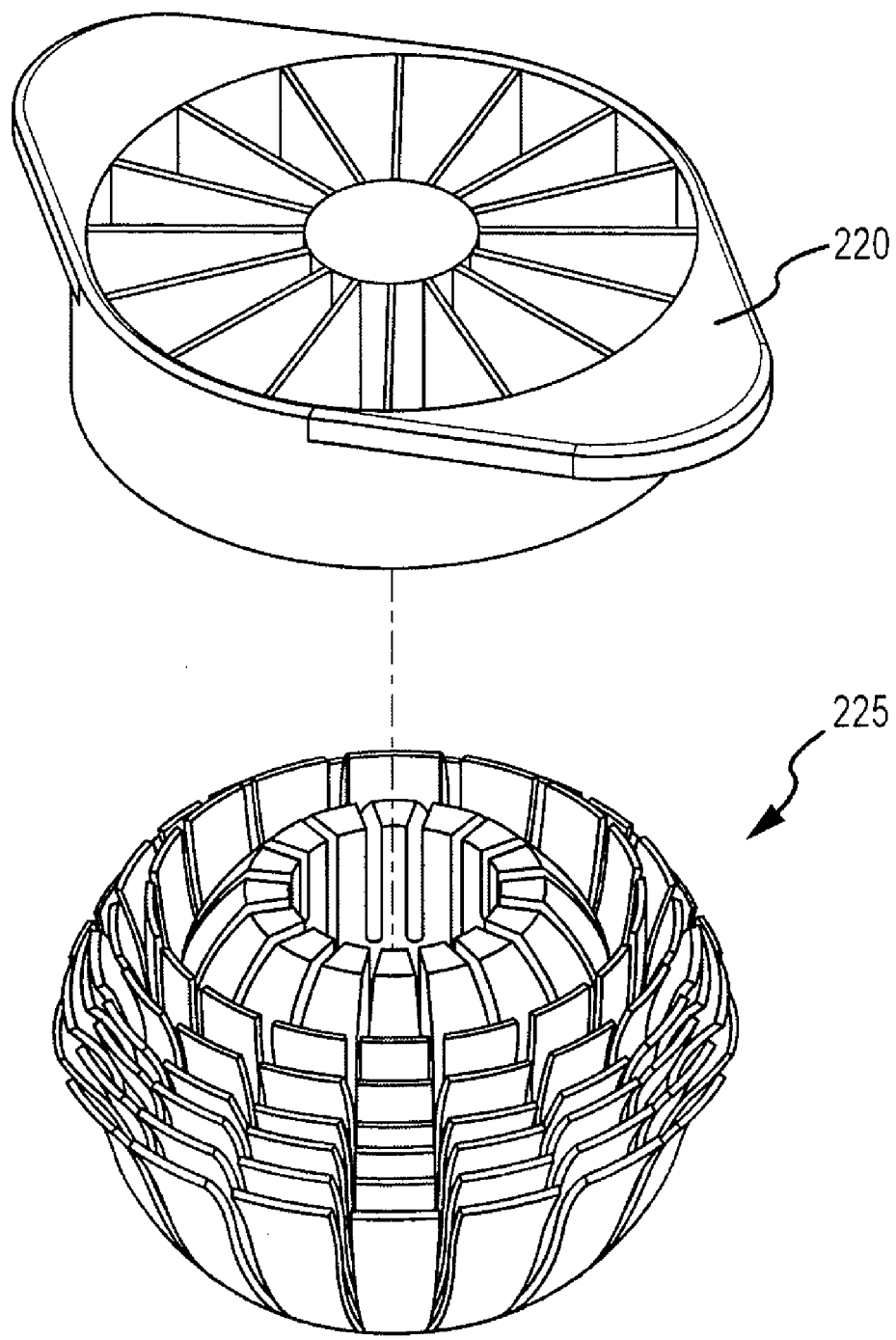
FIG. 54A illustrates an exploded perspective view of an onion slicer according to an embodiment of the present invention.
Figure 54B:
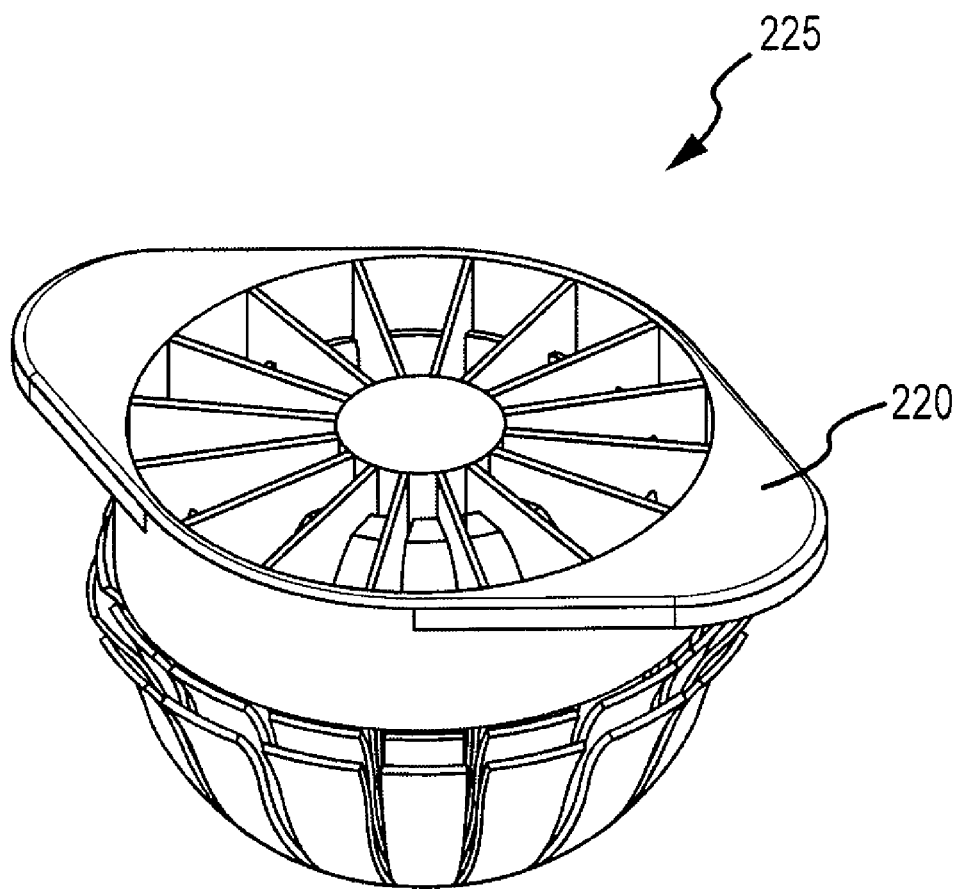
FIG. 54B illustrates a perspective view of an onion slicer according to another embodiment of the present invention.
Figure 55:
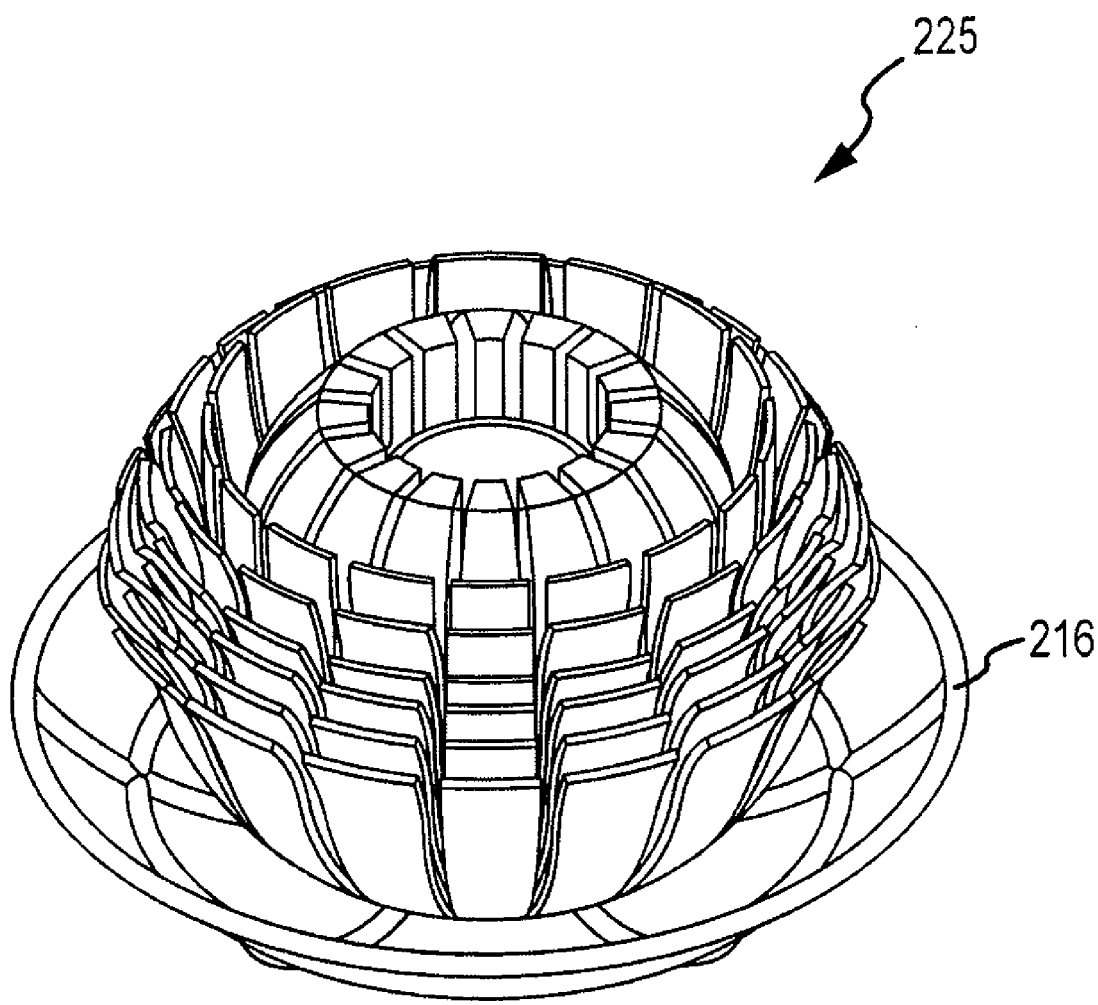
FIG. 55 illustrates a perspective view of an onion basket according to an embodiment of the present invention.
Figure 56:
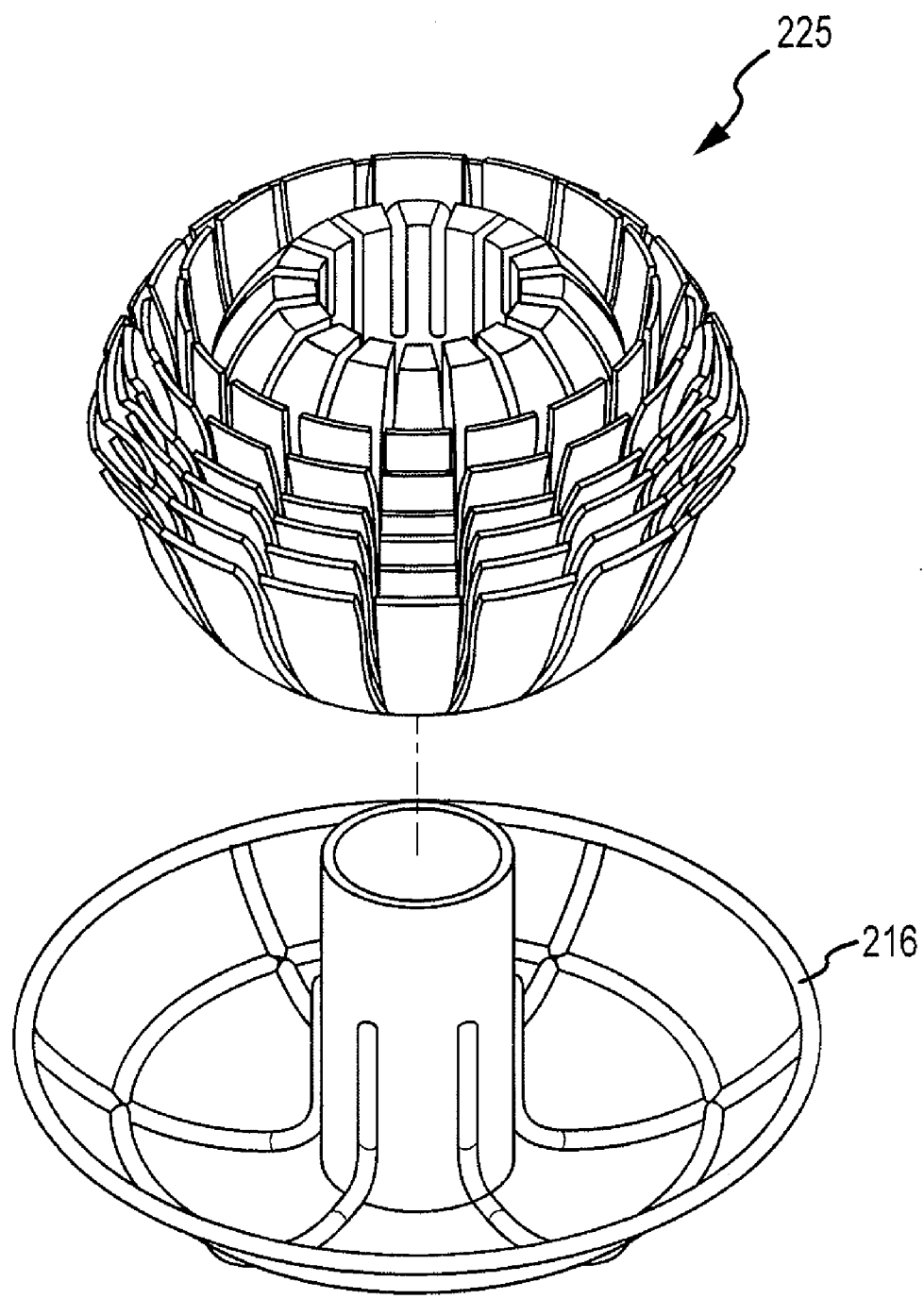
FIG. 56 illustrates an exploded perspective view of an onion basket according to another embodiment of the present invention.
Figure 57:
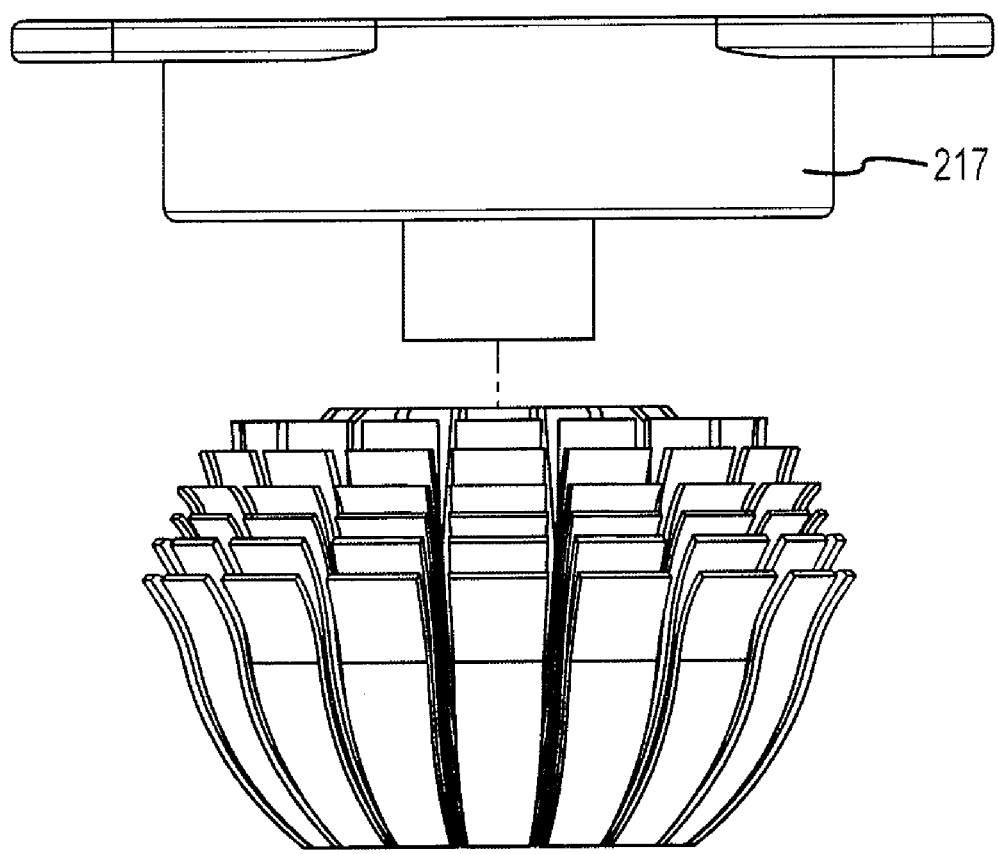
FIG. 57 illustrates an exploded perspective view of an onion insert according to an embodiment of the present invention.
Figure 58:
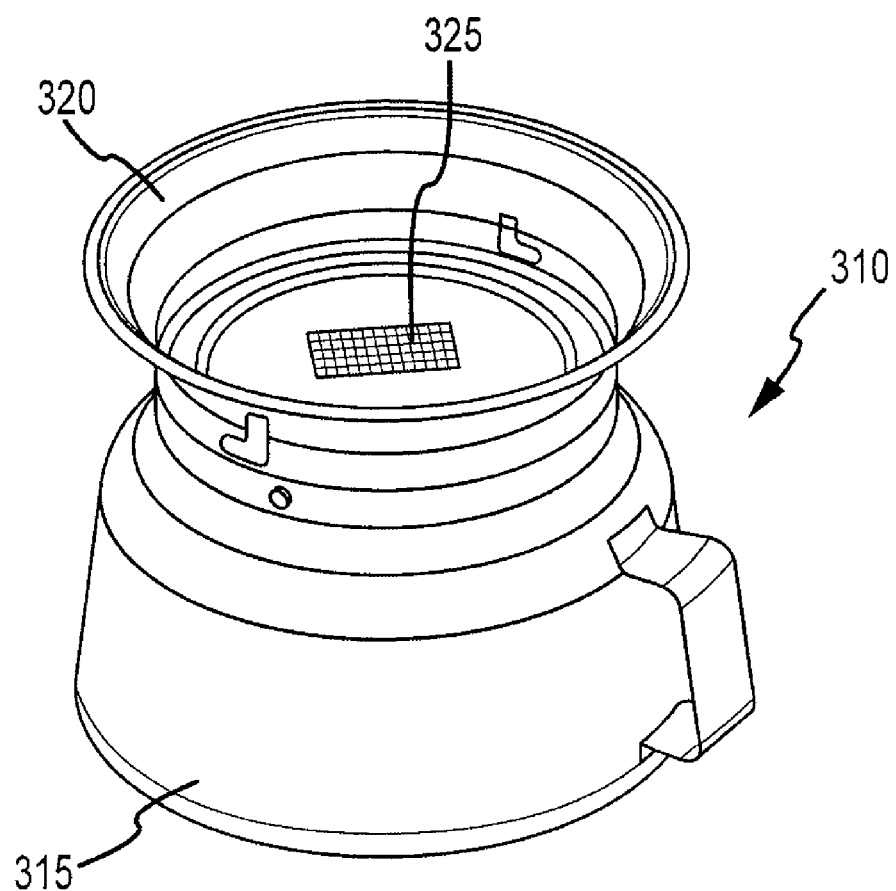
FIG. 58 illustrates a perspective view of a filter according to an embodiment of the present invention.
Figure 59:
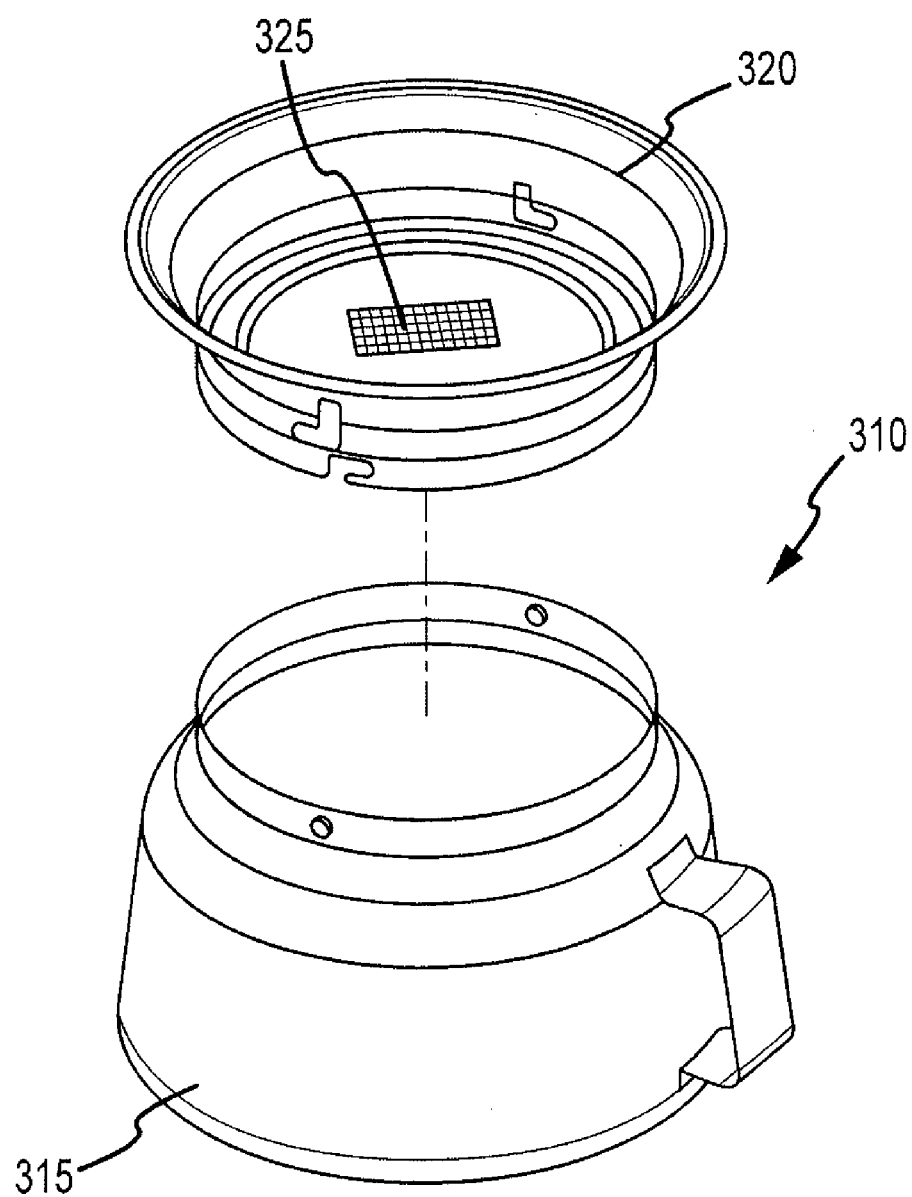
FIG. 59 illustrates an exploded perspective view of a filter according to an embodiment of the present invention.
Figure 60:
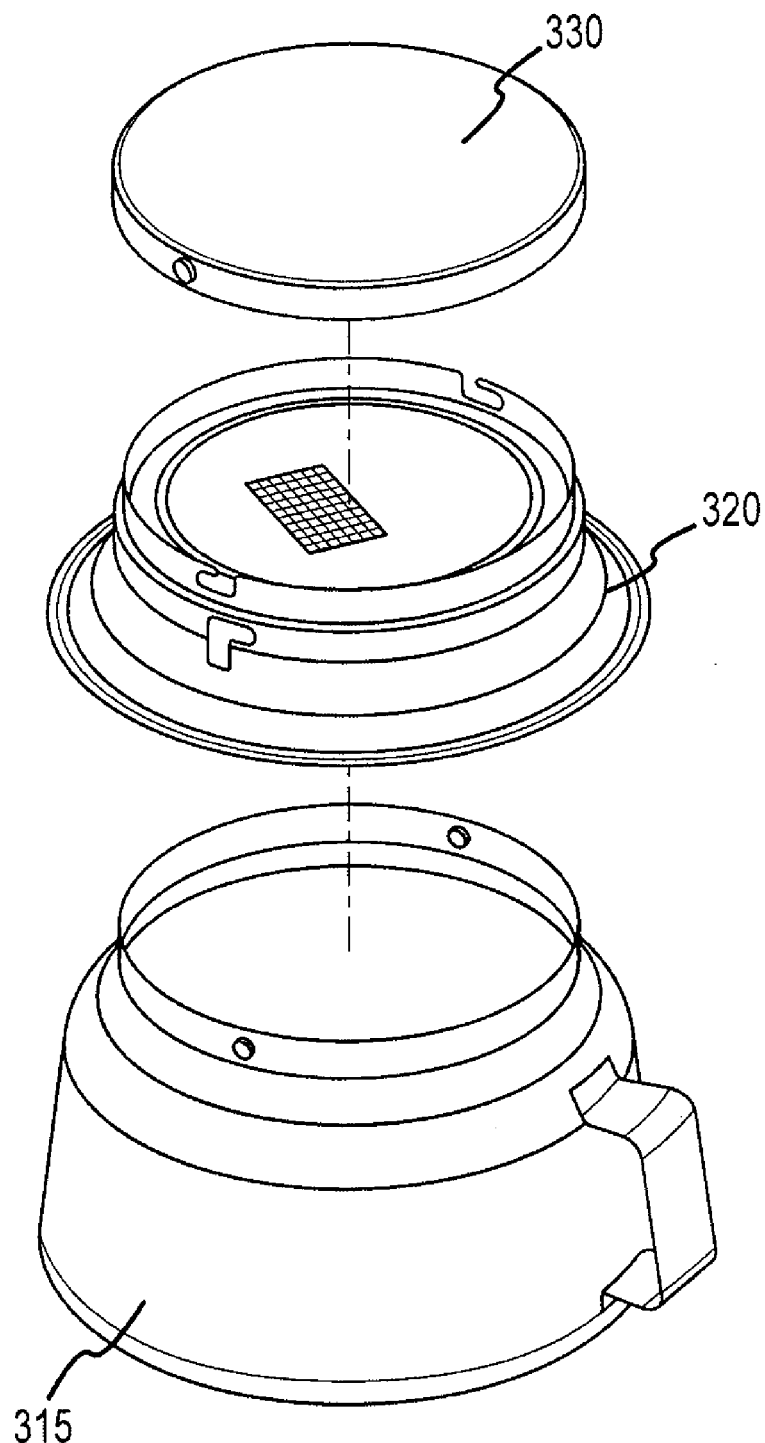
FIG. 60 illustrates an exploded perspective view of a filter according to another embodiment of the present invention.
Figure 61:
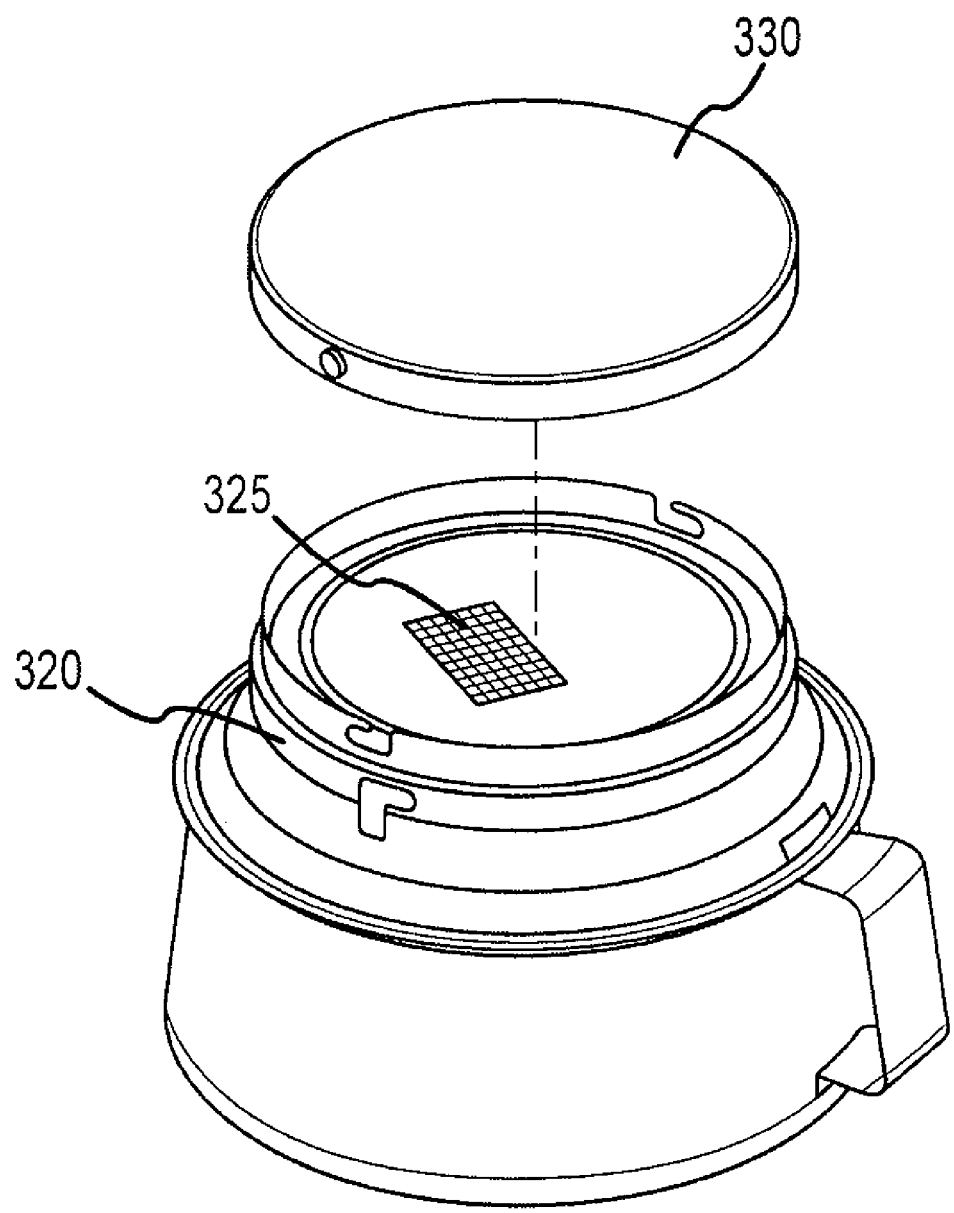
FIG. 61 illustrates an exploded perspective view of a filter according to yet another embodiment of the present invention.
Figure 62:
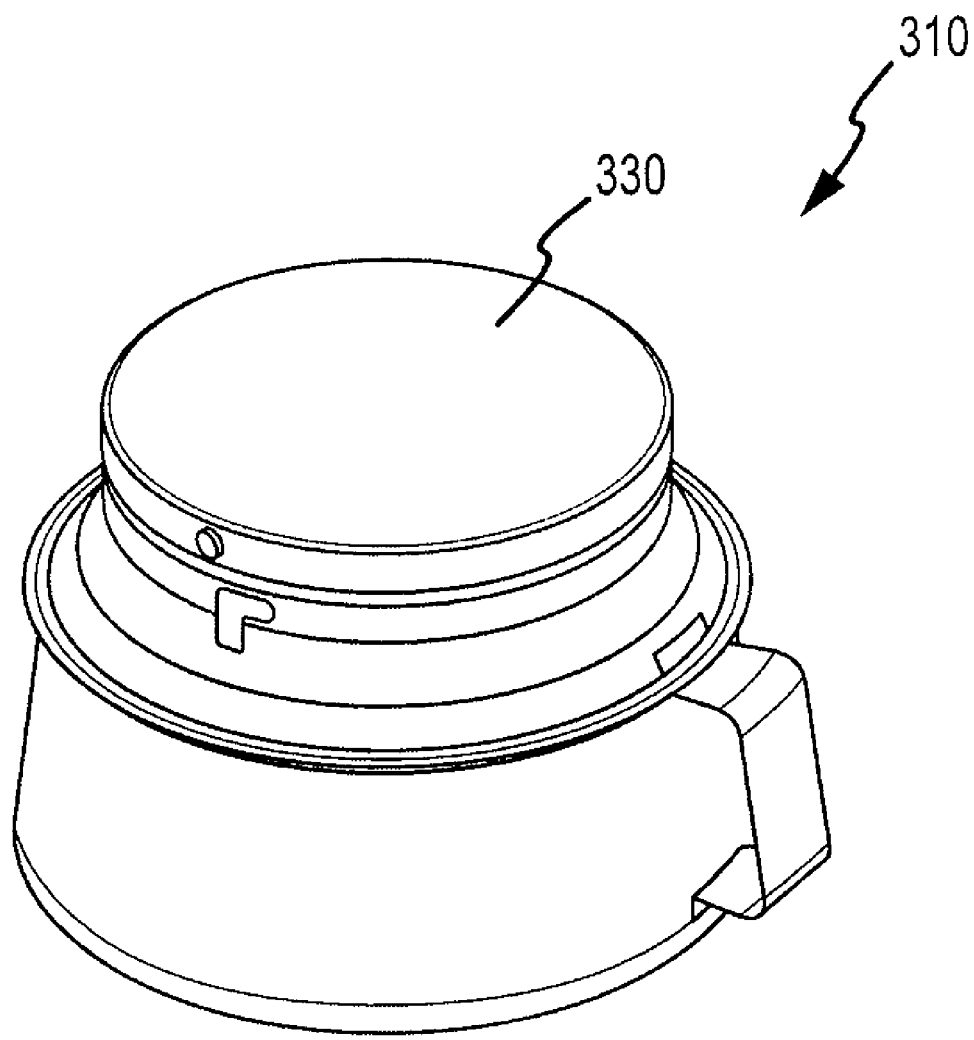
FIG. 62 illustrates a perspective view of a filter with a cover according to an embodiment of the present invention.

In accordance with various embodiments, and with reference to FIGS. 43-44 cooking device 10 may be configured to cook hash browns utilizing a hash brown basket 66. Hash brown basket 66 has two or more hash brown holders 76 disposed opposite each other that are configured to hold hash browns in a substantially vertical orientation. Vertically orienting the hash browns is desirable to prevent disintegration during the spinning process. Hash brown holders 76 are connected to a center shaft that is configured to fit with a center post driven by a rotational motor to facilitate spinning hash brown basket 66.

According to an embodiment of the present invention, and with respect to FIGS. 54A-57, a centrifugal cooking device may be configured to fry an onion. Onion slicer 220 may be configured to cut the center out of onion 225, while slicing partially through onion 225 such that part of the connecting web of onion 225 remains intact. Onion basket 216 is configured to receive onion 225 via the hole left by the center of the onion that was removed. Onion cover 217 is configured to be inserted into the top of onion 225, and may be utilized to facilitate maintaining the onion intact during the spinning process.

In accordance with an embodiment, and with reference to FIGS. 58-62, a separate oil filter may be used to filter and/or store cooking oil. Oil filter 310 comprises a base 315 that may be made of stainless steel or other suitable material for high temperature and storage of oil. Oil filter 310 may further comprise a funnel filter portion 320 that includes filter element 325. Funnel filter portion 320 may be secured to base 315 with the funnel portion upwards for receiving oil. As oil is poured through filter element 325, impurities from the oil are removed. Filter portion 320 may the be cleaned and inverted before being reattached to base 315 for oil storage. Oil filter 310 further comprises a cover 330 configured to be attached to filter portion 320 in its inverted position (see, e.g., FIGS. 60-62) to prevent oil spillage during storage.

In other embodiments of the invention, a controller is provided which controls the operation of the various motors, devices, components, conditions and processes to allow for substantially complete automation of the cooking device. Although the term "controller" may be used to describe the electronic and/or automated controlling of various processes, it should be appreciated that such functionality may be realized by any number of hardware and/or software components configured to perform the specified functions. For example, various embodiments may employ various integrated circuit components (e.g., memory elements, processing elements, logic elements, look-up tables, and/or the like), which may carry out a variety of functions under the control of one or more microprocessors or other control devices. Similarly, the software elements of the various embodiments may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and/or the like.

The "controllers" discussed herein may also comprise computing systems including a processor configured to process digital data, a memory coupled to the processor for storing digital data, an input digitizer coupled to the processor for inputting digital data, an application program stored in the memory and accessible by the processor for directing processing of digital data by the processor, a display coupled to the processor and memory for displaying information derived from digital data processed by the processor and a plurality of databases, the databases including cooking, temperature, food type and like data that may be used in association with the present embodiments. As those skilled in the art may appreciate, a user interface for each system described herein may be configured to include an operating system (e.g., Windows NT, 95/98/2000/XP/Vista, Linux, Unix, Solaris, etc.) as well as various conventional support software and drivers typically associated with computers.

Various information and data are described herein as being "stored." In this context, "stored" may mean that the information is kept on a database. In accordance with the various embodiments, a database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Databases may be organized in any suitable manner, including as data tables or lookup tables. Association of certain data may be accomplished through any data association technique known and practiced in the art. For example, the association may be accomplished either manually or automatically. Association techniques include common techniques such as using a key field in the tables to speed searches, sequential searches through all the tables and files, and sorting records in the file according to a known order to simplify lookup. In other embodiments, data may not be stored in a database, but may be stored by any other known means for storing data.

In accordance with various embodiments, any suitable data storage technique may be utilized to store data. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

An embodiment of the invention comprises a storage medium configured to provide instructions to a computer processor for carrying out the various cooking processes and steps disclosed herein. As used in this application, "storage medium" may be anything capable of storing information, for example, magnetic tape, RAM, ROM, compact disc media, flash memory, solid state memory, and the like. As mentioned above, a processor may be any device capable of reading and/or accessing the storage medium, and the processor may be configured to be part of the controller. In other embodiments, the processor may be separate from the controller.

In some embodiments, the computer processor may be configured to receive a number of inputs from a user, such as food type, cook time, spin time, cook temperature, spin temperature, spin speed, and food result (e.g., rare, medium rare, medium, medium well, well). In other embodiments, the user may provide only some of the above inputs, and the processor may be configured to automatically calculate and/or produce the other inputs. Any inputs relevant to the functionality of the cooking device may be received from a user and/or produced automatically by the processor. The Processor may be configured to receive the inputs from a user interface and/or via algorithms, pre-loaded instructions, and/or other processes that do not require user input.

The storage medium may further provide instructions to the processor such that the processor may be configured to (1) open and/or close the fryer drawer and/or lid; (2) move the basket between the cooking and spinning sections; (3) maintain a desired temperature in the cooking and spinning sections; (4) allow the cooked food to remain in the cooking section for a desired cook time; (5) rotate the basket well and/or food basket in the spinning section for a desired spin time; (6) set speeds for the various motors; (7) perform misting after spinning; (8) control electric coupling of the motor key and motor gear; and/or (9) perform other functions contemplated within the scope of this disclosure. It should be understood that any of the above functions may be performed automatically by the processor, and/or certain of the functions may be performed by the processor, and others may be performed manually. In further embodiments, the storage medium may be configured to instruct the processor to store a number of pre-configured cooking procedures depending on various types of food, food results, users, operating conditions, and the like. Where such a pre-configured procedure is employed, a user may need to only make one or a limited number of choices, and the processor may then fully automatically complete the cooking process. In other embodiments, the processor may require user input at various times during the cooking process.

In an embodiment, a user may input a food type and a desired food result via a user interface on the frying device. In other embodiments, a user may provide inputs to the cooking device via a network connection, such as via Internet, Ethernet, cellular, wireless, wired satellite, infrared, radio frequency and the like network and/or communications systems.

Various principles of the present invention have been described in embodiments. However, many combinations and modifications of the above-described structures, arrangements, proportions, elements, materials, and components, used in the practice of the invention, in addition to those not specifically described, can be varied without departing from those principles. Various embodiments have been described as comprising automatic processes, but these process may be performed manually without departing from the scope of the present invention.

Although various embodiments are disclosed herein, it should be understood that other embodiments exist which are not disclosed. Further, various embodiments disclosed herein may be used together with other embodiments, so that when "an embodiment" is described, it is not intended to be exclusive of other embodiments unless expressly stated as such. Therefore, although "further embodiments," "another embodiment," and the like may be used to describe the various embodiments presented herein, such language is not limiting and/or exclusive of other embodiments. Various combinations of the embodiments presented herein may be used without departing from the scope of the present disclosure.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A cooking device, comprising:
   a rotatable food basket disposed within the cooking device;
   a damping mechanism configured to reduce a vibration generated by the rotatable food basket rotating within the cooking device;
   a hood, the hood comprising;
      a lip;
      a motor for rotating the rotatable food basket, and
      a motor gear that includes a plurality of teeth configured to receive a motor key on a central shaft of the rotatable food basket, wherein the motor key is configured to automatically seat with the plurality of teeth in the motor gear via an electromagnetic coupling.

2. The cooking device of claim 1, wherein the damping mechanism comprises a basket partition in the rotatable food basket, wherein the basket partition is configured to maintain a distribution of a food within the rotatable food basket.

3. The cooking device of claim 1, wherein the damping mechanism comprises means for maintaining a distribution of a food within the rotatable food basket.

4. The cooking device of claim 2, wherein the distribution is a substantially equal distribution of the food within the rotatable food basket.

5. The cooking device of claim 1, wherein the cooking device comprises a lifting plate and a lifting mechanism operable to move the rotatable food basket between a cooking section and a spinning section.

6. The cooking device of claim 1, wherein the hood is operable to reduce energy consumption by about 13% compared with an open bay cooking device without the hood.

7. The cooking device of claim 1, further comprising a first basket portion and a second basket portion configured to be disposed within a first section and a second section of the rotatable food basket.

8. The cooking device of claim 7, wherein the first basket portion includes a first handle slot, and wherein the second basket portion includes a second handle slot, wherein the first handle slot and the second handle slot are configured to receive a handle to facilitate removal of the first basket portion and the second basket portion from the rotatable food basket.

9. The cooking device of claim 1, wherein the motor gear, the plurality of teeth, the motor, and the motor key are interoperable to facilitate rotating the rotatable food basket.

10. The cooking device of claim 1, wherein the rotatable food basket comprises a slot configured to hold a food in a substantially vertical orientation.

11. The cooking device of claim 1, further comprising a cooking vessel disposed within the cooking device, wherein the rotatable food basket is disposed within the cooking vessel, and wherein the cooking vessel is configured to hold a cooking liquid.

12. The cooking device of claim 11, wherein the damping mechanism comprises an energy absorbing device disposed between the cooking vessel and a frame of the cooking device.

13. The cooking device of claim 12, wherein the energy absorbing device comprises a spring disposed between the frame and at least one of a side and a bottom of the cooking vessel.

14. The cooking device of claim 12, wherein the energy absorbing device comprises an energy absorbing material configured to be operable in a heated environment and in conjunction with the cooking liquid.

15. The cooking device of claim 11, further comprising a frame configured to receive the cooking vessel, wherein the damping mechanism comprises an energy absorbing device disposed between the frame and a surface external to the cooking device.

16. The cooking device of claim 15, wherein the energy absorbing device is disposed between supports for the frame.

17. The cooking device of claim 16, wherein the energy absorbing device is at least one of a bolt and a locking device.

18. The cooking device of claim 16, further comprising a drive mechanism coupled to the rotatable food basket to facilitate rotating the rotatable food basket, wherein the damping mechanism is coupled to the drive mechanism to reduce the vibration generated by the rotatable food basket rotating within the cooking device.

19. The cooking device of claim 18, wherein the damping mechanism is configured to isolate at least one of the rotatable food basket, the cooking vessel, and the drive mechanism from the frame to facilitate reducing the vibration generated by the rotatable food basket rotating within the cooking device.

20. A cooking device, comprising:
- a rotatable food basket disposed within the cooking device;
- a damping mechanism configured to reduce a vibration generated by the rotatable food basket rotating within the cooking device;
- a motor in a hood for rotating the rotatable food basket; and
- a microprocessor controller, wherein the hood comprises a motor gear that includes a plurality of teeth configured to receive a motor key on a central shaft of the rotatable food basket, and wherein the motor key is configured to automatically seat with the plurality of teeth in the motor gear via an electromagnetic coupling in response to an instruction from the microprocessor controller.

* * * * *